US012201987B2

(12) United States Patent
Motadel et al.

(10) Patent No.: US 12,201,987 B2
(45) Date of Patent: Jan. 21, 2025

(54) PIPETTE TIP RACK

(71) Applicant: BIOTIX, INC., San Diego, CA (US)

(72) Inventors: Arta Motadel, San Diego, CA (US); Phillip Chad Hairfield, La Mesa, CA (US); Peter Paul Blaszcak, San Diego, CA (US)

(73) Assignee: BIOTIX, INC., San Diego, CA (US)

( * ) Notice: Subject to any disclaimer, the term of this patent is extended or adjusted under 35 U.S.C. 154(b) by 1154 days.

(21) Appl. No.: 16/914,722

(22) Filed: Jun. 29, 2020

(65) Prior Publication Data

US 2021/0016290 A1 Jan. 21, 2021

Related U.S. Application Data

(63) Continuation of application No. 14/769,434, filed as application No. PCT/US2014/017409 on Feb. 20, 2014, now Pat. No. 10,737,273, which is a continuation of application No. 13/773,505, filed on Feb. 21, 2013, now Pat. No. 9,108,201.

(51) Int. Cl.

*B01L 9/00* (2006.01)
*B01L 3/00* (2006.01)
*B65D 25/10* (2006.01)
*B65D 85/00* (2006.01)

(52) U.S. Cl.

CPC ............ *B01L 9/543* (2013.01); *B65D 25/108* (2013.01); *B65D 85/54* (2013.01); *B01L 3/5085* (2013.01); *B01L 2200/025* (2013.01); *B01L 2300/041* (2013.01); *B01L 2300/0829* (2013.01); *B01L 2300/0858* (2013.01)

(58) Field of Classification Search

None

See application file for complete search history.

(56) References Cited

U.S. PATENT DOCUMENTS

| | | | |
|---|---|---|---|
| 2,526,129 A | 10/1950 | Groesbeck et al. | |
| D264,810 S | 6/1982 | Voltmann | |
| D271,239 S | 11/1983 | Lemieux et al. | |
| 4,483,925 A | 11/1984 | Noack | |
| 4,676,377 A | 6/1987 | Rainin et al. | |
| 5,035,326 A | 7/1991 | Stahl | |
| D337,165 S | 7/1993 | Malinoff | |
| 5,366,088 A | 11/1994 | Hill et al. | |
| 5,392,914 A | 2/1995 | Lemieux et al. | |

(Continued)

FOREIGN PATENT DOCUMENTS

| | | |
|---|---|---|
| EP | 0069419 B1 | 3/1985 |
| EP | 1652583 A1 | 5/2006 |

(Continued)

OTHER PUBLICATIONS

Corning Deck Works Pipet Tips, Product Brochure, 2010, 8 pages.

(Continued)

*Primary Examiner* — Jennifer Wecker
*Assistant Examiner* — Bryan Kilpatrick
(74) *Attorney, Agent, or Firm* — Standley Law Group LLP; Jeffrey S. Standley; Adam J. Smith

(57) ABSTRACT

Provided herein is a single-walled pipette tip rack comprising buttresses for use in automated systems, in some embodiments. Also provided herein is a partial single-walled pipette tip rack comprising posts.

17 Claims, 57 Drawing Sheets

(56) References Cited

U.S. PATENT DOCUMENTS

| | | | |
|---|---|---|---|
| 5,470,538 | A | 11/1995 | Lind |
| 5,487,872 | A | 1/1996 | Hafeman et al. |
| 5,588,792 | A | 12/1996 | Tiso |
| 5,622,676 | A | 4/1997 | Lind |
| 5,630,988 | A | 5/1997 | Stolp |
| 5,642,816 | A | 7/1997 | Kelly et al. |
| 5,779,984 | A | 7/1998 | Kelly et al. |
| D411,308 | S | 6/1999 | Pandey et al. |
| D414,271 | S | 9/1999 | Mendoza |
| D414,561 | S | 9/1999 | Escoffier |
| D416,330 | S | 11/1999 | Brown |
| 6,007,779 | A | 12/1999 | Lemieux et al. |
| D420,142 | S | 2/2000 | Ballin et al. |
| D420,743 | S | 2/2000 | Monks |
| 6,019,225 | A | 2/2000 | Kalmakis et al. |
| 6,098,819 | A | 8/2000 | Link |
| 6,221,317 | B1 | 4/2001 | Carl |
| D448,854 | S | 10/2001 | Kuiper et al. |
| D461,554 | S | 8/2002 | Lafond et al. |
| D466,219 | S | 11/2002 | Wynschenk et al. |
| 6,534,015 | B1 | 3/2003 | Viot et al. |
| 6,772,899 | B2 | 8/2004 | Delmon |
| 6,875,405 | B1 | 4/2005 | Mathus et al. |
| 7,036,667 | B2 | 5/2006 | Greenstein et al. |
| D529,622 | S | 10/2006 | Hadjis et al. |
| D533,948 | S | 12/2006 | Schaub et al. |
| 7,220,590 | B2 | 5/2007 | Moritz et al. |
| D556,338 | S | 11/2007 | Coulling et al. |
| D556,339 | S | 11/2007 | Coulling et al. |
| D562,463 | S | 2/2008 | Berndt et al. |
| D574,505 | S | 8/2008 | Muller-Cohn et al. |
| D576,208 | S | 9/2008 | Quercetti |
| D593,207 | S | 5/2009 | Ayliffe |
| D632,803 | S | 2/2011 | Motadel et al. |
| D673,293 | S | 12/2012 | Demas et al. |
| D673,294 | S | 12/2012 | Motadel |
| D673,295 | S | 12/2012 | Motadel |
| D673,296 | S | 12/2012 | Fry et al. |
| D677,400 | S | 3/2013 | Blaettler et al. |
| 8,430,251 | B2 | 4/2013 | Fry et al. |
| 8,460,622 | B2 | 6/2013 | Motadel et al. |
| D690,027 | S | 9/2013 | Motadel |
| 8,590,736 | B2 | 11/2013 | Motadel |
| D697,227 | S | 1/2014 | Motadel |
| D699,370 | S | 2/2014 | Motadel et al. |
| D699,371 | S | 2/2014 | Williams et al. |
| D699,859 | S | 2/2014 | Motadel |
| D724,236 | S | 3/2015 | Motadel et al. |
| 9,108,201 | B2 | 8/2015 | Motadel et al. |
| 9,433,944 | B2 | 9/2016 | Blumentritt et al. |
| 9,545,635 | B2 | 1/2017 | Motadel et al. |
| 10,562,031 | B2 | 2/2020 | Motadel et al. |
| 10,737,273 | B2 | 8/2020 | Motadel et al. |
| 2001/0012492 | A1 | 8/2001 | Acosta et al. |
| 2003/0129089 | A1 | 7/2003 | Arnold et al. |
| 2003/0152494 | A1 | 8/2003 | Moritz et al. |
| 2004/0141887 | A1 | 7/2004 | Mainquist et al. |
| 2005/0150808 | A1 | 7/2005 | Sarna et al. |
| 2006/0045815 | A1 | 3/2006 | Hovatter |
| 2006/0093530 | A1 | 5/2006 | Ueda |
| 2008/0240999 | A1 | 10/2008 | Timpson et al. |
| 2009/0092520 | A1 | 4/2009 | Moulton |
| 2009/0155123 | A1 | 6/2009 | Williams et al. |
| 2009/0298129 | A1 | 12/2009 | Spence et al. |
| 2010/0025878 | A1 | 2/2010 | Uchida |
| 2010/0124766 | A1 | 5/2010 | Ng et al. |
| 2010/0166616 | A1 | 7/2010 | Price |
| 2010/0221151 | A1 | 9/2010 | Motadel et al. |
| 2010/0258578 | A1* | 10/2010 | Motadel ................ G01N 35/04 221/92 |
| 2011/0236278 | A1 | 9/2011 | Motadel et al. |
| 2011/0300620 | A1 | 12/2011 | Belz et al. |
| 2014/0234182 | A1 | 8/2014 | Motadel et al. |
| 2014/0308181 | A1 | 10/2014 | Blumentritt et al. |
| 2016/0001292 | A1 | 1/2016 | Motadel et al. |
| 2017/0008001 | A1 | 1/2017 | Motadel et al. |
| 2017/0087557 | A1 | 3/2017 | Motadel et al. |

FOREIGN PATENT DOCUMENTS

| | | | |
|---|---|---|---|
| FR | 2784076 | A1 | 4/2000 |
| GB | 1522128 | A | 8/1978 |
| JP | H10-512196 | A | 11/1998 |
| JP | 2002-528248 | A | 9/2002 |
| WO | 02/20375 | A2 | 3/2002 |
| WO | 03/064271 | A2 | 8/2003 |
| WO | 2010/008737 | A2 | 1/2010 |
| WO | 2010/054337 | A2 | 5/2010 |
| WO | 2010/085669 | A2 | 7/2010 |
| WO | 2011/116230 | A2 | 9/2011 |
| WO | 2011/135085 | A1 | 11/2011 |
| WO | 2012/143533 | A1 | 10/2012 |
| WO | 2014/130679 | A1 | 8/2014 |

OTHER PUBLICATIONS

International Preliminary Report on Patentability mailed on Sep. 3, 2015 in International Patent Application No. PCT/US2014/017409, filed on Feb. 20, 2014, 11 pages.

International Preliminary Report on Patentability mailed on Sep. 27, 2012 in International Patent Application No. PCT/US2011/028881, filed on Mar. 17, 2011, 8 pages.

International Search Report and Written Opinion mailed on Jun. 12, 2014 in International Patent Application No. PCT/US2014/017409, filed on Feb. 20, 2014, 16 pages.

International Search Report and Written Opinion mailed on Nov. 25, 2011 in International Patent Application No. PCT/US2011/028881, filed on Jan. 22, 2010, 9 pages.

Office Action dated Apr. 2, 2020 in U.S. Appl. No. 14/769,434, filed Aug. 20, 2015 and published as US 2016-0001292 on Jan. 7, 2016, 11 pages.

Office Action dated Apr. 6, 2017 in U.S. Appl. No. 15/374,255, filed Dec. 9, 2016 and published as US 2017-0087557 on Mar. 30, 2017, 10 pages.

Office Action dated Apr. 13, 2015 in U.S. Appl. No. 13/773,505, filed Feb. 21, 2013 and published as US 2014-0234182 on Aug. 21, 2014, 7 pages.

Office Action dated Apr. 26, 2019 in U.S. Appl. No. 15/374,255, filed Dec. 9, 2016 and published as US 2017-0087557 on Mar. 30, 2017, 9 pages.

Office Action dated Dec. 14, 2018 in U.S. Appl. No. 14/769,434, filed Aug. 20, 2015 and published as US 2016-0001292 on Jan. 7, 2016, 9 pages.

Office Action dated Feb. 5, 2016 in U.S. Appl. No. 13/050,780, filed Mar. 17, 2011 and published as US-2011-0236278 on Sep. 29, 2011, 8 pages.

Office Action dated Feb. 18, 2015 in U.S. Appl. No. 13/773,505, filed Feb. 21, 2013 and published as US 2014-0234182 on Aug. 21, 2014, 14 pages.

Office Action dated Jan. 30, 2015 in U.S. Appl. No. 13/050,780, filed Mar. 17, 2011 and published as US-2011-0236278 on Sep. 29, 2011, 13 pages.

Office Action dated Jul. 1, 2015 in U.S. Appl. No. 13/050,780, filed Mar. 17, 2011 and published as US-2011-0236278 on Sep. 29, 2011, 10 pages.

Office Action dated Jun. 6, 2014 in U.S. Appl. No. 13/050,780, filed Mar. 17, 2011 and published as US-2011-0236278 on Sep. 29, 2011, 11 pages.

Office Action dated Jun. 15, 2018 in U.S. Appl. No. 14/769,434, filed Aug. 20, 2015 and published as US 2016-0001292 on Jan. 7, 2016, 9 pages.

Office Action dated Jun. 25, 2013 in U.S. Appl. No. 13/050,780, filed Mar. 17, 2011 and published as US-2011-0236278 on Sep. 29, 2011, 6 pages.

Office Action dated Mar. 22, 2018 in U.S. Appl. No. 15/374,255, filed Dec. 9, 2016 and published as US 2017-0087557 on Mar. 30, 2017, 9 pages.

(56) References Cited

OTHER PUBLICATIONS

Office Action dated Mar. 24, 2016 in U.S. Appl. No. 14/797,002, filed Jul. 10, 2015 and published as US 2017-0008001 on Jan. 12, 2017, 15 pages.
Office Action dated Mar. 27, 2014 in U.S. Appl. No. 13/773,505, filed Feb. 21, 2013 and published as US 2014-0234182 on Aug. 21, 2014, 10 pages.
Office Action dated Nov. 3, 2016 in U.S. Appl. No. 14/797,002, filed Jul. 10, 2015 and published as US 2017-0008001 on Jan. 12, 2017, 21 pages.
Office Action dated Oct. 2, 2013 in U.S. Appl. No. 29/385,452, filed Feb. 14, 2011, 9 pages.
Office Action dated Oct. 3, 2014 in U.S. Appl. No. 29/446,279, filed Feb. 21, 2013 and published as US 2016-0001292 on Jan. 7, 2016, 13 pages.
Office Action dated Oct. 3, 2019 in U.S. Appl. No. 15/374,255, filed Dec. 9, 2016 and published as US 2017-0087557 on Mar. 30, 2017, 9 pages.
Office Action dated Oct. 7, 2010 in U.S. Appl. No. 29/357,908, filed Mar. 18, 2010, 6 pages.
Office Action dated Oct. 14, 2014 in U.S. Appl. No. 13/773,505, filed Feb. 21, 2013 and published as US 2014-0234182 on Aug. 21, 2014, 7 pages.
Office Action dated Sep. 1, 2017 in U.S. Appl. No. 15/374,255, filed Dec. 9, 2016 and published as US 2017-0087557 on Mar. 30, 2017, 12 pages.
Office Action dated Sep. 12, 2012 in U.S. Appl. No. 13/050,780, filed Mar. 17, 2011 and published as US-2011-0236278 on Sep. 29, 2011, 10 pages.
Office Action dated Sep. 20, 2019 in U.S. Appl. No. 14/769,434, filed Aug. 20, 2015 and published as US 2016-0001292 on Jan. 7, 2016, 10 pages.
Office Action dated Sep. 21, 2017 in U.S. Appl. No. 14/769,434, filed Aug. 20, 2015 and published as US 2016-0001292 on Jan. 7, 2016, 7 pages.
Office Action dated Sep. 27, 2016 in U.S. Appl. No. 13/050,780, filed Mar. 17, 2011 and published as US-2011-0236278 on Sep. 29, 2011, 8 pages.

* cited by examiner

PIPETTE TIP RACK

RELATED PATENT APPLICATIONS

This patent application is a continuation of U.S. patent application Ser. No. 14/769,434, filed on Aug. 20, 2015, entitled PIPETTE TIP RACK, naming Arta Motadel, Phillip Chad Hairfield and Peter Paul Blaszcak as inventors, which is a U.S.C. 371 national phase patent application of PCT/US2014/017409, filed on Feb. 20, 2014, entitled PIPETTE TIP RACK, naming Arta Motadel, Phillip Chad Hairfield and Peter Paul Blaszcak as inventors, which is a continuation of U.S. patent application Ser. No. 13/773,505, filed on Feb. 21, 2013, now U.S. Pat. No. 9,108,201, entitled PIPETTE TIP RACK, naming Arta Motadel, Phillip Chad Hairfield and Peter Paul Blaszcak as inventors. This patent application is also related to U.S. patent application Ser. No. 29/446,279 filed on Feb. 21, 2013, now design patent No. D724,236, entitled PIPETTE TIP RACK ASSEMBLY, naming Arta Motadel, Phillip Chad Hairfield and Peter Paul Blaszcak as inventors. The entire content of the foregoing application is incorporated herein by reference, including all text, tables and drawings.

FIELD

The technology relates in part to a single-walled pipette tip rack and a partial single-walled pipette tip rack configured for automated fluid dispensing, which can be used in biotechnology applications.

BACKGROUND

Pipette tips are utilized in a variety of industries that have a requirement for handling fluids, and are used in facilities including medical laboratories and research laboratories, for example. In many instances pipette tips are used in large numbers, and often are utilized for processing many samples and/or adding many reagents to samples, for example.

Pipette tips often are substantially cone-shaped with an aperture at one end that can engage a dispensing device, and another relatively smaller aperture at the other end that can receive and emit fluid. Pipette tips generally are manufactured from a moldable plastic, such as polypropylene, for example. Pipette tips are made in a number of sizes to allow for accurate and reproducible liquid handling for volumes ranging from nanoliters to milliliters.

Pipette tips can be utilized in conjunction with a variety of dispensing devices, including manual dispensers (e.g., pipettors) and automated dispensers (e.g., automated liquid handling devices & systems, e.g., liquid dispensing robotic machines). A dispenser is a device that, when attached to the upper end of a pipette tip (the larger opening end), applies negative pressure to acquire fluids, and applies positive pressure to dispense fluids. The combination then can be used to manipulate liquid samples. The upper end of a pipette tip is attached to the lower or distal portion of a dispenser (typically referred to as the barrel or nozzle) when the distal portion of the dispenser is placed in contact with the upper end of the pipette tip and a downward compressive pressure is applied.

Pipette tips often are shipped, stored and presented to a user or dispenser in a rack. A rack often includes a tray, a base and a lid. The tray, or plate, generally includes bores through which pipette tips are inserted partially. A lid sometimes is attached to a rack by a hinge, and a user generally swings the lid open to access pipette tips in the rack for use.

SUMMARY

Provided herein, in some aspects, is a single-walled pipette tip rack base, comprising a bottom and base sidewalls where each of which base sidewalls comprises an exterior sidewall surface, an interior sidewall surface, and one or more buttresses, each of which buttresses is bossed and projects from an exterior sidewall surface and which base is configured for use in an automated liquid dispensing device. In some aspects the pipette tip rack base comprises flanges, where the flanges are integrated with a sidewall and a buttress and comprise a proximal surface and a distal surface. Sometimes each of the flanges are integrated with two buttresses. In certain embodiments the two buttresses are on one base sidewall. Sometimes the buttresses are on adjoining base sidewalls. In some aspects the flanges are not integrated with a buttress face interior. In some aspects the pipette tip rack base comprises a footprint and sometimes the outside dimension of the footprint has a length of 127.76 mm±0.5 mm and a width of 85.48 mm±0.5 mm. Sometimes the base comprises four base sidewalls and sometimes any one base sidewall is not flat. In certain embodiments, the base sidewalls comprise two opposing short sidewalls and two opposing long sidewalls and each of the short sidewalls is joined to each of the long sidewalls at a junction comprising a flange and a lip. Sometimes the base sidewalls taper inward towards the bottom. Sometimes the base sidewalls are perpendicular to the bottom.

In some aspects there is a total of four or more buttresses in the base. Sometimes there is a total of eight buttresses in the base and sometimes each base sidewall comprises two buttresses. In certain embodiments, each of the buttresses comprises a buttress face, two opposing buttress sidewalls and a buttress bottom and sometimes each of the two opposing buttress sidewalls comprises a buttress sidewall interior surface and a buttress sidewall exterior surface.

In some aspects, provided is a pipette tip rack tray, comprising a plate, tray sidewalls and a tray flange, which plate comprises a proximal plate surface, a distal plate surface, and a plurality of plate bores, each of which plate bores is configured to receive a pipette tip. Sometimes tray sidewalls project from the distal plate surface and a tray flange extends from one or more of the tray sidewalls and comprises a proximal ledge and a distal rim. In some aspects a tray comprises a plurality of annular members projecting from the distal surface of the plate, wherein each annular member comprises a first bore concentric with a plate bore. Sometimes the plate bore and first bore have substantially the same inner diameter. Sometimes each annular member comprises a second bore, distal to and concentric with the first bore, wherein the second bore is of a smaller inner diameter than the first bore. In some aspects each annular member comprises a first member having an outer diameter greater than the outer diameter of a second member. In some aspects a tray comprises one or more interior ribs, each of which interior ribs is integrated with a first annular member and a second annular member adjacent to the first annular member, or is integrated with a first annular member and one of the tray sidewalls. Sometimes each annular member is integrated with four interior ribs and sometimes an interior rib is integrated with the distal tray surface. In some aspects a tray comprises a tray connector configured to engage a connector on a pipette tip rack base.

In some aspects, provided is a pipette tip rack comprising a tray and a base comprising a bottom, and base sidewalls, which base sidewalls comprise an exterior sidewall surface, an interior sidewall surface, and buttresses, each which buttresses is bossed and projects from an exterior sidewall surface, which base is configured for use in an automated liquid dispensing device and which base is configured to affix to the tray. Sometimes the pipette tip rack further comprises a lid.

Also provided herein, in some aspects, is a method, comprising providing a pipette tip rack as described herein, and loading the rack with one or more pipette tips, wherein the one or more pipette tips are disposed within the plate bores of the tray. Sometimes the method comprises removing the one or more pipette tips from the rack. Sometimes the one or more pipette tips are removed from the rack with an automated pipetting device.

Provided also herein, in some aspects, is a method, comprising providing a single-walled pipette tip rack base as described herein, and transferring a fluid into wells from the base to another location. Sometimes the fluid is transferred by an automated pipetting device. Sometimes the method comprises transferring a fluid to or from one or more wells of the base wherein the fluid is contained with the base sidewalls.

Also provided herein, in some aspects, is a method, comprising providing an injection mold comprising a void configured to the shape of the pipette tip rack base, tray or lid as described herein, feeding a heated, moldable polymer plastic material into a heated barrel wherein the plastic is forced into the mold cavity, cooling the plastic where the plastic hardens and forming a plastic rack base, tray or lid, separating the mold portions and ejecting the plastic pipette tip rack base, tray or lid.

Provided also herein, in some aspects, is a mold for a single-walled pipette tip rack base, tray or lid as described herein comprising a mold cavity, where the mold cavity is configured to the shape of the pipette tip rack base, tray or lid, and where the mold cavity is configured for receiving a heated, moldable polymer plastic material from a heated barrel and wherein the heated, moldable polymer plastic is forced into the mold cavity, and the mold comprises two or more mold portions that can be separated and configured to eject the plastic pipette tip rack base, tray or lid after the plastic is cooled and hardens thereby forming a plastic pipette tip rack base, tray or lid.

Also provided, in some aspects, is a partial single-walled pipette tip rack base, comprising (a) a bottom and one or more base sidewalls, each of which base sidewalls comprises an exterior sidewall surface and an interior sidewall surface, where the base bottom and the one or more base sidewalls are of single-walled construction, and (b) one or more posts comprising a double-walled construction, where each post comprises a post inner wall, a post outer wall, and a void between the post inner wall and the post outer wall, and which base is configured for use in an automated liquid dispensing device.

Certain embodiments are described further in the following description, examples, claims and drawings.

BRIEF DESCRIPTION OF THE DRAWINGS

The drawings illustrate embodiments of the technology and are not limiting. For clarity and ease of illustration, the drawings are not made to scale and, in some instances, various aspects may be shown exaggerated or enlarged to facilitate an understanding of particular embodiments.

FIG. 10B shows an embodiment of a bottom interior surface of the base shown in FIG. 10A.

DETAILED DESCRIPTION

Figure 1:
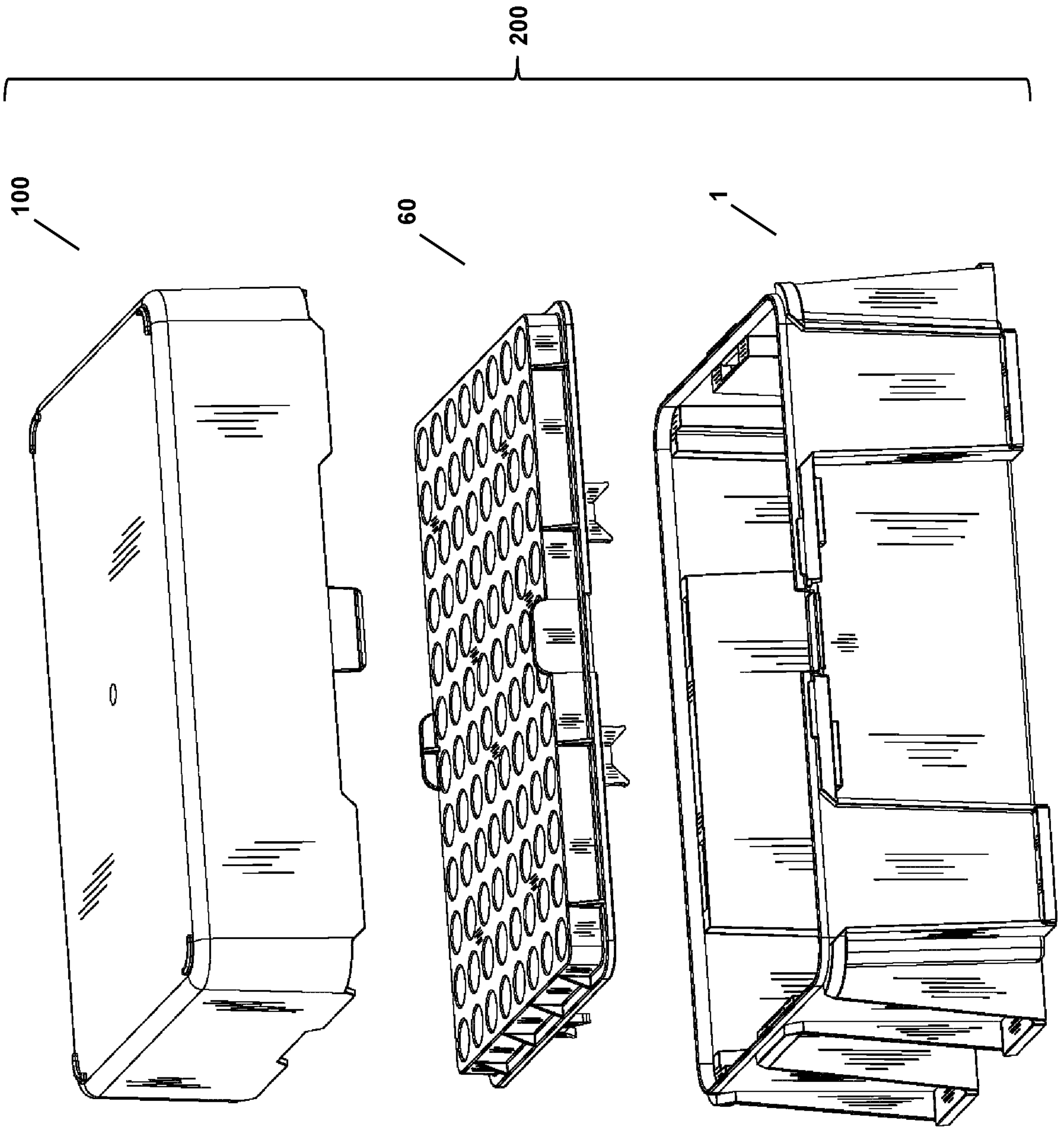
FIG. 1 shows a front exploded, perspective view of a single-walled pipette tip rack assembly 200 showing a lid 100, tray 60 and an embodiment of a base 1.
Figure 2:
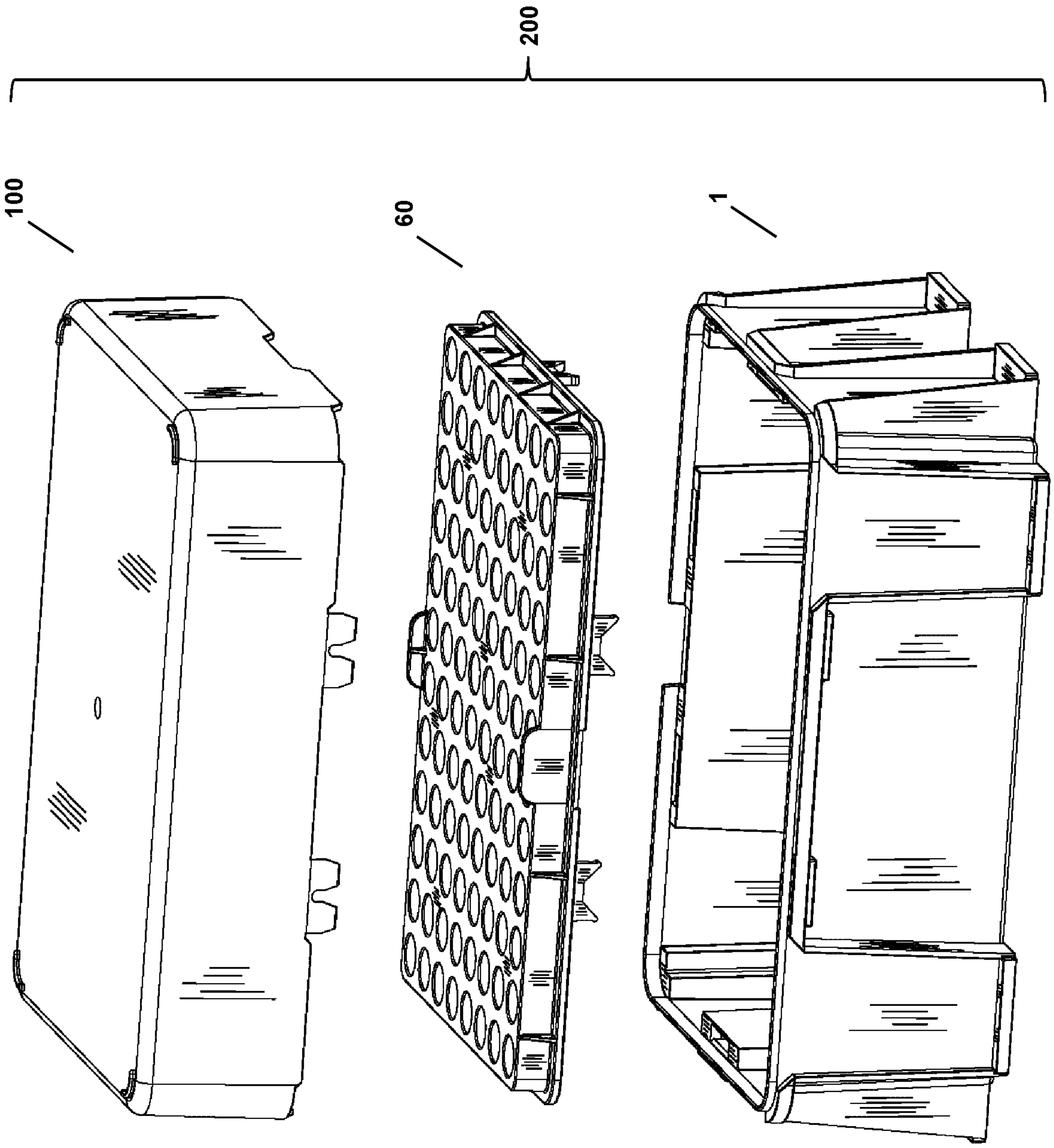
FIG. 2 shows a back exploded, perspective view thereof.
Figure 3:
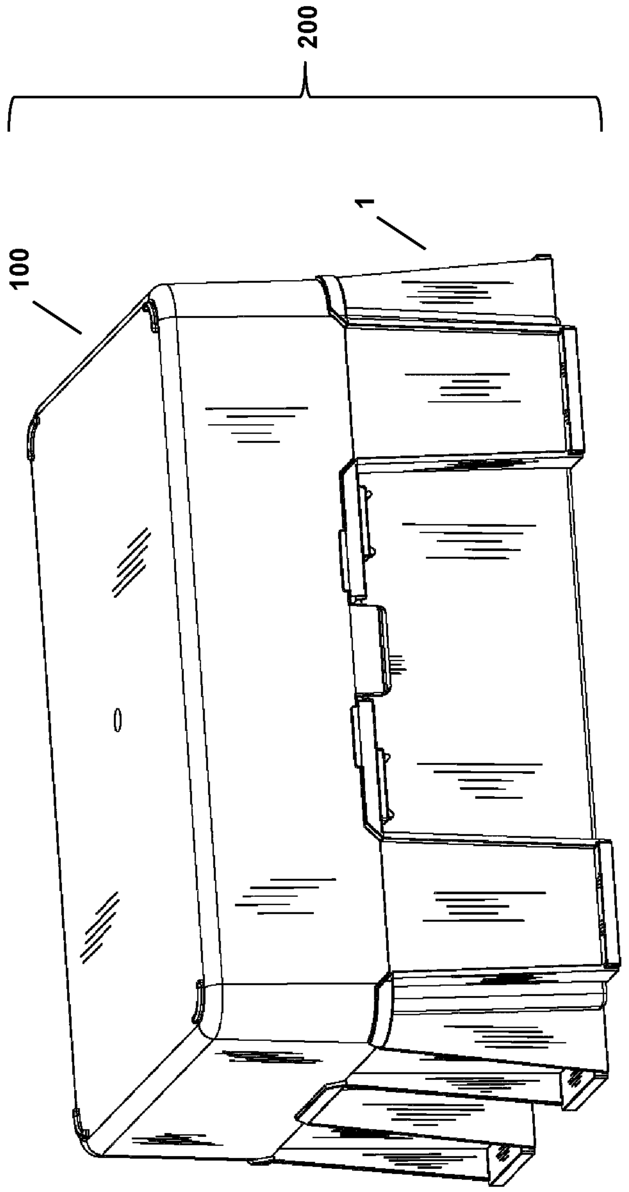
FIG. 3 shows a front, perspective view thereof of an assembled single-walled pipette tip rack assembly showing a lid and a base.
Figure 4:
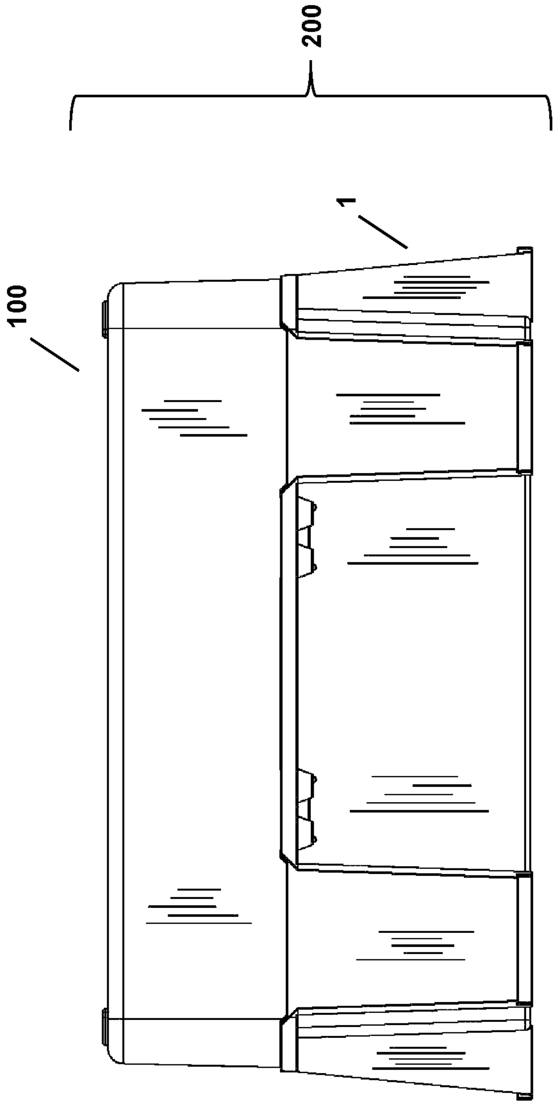
FIG. 4 shows a back view thereof.
Figure 5:
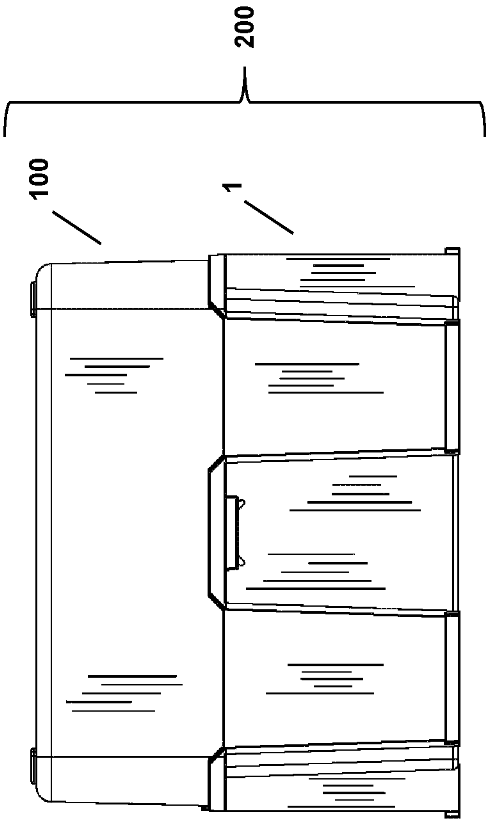
FIG. 5 shows a short side view thereof.
Figure 6:
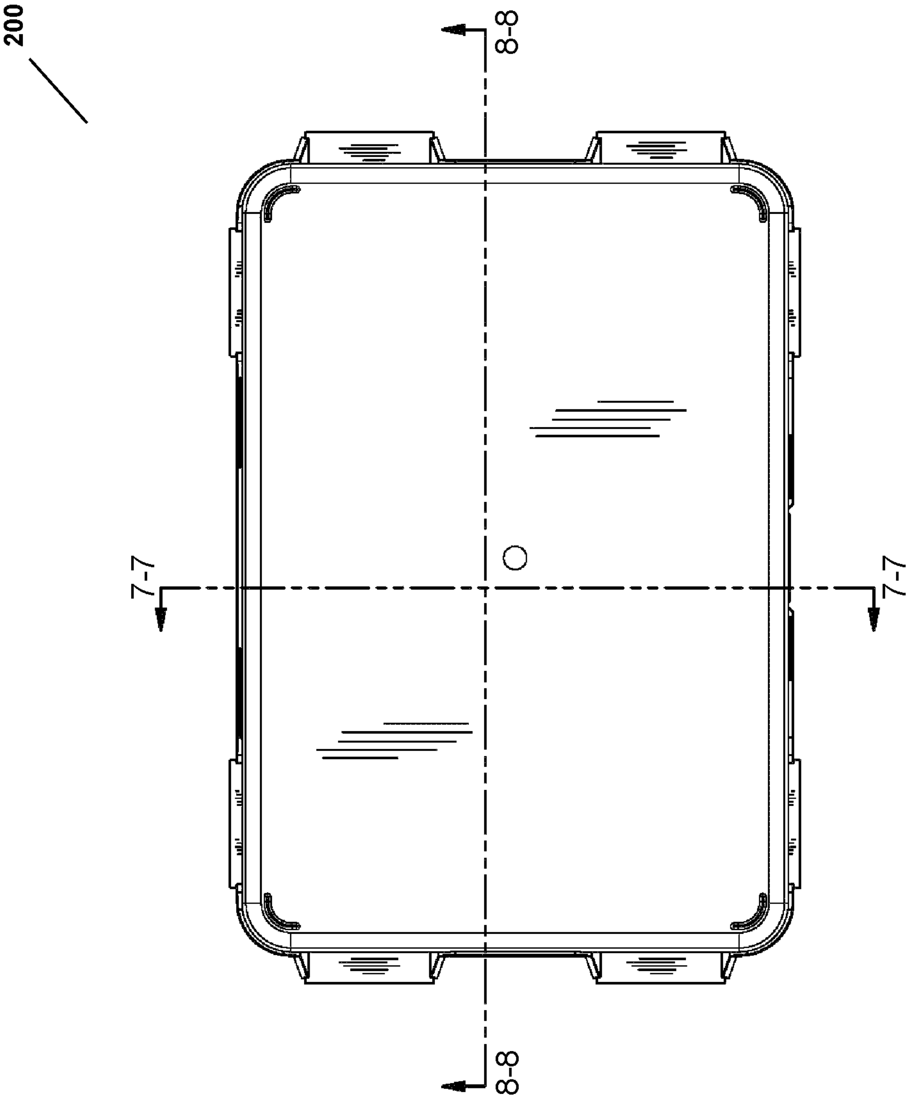
FIG. 6 shows a top view thereof.
Figure 7:
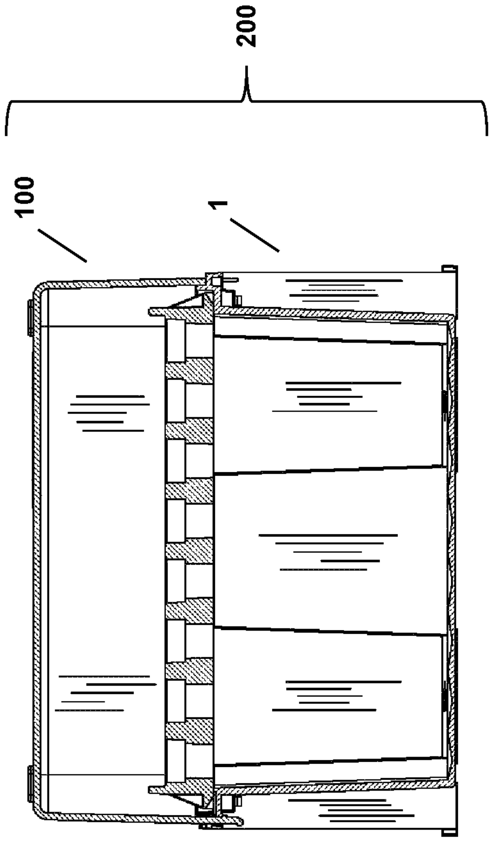
FIG. 7 shows a short side, sectional view of the single-walled pipette tip rack assembly shown in FIG. 6.
Figure 8:
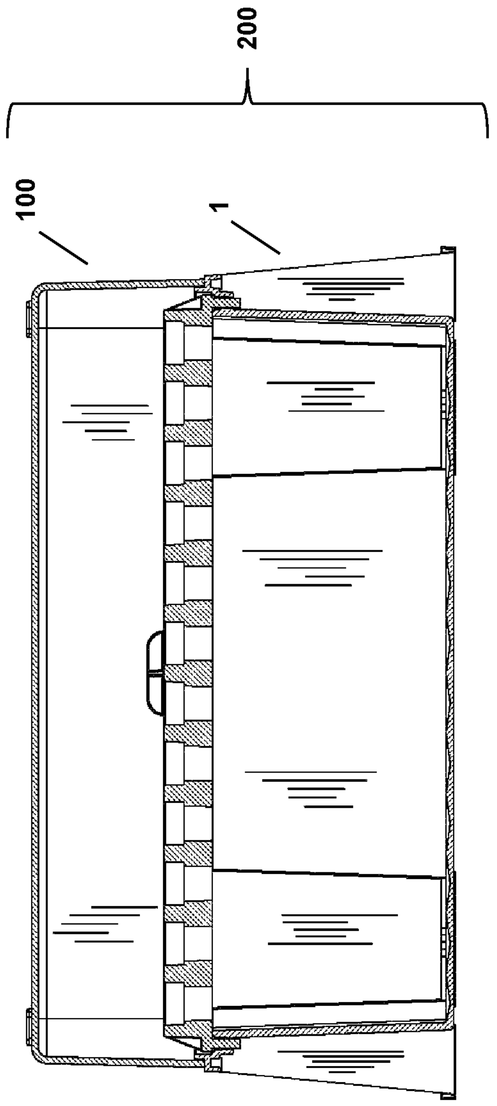
FIG. 8 shows a long side, sectional view of the single-walled pipette tip rack assembly shown in FIG. 6.
Figure 9:
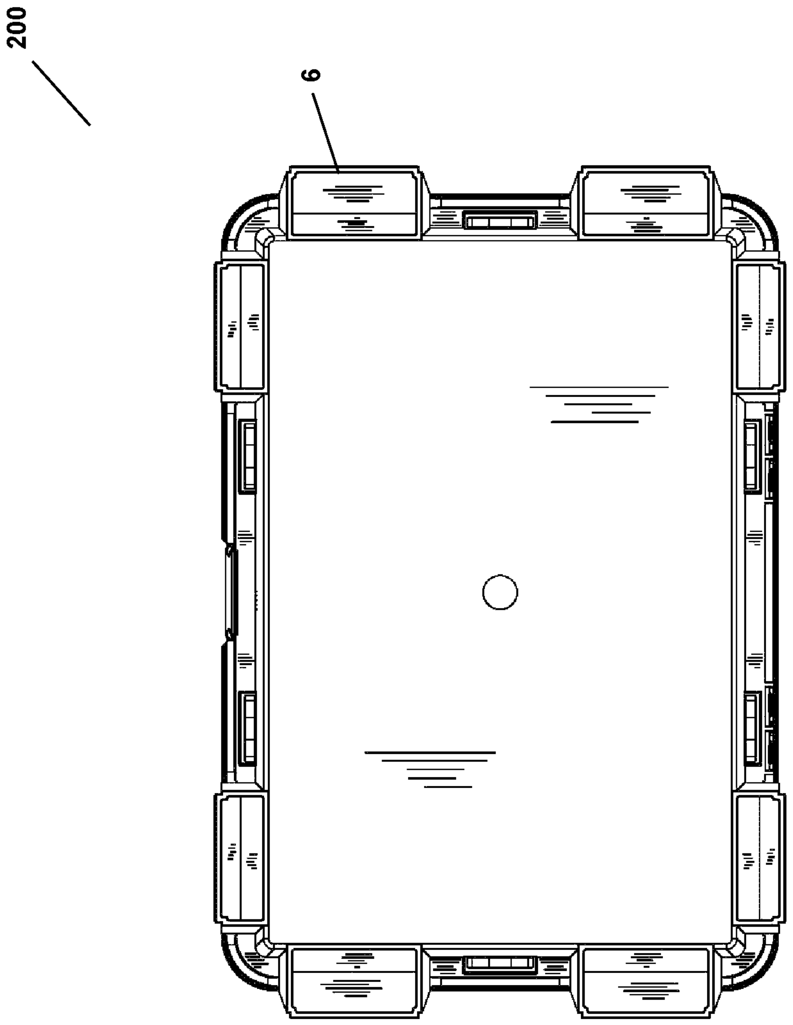
FIG. 9 shows a bottom view of a single-walled pipette tip rack assembly.

Pipette tip racks often are designed to withstand considerable compression forces generated by the downward motion of an automated liquid handling device when engaging pipette tips. The walls of pipette tip rack bases often are of double-walled construction to withstand these compression forces. Such double-walled rack bases are contrasted with single-wall and partial single-wall pipette tip rack bases provided herein.

Provided herein, in certain embodiments, is a single-walled pipette tip rack (e.g., a pipette tip rack assembly) comprising one or more of the following features: (i) a single-walled pipette tip rack base (e.g., 1, 201, 301) having support members and/or buttresses, (ii) a tray (e.g., 60), sometimes configured for removable attachment to a base and configured to releasably house one or more pipette tips, often disposed of in an array, (iii) a lid 100, sometimes comprising members (e.g., a hinge and/or a clasp) configured to reversibly attach the lid to the rack and allow the lid to pivot (e.g., open and close) while attached to the base and (ii) sometimes an array of pipette tips. An array of pipette tips is often not shown in the drawings for clarity of illustration. In certain embodiments, provided herein is a partial single-walled pipette tip rack (e.g., a pipette tip rack base and/or rack assembly) comprising walls of single-walled construction and one or more double-walled posts. Such single-walled and partial single-walled pipette tip racks confer multiple advantages. For example, rack components that are single-walled can require less plastic for manufacture and sometimes are more compact than racks having two or more walls (e.g., double walls). These features can impart advantages in packing and shipping, for example. In certain embodiments, support elements incorporated into a rack base (e.g., support members and/or buttresses) add strength and rigidity to a single-walled base that might otherwise be unstable and/or lack compression strength. In certain embodiments a partial singled-walled rack comprises rack components that are double walled and configured to add additional strength and rigidity to a partial single-walled base. Also, rack embodiments that include connectors that reversibly secure a lid and/or tray to the rack allow the use of a rack base with or without a lid and/or tray. For example, a single walled rack base, in some embodiments can comprise additional features (e.g., shallow wells and ridges) and can be used as a basin for dispensing fluids. Further, single-walled rack components that include connectors (e.g., reversible connectors) as described herein can be manufactured more cost-effectively. Connectors on a base, tray and/or lid configured for disengagement of a tray and/or lid from a base can also facilitate recycling of rack component materials and repurpose of a base for fluid dispensing, in some embodiments. Other advantageous features of the technology are described hereafter.

Base

Certain features of a base embodiment are illustrates, in part, in FIGS. 1-19, FIGS. 37A-45 and FIGS. 46-49. Sometimes a base comprises a proximal portion (e.g., 24, 224, 324) and a distal portion (e.g., 26, 226, 326). In certain embodiments a base comprises base sidewalls (e.g., 18, 118, 218, 20, 220 or 320). In certain embodiments a base 1 comprises four side walls arranged in a substantially rectangular shape and a bottom (e.g., 2, 202, 302) substantially coextensive with the base sidewalls. In some embodiments the four sidewalls are coextensive and secured to a bottom thereby forming an open box-like configuration (e.g., a box with 4 sides, a bottom and no top). Sometimes a sidewall and/or a bottom of a base is substantially rectangular in shape. A sidewall often comprises an interior surface (e.g., 18B, 218B, 318B, 20B, 220B, 320B) and an exterior surface (e.g., 18A, 218A, 318A, 20A, 220A, 320A). In some embodiments a base comprises two opposing long sidewalls (e.g., 18, 218, 318) and two opposing short sidewalls (e.g., 20, 220, 320). Sometimes a base sidewall and/or base bottom is substantially flat and/or substantially planar. Sometimes a base sidewall and/or base bottom comprises ribs (e.g., interior ribs or supports, exterior ribs or supports). Sometimes a base sidewall and/or base bottom comprises no ribs (e.g., interior ribs or supports, exterior ribs or supports).

The term substantially planar means that a surface lies in a plane and that some portions of the surface, (e.g., less than about 20%, less than about 15%, less than about 10%, less than about 5%, less than about 4%, less than about 3%, less than about 2% or less than about 1% of the surface) may lie outside of a plane. The term substantially flat means that a surface is flat and may comprise some imperfections and/or deviations. For example a surface that is substantially flat may comprise bumps, texture, embossed indicia, divots, a slight bow, a slight curve, the like or combinations thereof. Sometimes a surface that is substantially flat may comprise a slight bow comprising an arc with a height of about 1 mm or less.

Sometimes a base sidewall and/or a base bottom is not flat. For example sometimes a base sidewall and/or a base bottom comprises ribs (e.g., interior ribs, supports). Sometimes a base sidewall and/or a base bottom is textured or comprises projections (e.g. ridges, grips, knobs, wells, bumps, steps). In certain embodiments a base sidewall and/or a base bottom comprises a curve or a bow, (e.g., a convex or concave bow). For example a base sidewall comprising a curve or bow may have an arc with a height of about 1 mm or more. Sometimes a base sidewall and/or a base bottom comprising a curve or bow may have an arc with a maximum displacement of about 1 mm to about 10 mm, about 1 mm to about 5 mm, or about 1 mm to about 3 mm. Sometimes a base sidewall and/or a base bottom comprising a curve or bow may have an arc with a maximum displacement of about 1, 1.5, 2, 2.5 or 3 mm.

In some embodiments one or more sidewalls of a base are perpendicular to the base bottom. In certain embodiments a base sidewall is not perpendicular to a base bottom. In some embodiments a base sidewall is oriented at an angle from about 70 to about 110 degrees relative to a base bottom. Sometimes a base sidewall is oriented at an angle from about 80 to about 100, or about 85 to about 95 degrees relative to a base bottom. Sometimes a base sidewall is oriented at an angle of about 85, 86, 87, 88, 89, 90, 91, 92, 93, 94 or 95 degrees relative to a base bottom. In certain embodiments one or more sidewalls of a base taper. Sometimes a base sidewall tapers inward towards the base bottom where two opposing side walls are farther apart at their proximal edge than they are at their distal edge. Sometimes a base sidewall tapers out towards the base bottom where two opposing side walls are farther apart at their distal edge than they are at their proximal edge.

An automated liquid handling device can apply a substantial amount of compressive pressure (e.g., downward compression) to a pipette tip rack. In some embodiments, a pipette tip rack or components thereof (e.g., a pipette tip base and/or a base and tray), as disclosed herein, are configured to withstand a compressive pressure equal to and/or greater than a compressive pressure applied to a pipette tip rack by a liquid handling device (e.g., a manual or automated device) under normal operating conditions. In some embodiments a pipette tip rack or components thereof (e.g., a pipette tip base and/or a base and tray) withstand a substantial amount of downward compression. The term "withstands" means remains undamaged and/or substantially unaffected by. A substantial amount of downward compression is sometimes equal to or less than about 10 pounds per square inch (PSI) to about 120 PSI. A substantial amount of downward compression is sometimes equal to or less than about 20, 30, 40, 50, 60, 70, 80, 90 or 100 PSI.

Base Bottom

In some embodiments a base is configured to contain a liquid. In some embodiments a base is a basin. In some embodiments a base bottom and base sidewalls are sealed and can contain a liquid (e.g., without leaking). In some embodiments a bottom interior surface (e.g., 52, 252, 352) of a base bottom comprises features (e.g., wells, shallow wells, depressions, ridges) that can be used to assist in fluid handling (e.g., fluid transport and dispensing (e.g., by an automated fluid handling device)). Features of a base bottom (e.g., wells) can be configured to direct small volumes of liquid to regions of a base bottom where the liquid can be efficiently removed from the basin by a fixed configuration of pipette tips (e.g., an array of pipette tips). For example, features of a base bottom (e.g., wells) can minimize waste of small volume of residual liquid that would otherwise not accessible to an array of pipette tips for removal from a base. In some embodiments a base bottom comprises wells (e.g., 54, 254, 354 (e.g., shallow wells)) arranged in a suitable array. A suitable array may comprise a suitable number of wells, non-limiting examples of which include 6, 24, 96 or 384 wells. In some embodiments a base comprises an 8×12 array with wells arranged at a distance of 9 mm (center point to center point) or a 16×24 array with wells arranged at a distance of 4.5 mm from each other (center point to center point).

In some embodiments a well is recessed in the base bottom interior surface. In some embodiments a well is a depression (e.g., a stepped, angled and/or a concave depression). A well is sometimes recessed by about 0.01 to about 2 mm. In some embodiments a bottom most point or surface of a well is recessed by about 0.01 to about 1 mm, 0.01 to about 0.5, or 0.01 to about 0.2 mm. Wells generally are configured to retain a fluid, and sometimes a well is configured to retain about 0.1 to about 1000 ul, about 0.1 to about 100 ul, about 0.1 to about 20 ul, about 0.1 to about 10 ul, about 0.1 to about 5 ul, about 0.1 ul to about 1 ul or about 0.1 to about 0.5 ul of fluid.

In some embodiments a bottom interior surface of a base bottom comprises one or more wells. A well can be any configuration (e.g., bowl shaped, cone shaped, reverse pyramidal, stepped, or the like). The top geometry of a well can be any suitable profile, non-limiting examples of which include a triangle, a polygon (e.g., square, a rectangular, a pentagon, a hexagon, heptagon, octagon, or the like, or combinations thereof), an oval, a circle, an ellipse, the like, or combinations thereof. The cross-sectional and/or side view geometry of a well can be any suitable profile, non-limiting examples of which include concave (e.g., u-shaped, u-bottom), rectangular (e.g., comprising sides and a bottom oriented at about a 90 degree angle), stepped (e.g., stair-stepped), v-shaped (e.g., v-bottom, e.g., a pointed bottom), v-shaped and stepped, the like or combinations thereof. The bottom most portion of a well can be any suitable configuration (e.g., flat, pointed, round).

In some embodiments a bottom interior surface of a base bottom and/or a well comprises walls or ridges. One or more walls or ridges sometimes surround the perimeter of a well. Sometimes a well in a base bottom is defined, in part, by one or more walls or ridges that enclose the well. Walls or ridges that surround a well can have any suitable top profile, non-limiting examples of which include a triangle, a polygon (e.g., square, a rectangular, a pentagon, a hexagon, heptagon, octagon, or the like, or combinations thereof), an oval, a circle, an ellipse, the like, or combinations thereof. The height of a wall or ridge can be from about 0.01 mm to about the height of a base side wall. Sometimes the height of a wall or ridge is from about 0.1 mm to about 4 cm, 0.1 to about 3 cm, 0.1 to about 2 cm, 0.1 to about 1 cm, 0.1 to about 5 mm or 0.1 to about 1 mm. In certain embodiments the height of a wall or ridge is about 0.1, 0.5, 1, 2, 3, 4 or about 5 mm.

In some embodiments multiple enclosed ridges of the same or different profiles define portions and/or features of a well (e.g. concentric circles, concentric rectangles, concentric squares or e.g., a large circle, a square inside the circle and a hexagon inside the square). In certain embodiments a well comprises two or more stepped recesses, often defined by two or more ridges. Two or more ridges that surround and/or define portions of a well sometimes progressively increase in size (e.g., in height, relative elevation (e.g., depth), perimeter, width, length and/or diameter) from the center point of a well to the outer most edge of a well. For example, a cone shaped well may comprise ridges configured in the shape of three concentric circles of different diameters, arranged at different elevations, spaced 1 mm apart and arranged with the largest diameter ridge defining the outer most perimeter of the well. In some embodiments a reverse pyramidal shaped well may comprise ridges configured in the shape of three concentric squares of different diameters, arranged at different elevations, spaced 1 mm apart and arranged with the largest diameter ridge defining the outer most perimeter of the well.

Base Buttress

In some embodiments a base sidewall comprises a buttress (e.g., 6, 206, 306). A buttress, without being limited to theory, often provides rigidity and/or strength (e.g., compressive strength, lateral strength) to a wall (e.g., a sidewall). In some embodiments a buttress reinforces a wall. Sometimes a buttress provides a point of engagement for an automated device. Sometimes a buttress is configured to engage an automated device. In some embodiments a base comprises 1 or more buttresses. In some embodiments a base comprises 4 to 16 buttresses. Sometimes a base comprises 1, 2, 3, 4, 5, 6, 7, 8, 9, 10, 11, 12, 13, 14, 15, 16, 17, 18, 19 or 20 buttresses. In some embodiments a base comprises 8 buttresses. In some embodiments a sidewall comprises one or more buttresses and sometimes 2 or more buttresses. In some embodiments a sidewall comprises one to four buttresses. Sometimes a sidewall comprises 1, 2, 3, 4, 5, 6, 7, 8, 9, 10, 11, or 12 buttresses. In certain embodiments a sidewall comprises 2 buttresses. In certain embodiments, a base comprises 8 buttresses where each sidewall of the base comprises 2 buttresses. Sometimes buttresses are on adjoining sidewalls and sometimes are at or near a wall junction (e.g., 22, 222, 322).

In some embodiments a base comprises one or more angled, setback, clasping, clamped, diagonal and/or French buttresses. In some embodiments a base comprises one or more clamped buttresses (e.g., 207). In some embodiments a base comprises 4 clamped buttresses (e.g., FIGS. 37A, 38, 39A, 42 and 45). In some embodiments a base comprises adjacent buttresses on adjoining sidewalls. In some embodiments adjacent buttresses on adjoining sidewalls are angled buttresses or setback buttresses. Sometimes adjacent buttresses on adjoining sidewalls are not clasping buttresses or clamped buttresses.

In some embodiments a buttress is bossed and projects from an exterior sidewall surface of a base. In certain embodiments a buttress comprises a buttress exterior face (e.g., 16, 216, 316), a buttress interior face (e.g., 16', 216', 316') and one or more buttress sidewalls (e.g., 30, 230, 330 (e.g., vertical supports). In certain embodiments, a buttress sidewall comprises a buttress sidewall interior surface (e.g., 30A, 230A, 330A), a buttress sidewall exterior surface (e.g., 30B, 230B, 330B) and/or a buttress sidewall edge (e.g., 30C, 230C, 330C).

In some embodiments a buttress comprises 1 or more buttress sidewalls 30. Sometimes a buttress comprises 2 sidewalls. Sometimes a buttress comprises two opposing sidewalls that are coextensive with and that flank a buttress face. In some embodiments a buttress comprises one or more exterior ribs that resemble a buttress sidewall and which project from a buttress exterior face. In some embodiments a buttress comprises 1, 2, 3, 4, 5, or 6 exterior ribs that resemble buttress sidewalls and project from a buttress exterior face.

Figure 13:
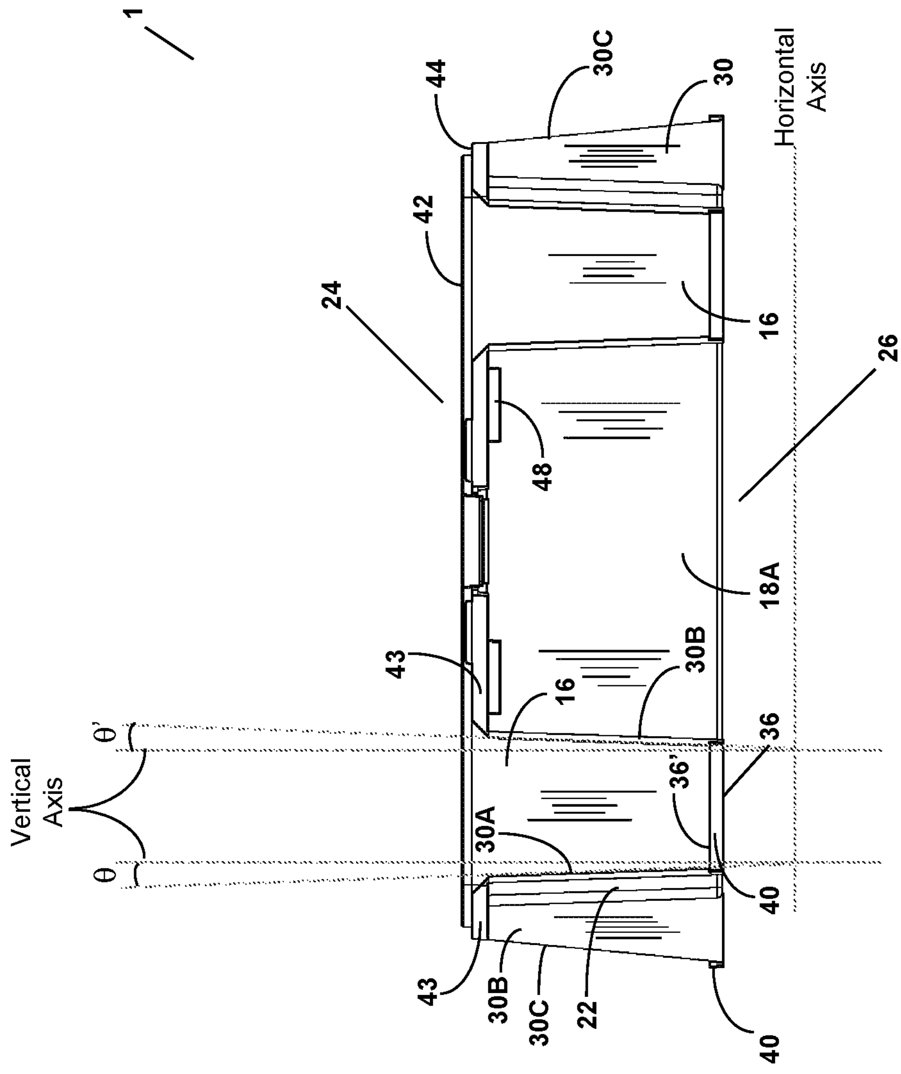
FIG. 13 shows a front, long side view thereof. A horizontal axis line is shown for reference that is parallel to the bottom plane of the base. Two vertical axis lines are shown for reference that are perpendicular to the horizontal axis line. Two dotted lines are shown, a part of which overlay the two opposing buttress side walls. Angle theta (0) is shown representing an angle between the dotted line and the vertical axis line, and illustrates the angle of the two opposing buttress side walls.
Figure 14:
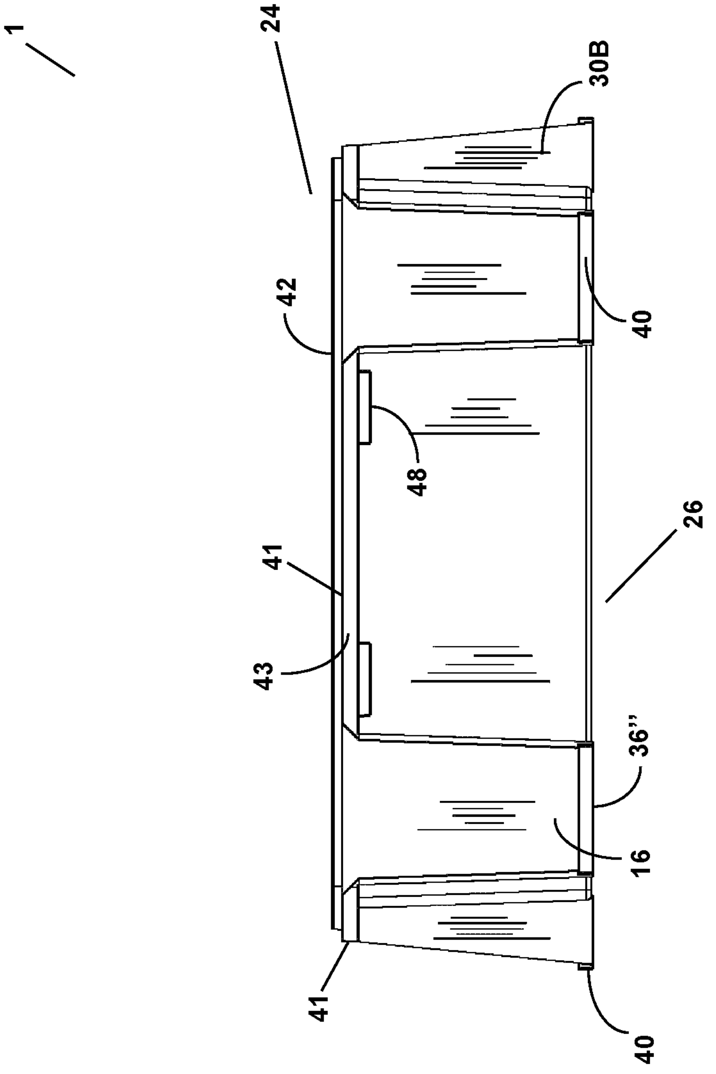
FIG. 14 shows a back, long side view thereof.
Figure 15:
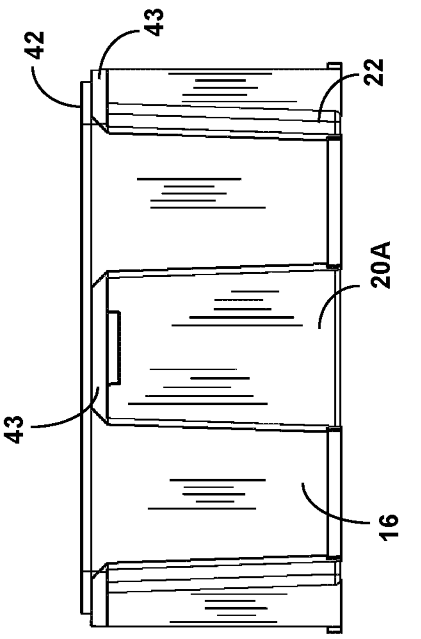
FIG. 15 shows a short side view thereof.
Figure 16:
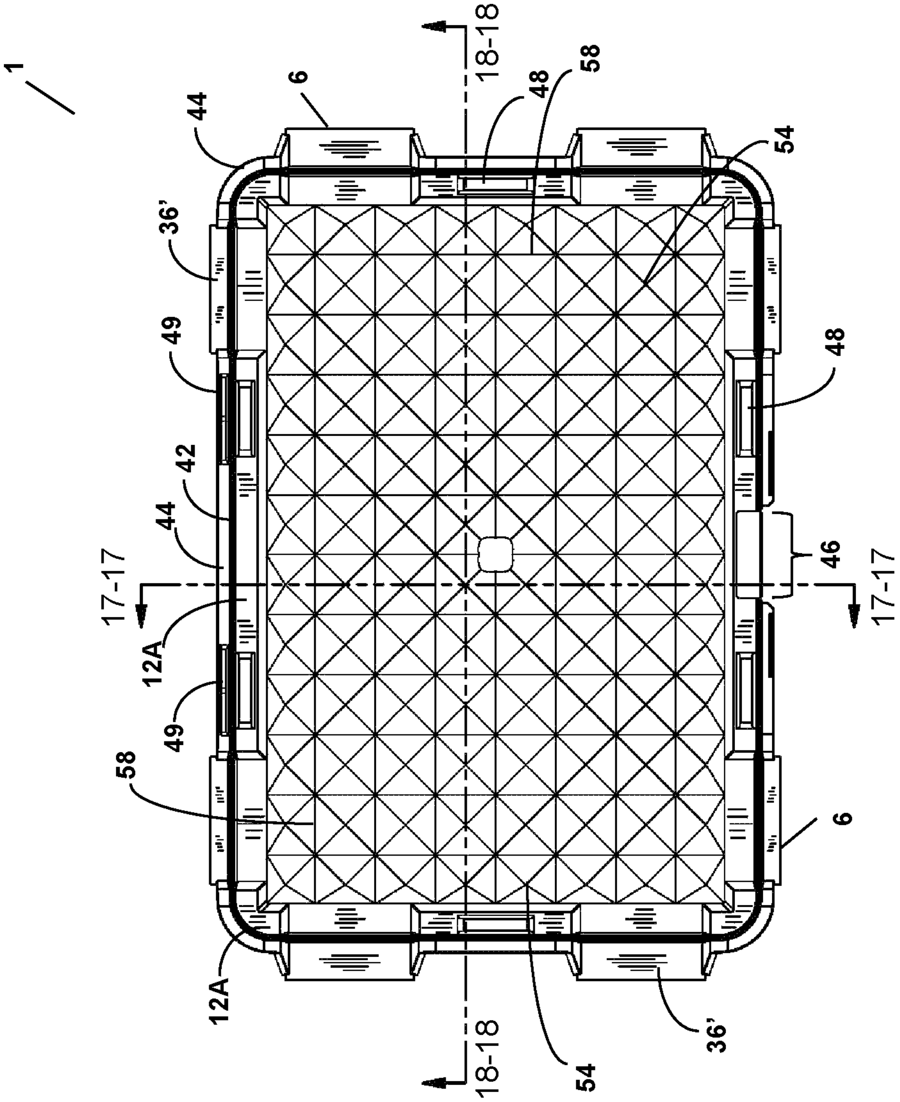
FIG. 16 shows a top view thereof.
Figure 17A:
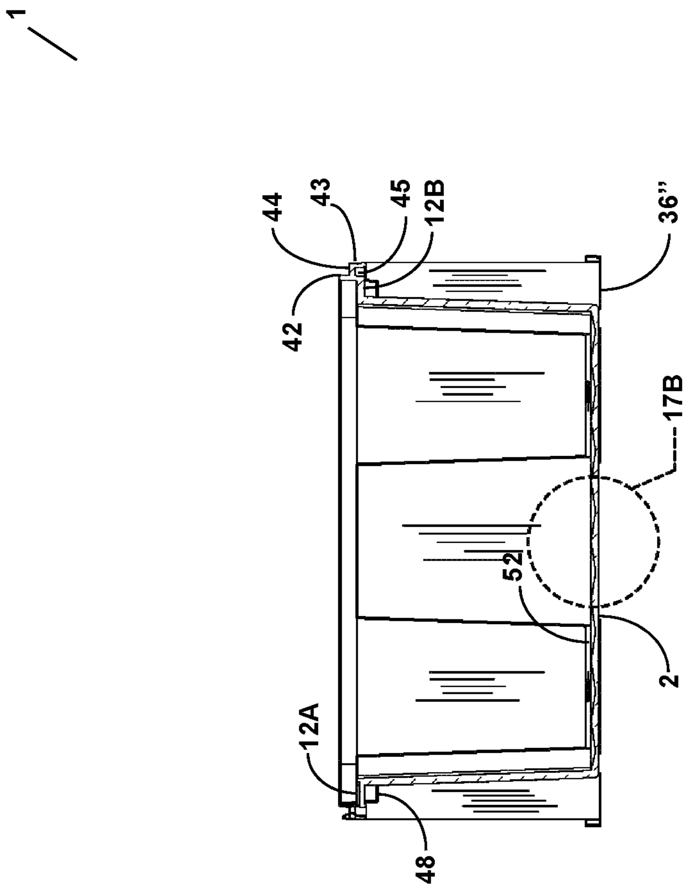
FIG. 17A shows a cross sectional view thereof as shown through line 17-17 of FIG. 16.
Figure 17B:
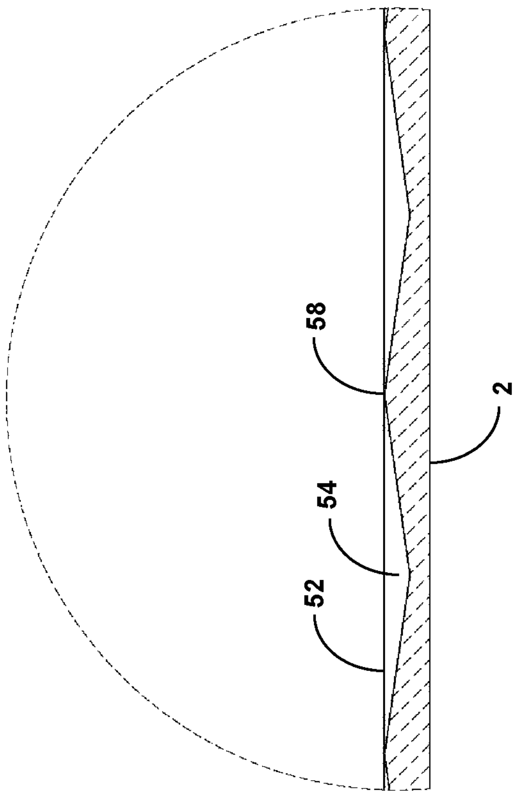
FIG. 17B shows an enlarged partial view of one embodiment of a bottom interior surface as shown in FIG. 17A.
Figure 18A:
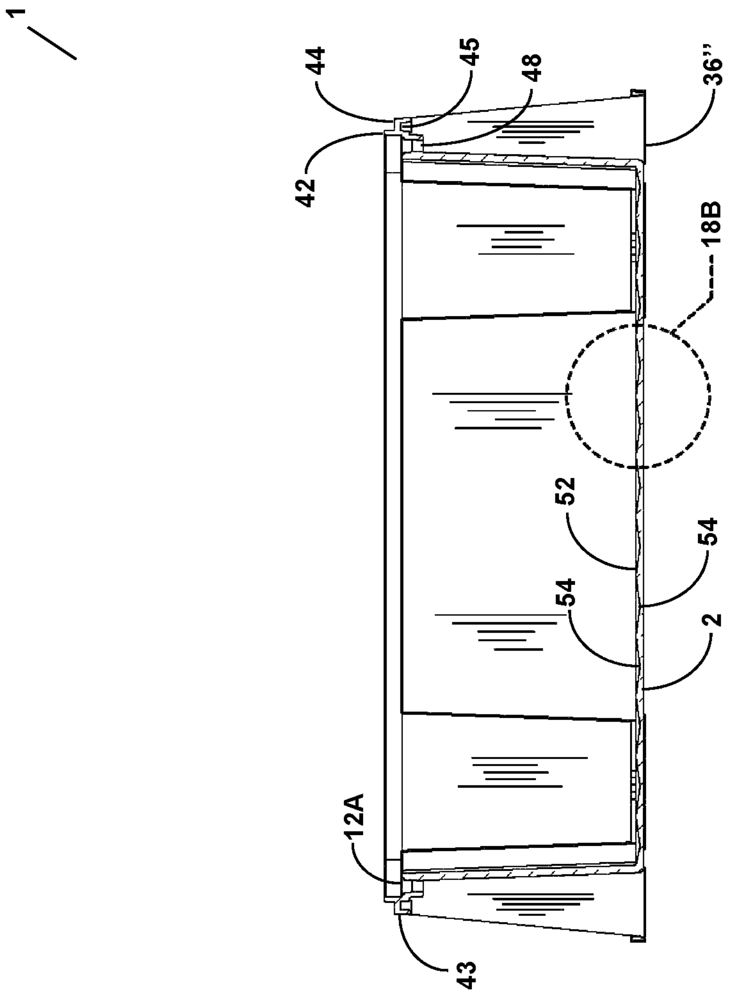
FIG. 18A shows a long side sectional view as shown through line 18-18 of FIG. 16.
Figure 18B:
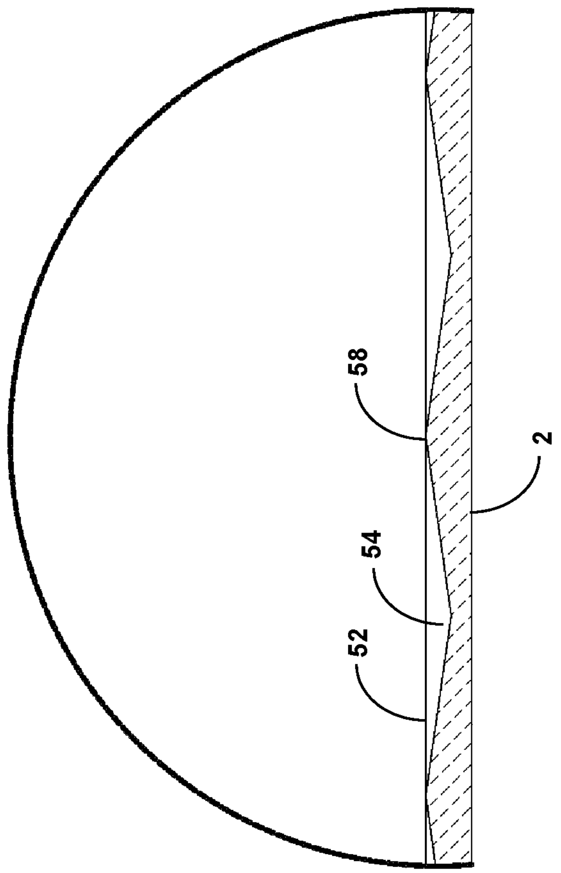
FIG. 18B shows an enlarged partial view of one embodiment of a bottom interior surface as shown in FIG. 18A.
Figure 19:
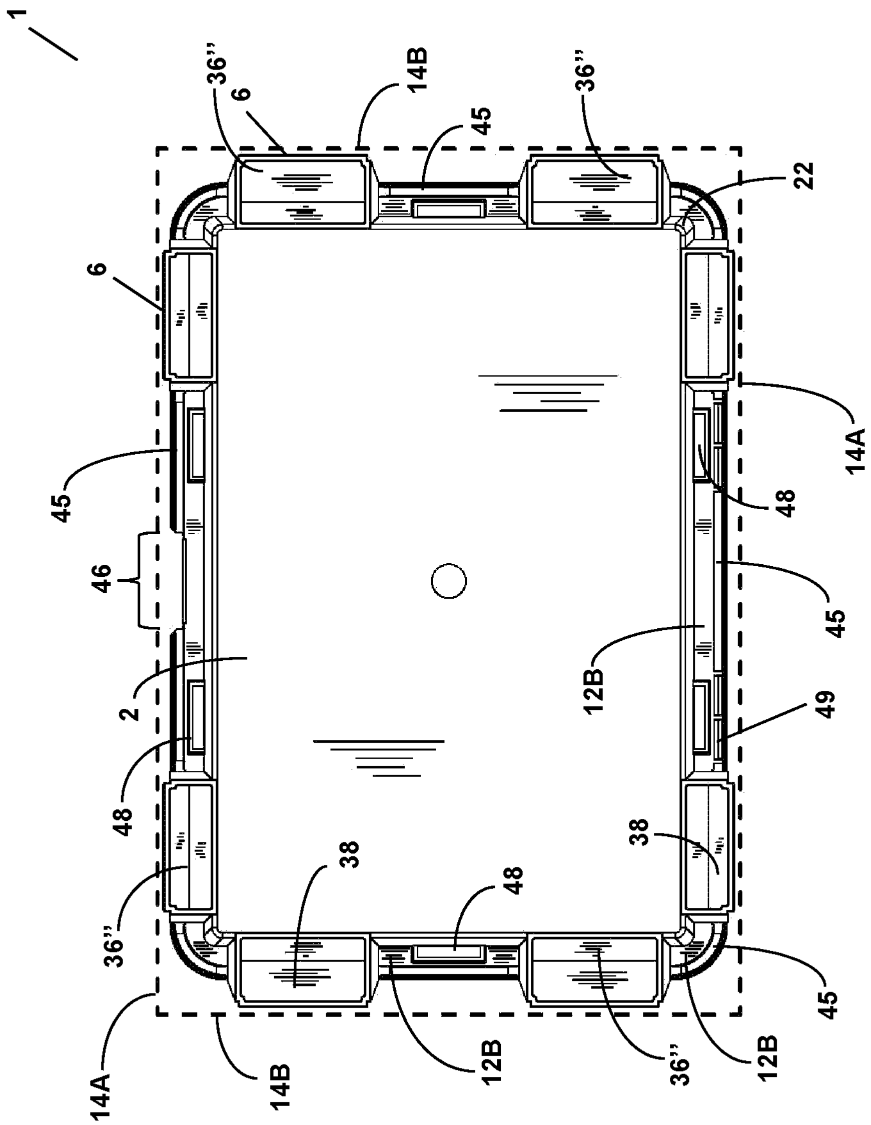
FIG. 19 shows a bottom view of the distal portion of the base shown in FIG. 11.
Figure 20:
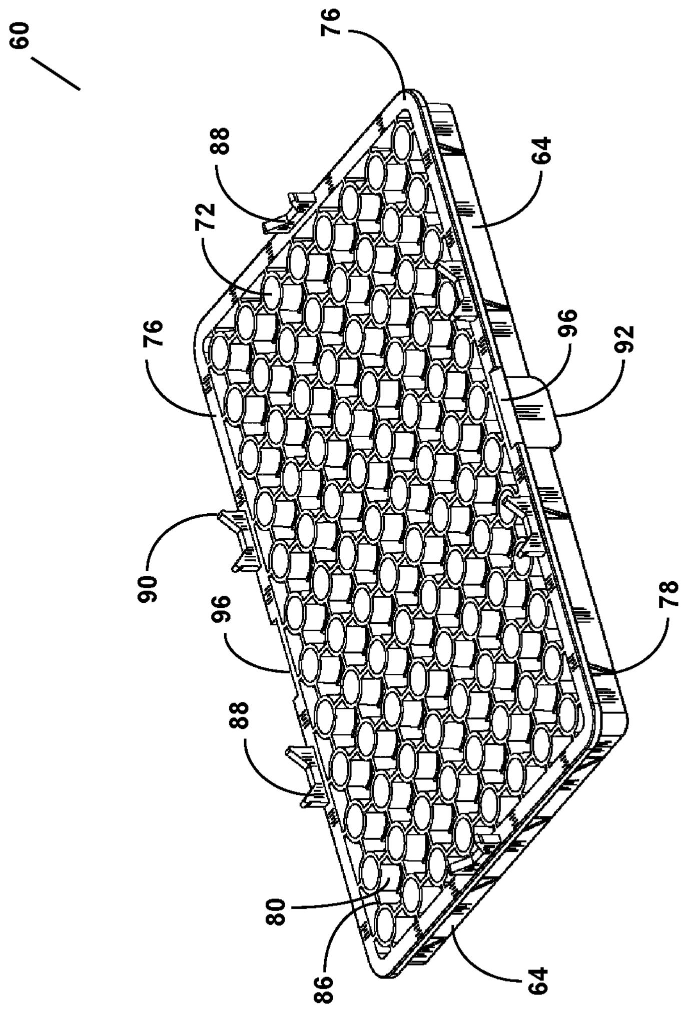
FIG. 20 shows a bottom perspective view of a tray.

In some embodiments a buttress sidewall is planar and/or substantially flat. Sometimes a buttress sidewall surface (e.g., interior surface) is perpendicular or about perpendicular to a buttress face (e.g., a buttress exterior face). Sometimes a buttress sidewall surface (e.g., interior surface, exterior surface) is perpendicular or about perpendicular to a base sidewall surface (e.g., base interior sidewall surface, exterior sidewall surface). In certain embodiments, a substantially planar surface (e.g., interior surface and/or exterior surface) of two or more buttress sidewalls (e.g., two opposing buttress sidewalls) of a buttress are parallel. In certain embodiments, the substantially planar surface (e.g., interior surface and/or exterior surface) of two or more buttress sidewalls (e.g., two opposing buttress sidewalls) of a buttress are not parallel. For example, sometimes the surface (e.g., interior surface and/or exterior surface) of two opposing buttress sidewalls of a buttress taper relative to each other. In certain embodiments two opposing buttress sidewalls of a buttress taper out so that the most distal portion of the two opposing buttress sidewall surfaces are farther apart than the most proximal portion of the two opposing buttress sidewall surfaces. In some embodiments two opposing buttress sidewalls of a buttress taper in (e.g., as illustrated in FIG. 13) so that the most proximal portion of the two opposing buttress sidewall surfaces are farther apart than the most distal portion of the two opposing buttress sidewall surfaces. In some embodiments two opposing sidewalls are disposed on an exterior sidewall of a base at an angle (e.g., angle θ in FIG. 13) relative to a vertical axis (e.g., the vertical axis shown in FIG. 13). Sometimes angle θ for two opposing sidewalls is equal in value. Sometimes angle θ for two opposing sidewalls of a buttress is not equal in value. In some embodiments angle θ (e.g., angle θ, FIG. 13) for two opposing sidewalls of a buttress is plus or minus about 0 to about 10 degrees. Sometimes angle θ (e.g., angle θ, FIG. 13) is plus or minus about 1 to about 5 degrees. Sometimes angle θ (e.g., angle θ, FIG. 13) is plus or minus about 1, 2, 3, 4, or about 5 degrees.

In some embodiments a buttress sidewall edge of a buttress results from a buttress sidewall projecting farther from a base sidewall than the buttress face. Sometimes a buttress sidewall edge results from a buttress exterior rib (e.g., an exterior rib or vertical support that resembles a buttress sidewall) projecting from the plane of a buttress exterior face. In certain embodiments, a first buttress sidewall edge is parallel to another buttress sidewall edge (e.g., a second, third, fourth, fifth, sixth, seventh and/or eighth edge) projecting from the same base sidewall. In some embodiments a buttress sidewall edge is not parallel to another buttress sidewall edge projecting from the same base sidewall. Sometimes a buttress sidewall edge is parallel or substantially parallel to the plane of a buttress face (e.g., a buttress face exterior) to which it is integrated. Sometimes a buttress sidewall edge tapers relative to an exterior surface of a base side wall and/or buttress face to which it is integrated. Sometimes a buttress sidewall edge tapers inward towards the base bottom. In some embodiments a buttress sidewall edge tapers towards the proximal portion of the base and is wider towards the distal portion of the base. Sometimes a buttress sidewall edge tapers outward towards the base bottom. In some embodiments a buttress sidewall edge tapers towards the distal portion of the base and is wider towards the proximal portion of the base.

In some embodiments a buttress sidewall edge is linear (e.g., substantially straight, e.g., from a most proximal point to a most distal point of the buttress edge). In certain embodiments a buttress sidewall edge is perpendicular or about perpendicular to a surface (e.g., substantially planar proximal surface, distal surface) of the bottom of a base. Sometimes a buttress sidewall edge is not perpendicular to a surface (e.g., substantially planar proximal surface, distal surface) of the bottom of a base. In some embodiments a buttress sidewall edge flares from the proximal portion of a base (e.g., from a lip) to the distal portion of a base (e.g., to a base bottom, to a buttress bottom). Sometimes the distal portion of a buttress edge is farther from a base sidewall (e.g., a sidewall to which it is integrated) than the proximal portion of the same buttress edge. Sometimes a buttress sidewall edge is not linear (e.g., not straight). In certain embodiments a buttress sidewall edge comprises a curve (e.g., a convex curve, a concave curve). For example, sometimes a buttress sidewall edge bows outward. Sometimes a buttress edge bows inward.

A buttress often comprises a buttress face comprising an interior surface and an exterior surface. In some embodiments a buttress face is substantially flat and/or substantially planar. Sometimes buttress face is not substantially flat and/or is not substantially planar. Sometimes a buttress face comprises a curve or bow. For example a buttress face comprising a bow may have an arc with a maximum displacement of about 1 mm or more. Sometimes a buttress face comprising a bow may have an arc with a maximum displacement of about 1 mm to about 10 mm, about 1 mm to about 5 mm, or about 1 mm to about 3 mm. Sometimes a buttress face comprising a bow may have an arc with a maximum displacement of about 1, 1.5, 2, 2.5 or 3 mm. In some embodiments a buttress face, or portion thereof, comprises a curve or a curved surface. For example sometimes a buttress face comprises a junction (e.g., junction 222 in FIG. 37A). A buttress comprising a junction is sometimes a clasping or clamped buttress. A buttress comprising a junction is sometimes a diagonal or French buttress. In some embodiments, where a buttress face comprises a junction, at least two portions of the buttress face are oriented at about 80 to about 100 degrees, about 85 to about 95, about 86 to about 94, about 87 to about 93, about 88 to about 92, about 89 to about 91, or about 90 degrees from each other. In some embodiments, where a buttress face comprises a junction, a buttress face comprises a curve with an arc of about 80 to about 100 degrees, about 85 to about 95, about 86 to about 94, about 87 to about 93, about 88 to about 92, about 89 to about 91, or about 90 degrees. In some embodiments, a curve of a buttress face comprises a radius of curvature of about 2 millimeters (mm) to about 10 mm, 2 mm to about 8 mm, 2 mm to about 6 mm or 2 mm to about 4 mm. In some embodiments, a clamped buttress comprises a first buttress sidewall integrated with a short sidewall of a base, and a second buttress sidewall integrated with a long sidewall of a base. In some embodiments a clamped buttress comprises opposing buttress sidewalls where the surface plane of the first opposing buttress sidewall is about perpendicular to the surface plane of the second opposing buttress sidewall.

In certain embodiments a buttress face is perpendicular or about perpendicular to a base bottom. About perpendicular means from about 85 to about 95 degrees. Sometimes about perpendicular means about 89 to about 91 degrees. Sometimes about perpendicular means 90 degrees or about 90 degrees. In certain embodiments a buttress face is not perpendicular to a base bottom. In some embodiments a buttress face is oriented at an angle from about 60 to about 120 degrees, about 60 to about 120 degrees, about 65 to about 115 degrees, about 70 to about 110 degrees, about 75 to about 105 degrees, about 80 to about 100 degrees, or about 85 to about 95 degrees relative to a base bottom (e.g., a distal surface of a base bottom, a substantially planar proximal surface of a base bottom). In some embodiments a buttress face is oriented at an angle from about 60 to about 90 degrees, about 65 to about 90 degrees, about 70 to about 90 degrees, about 75 to about 90 degrees, or about 85 to about 90 degrees relative to a base bottom (e.g., a distal surface of a base bottom, a substantially planar proximal surface of a base bottom). In some embodiments a buttress face flares from the proximal portion of a base (e.g., from a ridge) to the distal portion of a base (e.g., to a base bottom, to a buttress bottom). Sometimes the distal portion of a buttress face is farther from a base sidewall (e.g., a sidewall to which it is adjacent) than the proximal portion of the same buttress face.

In some embodiments a buttress face of a buttress is substantially coplanar with a base sidewall to which the buttress is integrated. The term coplanar as used herein means two or more planes are in the same plane. Substantially coplanar means coplanar, or about, near or close to coplanar. In some embodiments two surfaces that are substantially coplanar may deviate outside of the plane by up to about 0.1 to about 1 mm. Sometimes two or more surfaces that are substantially coplanar may deviate outside of the plane by about 0.1, 0.2, 0.3, 0.4, 0.5, 0.6, 0.7, 0.8, 0.9 or about 1 mm. In some embodiments a buttress face of a buttress is not coplanar with a base sidewall to which the buttress is integrated. In certain embodiments a buttress face is offset from a base sidewall to which it is integrated. Sometimes a buttress face is offset by about 0.1 to about 10 mm, about 0.1 to about 5 mm or about 0.1 to about 2 mm. Sometimes a buttress face is offset by about 0.5, 1, 2, 3, 4, 5, 6, 7, 8, 9 or about 10 mm.

In certain embodiments a buttress face (e.g., a substantially planar buttress face) is parallel or substantially parallel with a base sidewall (e.g., a substantially planar base sidewall) to which it is integrated. Substantially parallel means parallel, or about, near or close to parallel. In some embodiments two surfaces, two lines or a line and a surface that are substantially parallel may deviate from parallel by an angle of up to about 5 degrees. Sometimes two or more surfaces that are substantially coplanar may deviate from parallel by an angle up to about 0.5, 1, 1.5, 2, 2.5, 3, 3.5, 4, 4.5 or about 5 degrees. In some embodiments a buttress face is coplanar with and/or parallel to the buttress sidewall edge of a buttress sidewall to which it is integrated.

In certain embodiments a buttress face (e.g., a substantially planar buttress face) is not parallel with a base sidewall (e.g., a substantially planar base sidewall) to which it is integrated. Sometimes the plane of a buttress face (e.g., a substantially planar buttress face) tapers relative to a base sidewall (e.g., a substantially planar base sidewall) to which it is integrated. In some embodiments a base sidewall tapers relative to a buttress face that is about perpendicular to a base bottom.

In some embodiments a buttress comprises a buttress bottom (e.g., 36, 236, 336) comprising a bottom distal surface (e.g., 36", 236", 336"), a bottom proximal surface (e.g., 36', 236', 336') and sometimes a bottom exterior edge (e.g., 40, 240, 340). In certain embodiments a bottom distal surface comprises a bottom recess (e.g., 38, 238, 338). In some embodiments a bottom recess is configured to receive a foot (e.g., a foot or pad affixed to the bottom recess, or a foot or pad of an automated device that engages the base). Sometimes a buttress bottom is integrated with two or more buttress sidewalls (e.g., two opposing sidewalls) and a buttress exterior face. In some embodiments a buttress bottom extends laterally from a base bottom. Sometimes a buttress bottom extends beyond and away from a buttress face. In certain embodiments a buttress bottom extends laterally from a base bottom to the most distal portion of a buttress sidewall edge. Sometimes a buttress bottom projects beyond the most distal portion of a buttress sidewall edge 30C. In certain embodiments a buttress bottom exterior edge of one buttress projects further from a buttress face (e.g., a buttress face to which it is coextensive with) than a bottom exterior edge of another buttress projects from a buttress face in the base (e.g., a buttress face to which it is coextensive with). In some embodiments a buttress bottom extends laterally from the most distal portion of one opposing buttress sidewall to the most distal portion of the other opposing buttress sidewall.

In some embodiments a buttress bottom is integrated with a buttress exterior face comprising a junction. Sometimes a buttress bottom (e.g., a buttress bottom of a clamped buttress) extends beyond and away from a junction. In some embodiments a bottom exterior edge of a buttress bottom (e.g., a buttress bottom of a clamped buttress) comprises a curve or a turn. In some embodiments a curve of a bottom exterior edge of a buttress bottom comprises an arc of about 80 to about 100 degrees, about 85 to about 95, about 86 to about 94, about 87 to about 93, about 88 to about 92, about 89 to about 91, or about 90 degrees (e.g., ¼ turn). In some embodiments, a curve of a bottom exterior edge of a buttress bottom comprises a radius of curvature of about 1 mm to about 15 mm, 1 mm to about 10 mm, 1 mm to about 8 mm, 2 mm to about 8 mm or 4 mm to about 8 mm. In some embodiments, a curve of a bottom exterior edge of a buttress bottom comprises a radius of curvature of about 1, 1.5, 2, 2.5, 3, 3.5, 4, 4.5, 5, 5.5, 6, 6.5, 7, 7.5, 8, 8.5, 9, 9.5 or about 10 mm. In some embodiments a clamped buttress comprises a bottom exterior edge comprising a curve with an arc of about 90 degrees. In some embodiments a clamped buttress comprises a bottom exterior edge comprising a radius of curvature of about 1 mm to about 15 mm, 1 mm to about 10 mm, 1 mm to about 8 mm, 2 mm to about 8 mm or 4 mm to about 8 mm. In some embodiments a clamped buttress comprises a bottom exterior edge comprising a radius of curvature of about 1, 1.5, 2, 2.5, 3, 3.5, 4, 4.5, 5, 5.5, 6, 6.5, 7, 7.5, 8, 8.5, 9, 9.5 or about 10 mm. A radius of curvature of a buttress bottom (e.g., a buttress bottom exterior edge) if often larger than a radius of curvature of a buttress wall or buttress face.

Sometimes a buttress bottom is coplanar or substantially coplanar with a base bottom. Sometimes a buttress bottom is parallel or substantially parallel with a base bottom. In certain embodiments a buttress (e.g., each of the buttresses of a base) comprises a buttress face, two opposing buttress sidewalls and a buttress bottom. In some embodiments a buttress bottom is configured to engage an automated liquid handling device.

Base Junctions & Flanges

In certain embodiments, any two sidewalls of a base (e.g., a long sidewall and a short sidewall) are joined at a junction at an angle of about 90 degrees. Sometimes a junction comprises a curve and/or a corner. In some embodiments a junction comprises a flange (e.g., 12, 212, 312) sometimes comprising a flange distal surface (e.g., 12B, 212B, 312B) and a flange proximal surface (e.g., 12A, 212A, 312A). Sometimes a junction comprises a flange (e.g., proximal to the junction), in connection with a ridge and a lip. Sometimes an exterior portion of a junction (e.g., exterior side of the base) is integrated at its most proximal portion with a flange distal surface where the flange distal surface is coextensive with a lip recess. In some embodiments each of the opposing short sidewalls is joined to each of the opposing long sidewalls at a junction comprising a flange and a lip (e.g., 41, 241, 341).

In some embodiments a pipette tip rack base comprises flanges that sometimes comprise a flange proximal surface and/or sometimes comprise a flange distal surface. In some embodiments a flange, in part, is configured to engage, support and/or secure a tray. In certain embodiments a flange is integrated with and/or oriented proximal to a base sidewall. In certain embodiments a flange is integrated with a base sidewall and intersects with a base sidewall at a corner. Sometimes a flange is integrated with and/or oriented between two buttresses (e.g., two buttress sidewalls). In some embodiments a flange is often substantially planar, is integrated with the most proximal portion of a base side wall and the most proximal portion of two flanking buttress sidewalls (e.g., sidewalls of different buttresses). Sometimes the plane of a flange is substantially parallel with the plane of a base bottom. In certain embodiments the plane of a flange is substantially coplanar with the plane of one or more other flanges of a base. In some embodiments a flange extends laterally from the most proximal portion of a base sidewall and the flange proximal surface is integrated with a ridge (e.g., 42, 242, 342), or portion thereof. Sometimes a flange distal surface is integrated with a base exterior sidewall surface and a lip recess (e.g., 45, 245, 345). In certain embodiments a flange is not integrated with a buttress face interior. In some embodiments a flange comprises one or more flange connectors (e.g., 48, 248, 348). A flange can comprise any suitable type of connector. In some embodiments a flange comprises 1, 2, 3, 4, 5, 6, 7, or 8 flange connectors. In some embodiments a flange that is integrated with a short side wall of a base comprises one flange connector and a flange that is integrated with a long side wall of a base comprises two flange connectors. A flange connector is often configured to mate with (e.g., receive) a connector on a tray, in some embodiments.

Base Lip

In some embodiments a pipette tip rack base comprises one or more lips that sometimes comprise a lip proximal surface (e.g., 44, 244, 344) and/or sometimes comprise a lip recess (e.g., 45, 245, 345). In certain embodiments, a base comprises one or more lips in connection with a ridge, each of which one or more lips projects from the ridge away from the base interior. In some embodiments a lip, in part, is configured to engage, support and/or secure a lid. Sometimes a lip is oriented proximal to a base sidewall and terminates on either end at a buttress. In some embodiments a lip terminates at a buttress sidewall and is coextensive with a buttress sidewall. In some embodiments a lip is integrated with two buttress sidewalls. Sometimes a lip is integrated with a post, or portion thereof.

A lip often comprises a lip side (e.g., 43, 243, 343) that extends the length of a lip and is substantially parallel with the side of a ridge. Sometimes a lip side projects downward and beyond the lip distal surface. In certain embodiments a lip is integrated with and/or intersects with a ridge, or portions thereof. A lip proximal surface is sometimes substantially perpendicular to a ridge.

Sometimes the plane of a lip proximal surface is substantially parallel with the plane of a base bottom. In certain embodiments the plane of a lip proximal surface is substantially coplanar with the plane of one or more other lips of a base. A lip proximal surface is sometimes substantially parallel to a flange proximal surface. In certain embodiments a lip recess is integrated with and/or coextensive with a flange distal surface.

In some embodiments a lip comprises one or more lip connectors (e.g., 49, 249, 349). A lip can comprise any suitable type of connector. In some embodiments a lip comprises 1, 2, 3, 4, 5, 6, 7, or 8 lip connectors. A lip connector is configured to mate with (e.g., receive) a connector on a lid, in some embodiments.

Base Ridge

In some embodiments a pipette tip rack base comprises a ridge (e.g., 42, 242, 243) that travels the most proximal perimeter of a base. In some embodiments a ridge is coextensive with and/or extends proximal to a proximal surface of a flange and/or a lip. In some embodiments a ridge intersects with a flange and/or a lip at a substantially perpendicular angle. Sometimes a base comprises a ridge, portions of which ridge are coextensive or substantially coextensive with a buttress face. Sometimes a ridge, or portions thereof, is coextensive or substantially coextensive with each buttress face of a base. Substantially coextensive means nearly coextensive with each buttress face (e.g., the proximal portion of a buttress face). A ridge is sometimes coextensive with and/or substantially coplanar with a buttress face.

In certain embodiments a ridge is configured to retain (e.g., to retain lateral movement of) a tray and/or a lid. A ridge can be any suitable height. In some embodiments a ridge has a height of about 0 to about 5 mm. In some embodiments a ridge has a height of about 0.5 to about 1.5 mm. Sometimes a ridge has a height of about 0.5, 1, 1.5, 2, 2.5, 3, 3.5, 4, 4.5 or 5 mm. The height of a ridge can be measured from the most proximal edge of the ridge to the intersection of the ridge with a proximal surface of a lip and/or a proximal surface of a flange. In some embodiments the height of a ridge as measured to the intersection of a lip (e.g., sometimes about 1 mm) is different than the height as measured to the intersection of a flange (e.g., sometimes about 2 mm). In some embodiments the height of a ridge as measured to the intersection of a lip is the same as the height as measured to the intersection of a flange. Sometimes a ridge is contiguous and uninterrupted.

Sometimes a ridge comprises an interruption of a ridge (e.g., 46, 246, 346). An interruption of a ridge, in certain embodiments, comprises an interruption of a ridge and an interruption of a lip. Sometimes an interruption of a ridge comprises a connector. An interruption of a ridge is sometimes configured to reversibly engage (e.g., receive a connector, connect to, snap connect to) a portion of a lid (e.g., a connector, a lid connector, a clasp). In some embodiments an interruption of a lid comprises a projection configured to engage a lid connector (e.g., a clasp), or portion thereof. An interruption of a ridge can be any suitable width. In some embodiments an interruption of a ridge is about 1 to about 25 mm, about 5 to about 20, or about 10 to about 15 mm in width. Sometimes an interruption of a ridge about 5, 6, 7, 8, 9, 10, 11, 12, 13, 14, 15, 16, 17, 18, 19 or 20 mm in width.

Base Post

Figure 46:
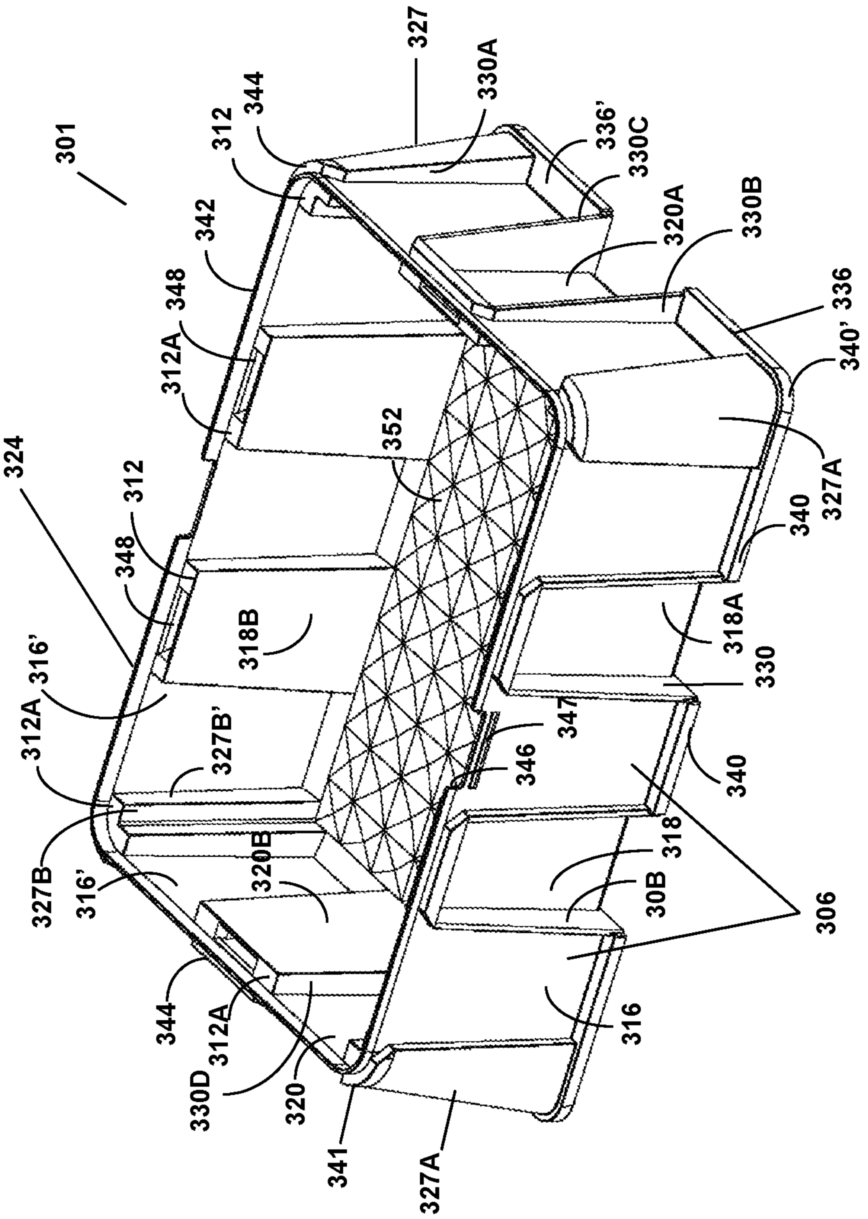
FIG. 46 shows an embodiment of a partial single-walled base comprising posts.
Figure 47:
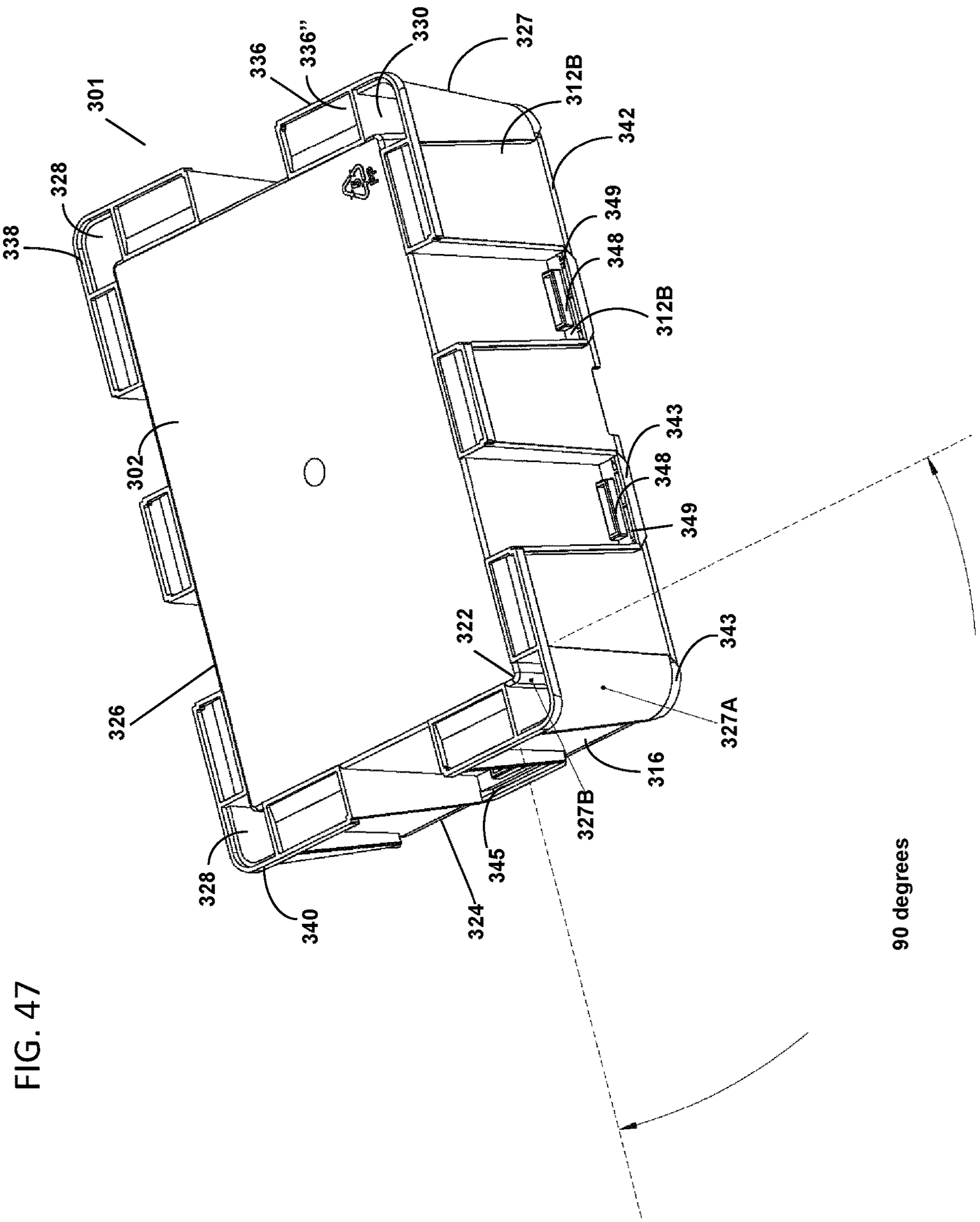
FIG. 47 shows a bottom perspective view thereof.
Figure 48:
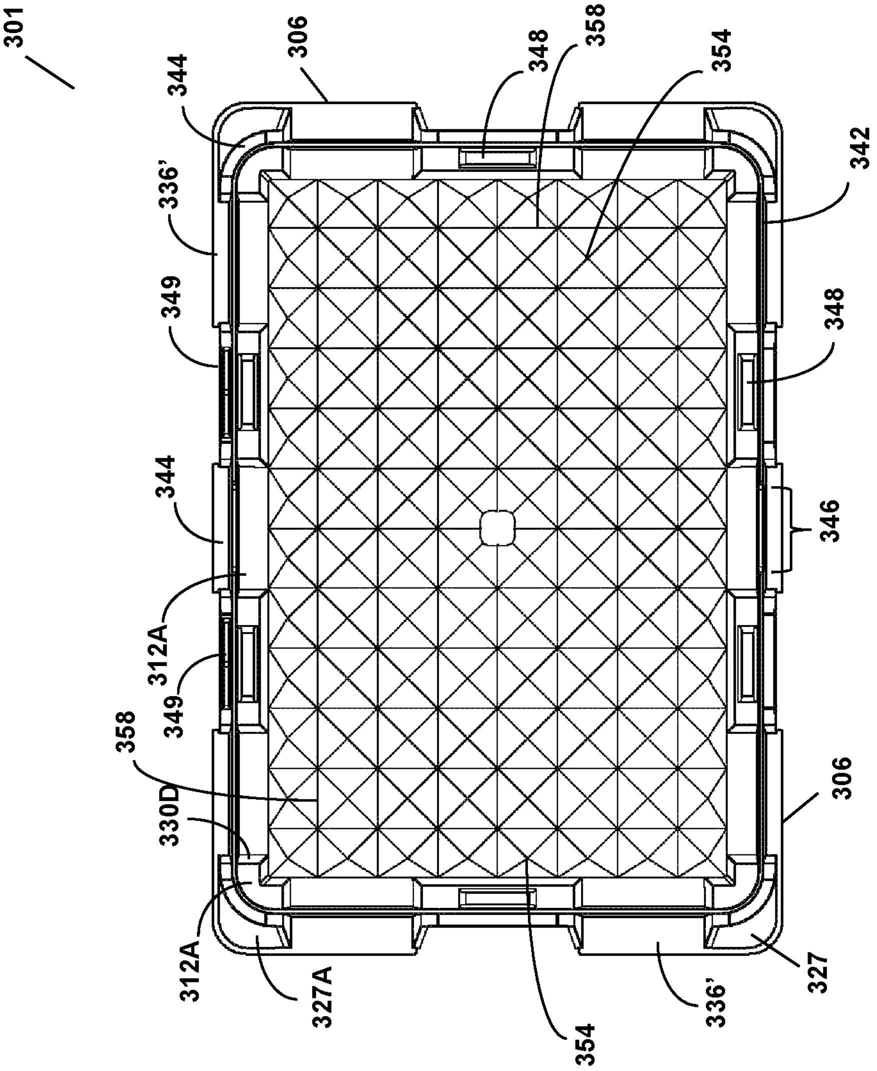
FIG. 48 shows a top view thereof.
Figure 49:
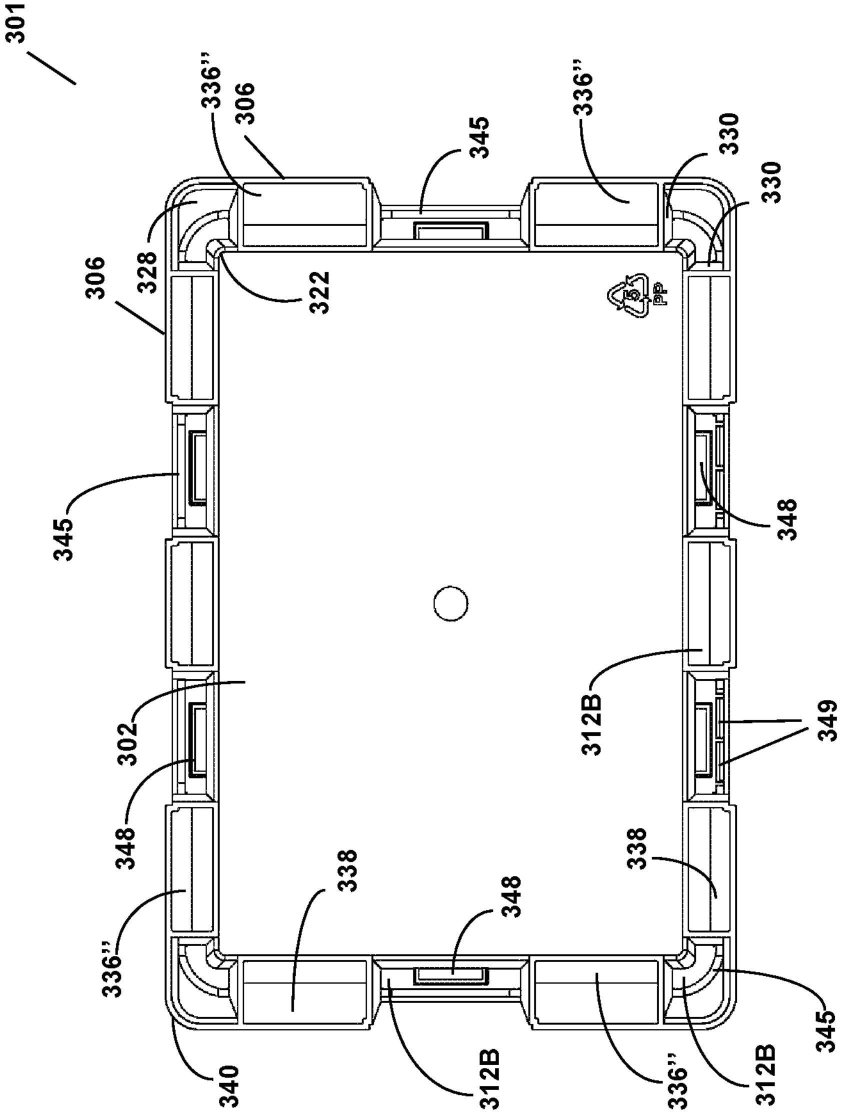
FIG. 49 shows a bottom view thereof.

In some embodiments a partial single-walled pipette tip rack base comprises one or more posts (e.g., post 327 in FIG. 46). A post often adds strength and rigidity to a partial single-walled base comprising base sidewalls that are substantially single-walled. A post often comprises a post inner wall 327B, a post outer wall 327A and a void 328 between the post inner wall and the post outer wall. In some embodiments a post inner wall and a post outer wall are opposing post walls. In some embodiments a post inner wall and a post outer wall are not opposing post walls. A post inner wall and/or a post outer wall often comprise one or two base sidewalls, or a portion thereof. In some embodiments a post outer wall is integrated with a portion of an exterior sidewall surface of a base sidewall. In some embodiments a post outer wall is coextensive with a portion of an exterior sidewall surface of a base sidewall. In some embodiments a post inner wall is integrated with a portion of an interior sidewall surface of a base sidewall. In some embodiments a post inner wall is coextensive with a portion of a short sidewall (e.g., an interior sidewall surface) of a base sidewall. In some embodiments a post inner wall and/or a post outer wall comprise a short sidewall of a base and/or a long sidewall of a base. In certain embodiments a short sidewall of a base is joined to a long sidewall of a base at a junction comprising a post.

In certain embodiments a post outer wall is coextensive with a post inner wall. In some embodiments a post outer wall and a post inner wall are coextensive. For example, a post outer wall and a post inner wall are sometimes coextensive resembling the shape of a cylinder or column that is integrated and/or coextensive with one or more base sidewalls. A post can resemble the shape of a column with any suitable horizontal cross section (e.g., circular, rectangular, hexagonal, triangular, or the like). In some embodiments a post wall (e.g., a post inner wall or post outer wall) comprises a curve with an arc of about 80 to about 100 degrees, about 85 to about 95, about 86 to about 94, about 87 to about 93, about 88 to about 92, about 89 to about 91, or about 90 degrees (e.g., ¼ turn). In some embodiments a post wall (e.g., an post inner wall or post out wall) comprises a curve comprising a radius of curvature of about 2 mm to about 10 mm, 2 mm to about 8 mm, 2 mm to about 6 mm or 2 mm to about 4 mm.

A post sometimes comprises a buttress sidewall or a portion thereof, of one or more buttresses of a base. A post sometimes comprises one or two buttress sidewalls. In some embodiments one or more posts of a base comprises one or two buttress sidewalls or a portion thereof. In some embodiments one or more posts of a base comprises at least a portion of a buttress sidewall. In some embodiments a post inner wall and/or a post outer wall are coextensive with one or two buttress sidewalls. In certain embodiments a post comprises a first portion of a first buttress sidewall and a second portion of a second buttress sidewall. In some embodiments a post inner wall and/or a post outer wall are coextensive with a buttress sidewall of a first buttress and a buttress sidewall of a second buttress. In some embodiments a post does not comprise a portion of a buttress sidewall.

In some embodiments a post inner wall or a post outer wall comprises a junction, or portion thereof. In certain embodiments a post inner wall or a post outer wall is integrated with a base junction, or portion thereof. In certain embodiments a post inner wall is coextensive with a flange (e.g., a proximal flange). Sometimes a flange is integrated with a post inner wall and/or a portion of a buttress sidewall. In some embodiments one or more posts of a base are integrated with a lip. A post outer wall sometimes comprises a lip (e.g., a proximal lip). Sometimes a post outer wall is integrated with a lip. Sometimes a post (e.g., a post outer wall) is integrated with a buttress bottom of one or two buttresses. In certain embodiments a post (e.g., a post outer wall) is integrated with a buttress bottom proximal surface of one or two buttresses. In some embodiments a post outer wall is integrated with an extension of a bottom exterior edge (e.g., 340'). An extension of a bottom exterior edge is often coextensive with a bottom exterior edge (e.g., 340) of one or two buttresses. An extension of a bottom exterior edge often comprises a curve with an arc of about 80 to about 100 degrees, about 85 to about 95, about 86 to about 94, about 87 to about 93, about 88 to about 92, about 89 to about 91, or about 90 degrees (e.g., ¼ turn). An extension of a bottom exterior edge often comprises a radius of curvature of about 2 mm to about 10 mm, 2 mm to about 8 mm, 2 mm to about 6 mm or 2 mm to about 4 mm. A radius of curvature of an extension of a bottom exterior edge if often larger than a radius of curvature of a post outer wall. In some embodiments an extension of a bottom exterior edge (e.g., 340) comprises a proximal surface coextensive with a buttress bottom proximal surface of one, two or more buttresses.

A post often comprises a void (e.g., 328). The term "void" as used herein refers to a partially or completely enclosed space. In some embodiments a void is empty. In some embodiments a void is not empty. In certain embodiments a void comprises a non-structural material (e.g., a foam, an insulation material, or the like). A void is often enclosed, in part, by a post inner wall, a post outer wall and optionally one or more base side walls and/or optionally one or more buttress sidewalls. A void is sometime enclosed at the top or proximal portion of a post (e.g., a proximal portion of a base) by one or more of a flange (e.g., 312), a lip (e.g., 344), a ridge (e.g., 342), a portion thereof or a combination thereof. In some embodiments a void of a post is not enclosed on the bottom or distal portion of a post (e.g., distal portion of a base). In certain embodiments a void is enclosed on the bottom or distal portion of a post (e.g., distal portion of a base).

In some embodiments a base comprises one or more posts. In certain embodiments a base comprises 2 or more, 3 or more, 4 or more, 5 or more, 6 or more, 7 or more, or 8 or more post. The posts of a base can be located on any suitable base sidewall or corner portion (e.g., near a junction 322) of a base. In some embodiments a base comprises one or more corner posts. A corner post is often located at or near a corner portion (e.g., at or near a junction 322) of a base. Sometimes a base comprises 4 corner posts.

In some embodiments one or more walls of a post (e.g., a post outer wall, a post inner wall, one or more base side walls, one or more buttress sidewalls, the like or combinations thereof) taper. In some embodiments one or more walls of a post taper resulting in a post that becomes gradually narrower towards the top or proximal portion of a base. In some embodiments one or more walls of a post taper resulting a post that becomes gradually narrower towards the bottom or distal portion of a base. In some embodiments one or more walls of a post are substantially perpendicular to a base bottom.

In some embodiments one or more posts of a base are of a double-walled construction. In some embodiments a wall or component of a post (e.g., a post outer wall, a post inner wall, a buttress sidewall, a base sidewall, flange, lip, and/or ridge) comprises a thickness of about 0.1 to about 3 mm, about 0.1 to about 1.5 mm, about 0.5 to about 1.5 mm, 0.8 to about 1.2 or about 0.9 to about 1.1 mm. In some embodiments a wall or component of a post is about 0.5, 0.6, 0.7, 0.8, 0.9, 1.0, 1.1, 1.2, 1.3, 1.4, 1.5 or 2 mm thick. Sometimes the maximum thickness of any wall of a post and/or component of a post comprises a maximum thickness of 1 mm or less.

Base Footprint & Dimensions

In some embodiments a footprint of a base is configured to engage an automated liquid handling device. In some embodiments a base comprises a footprint (e.g., 14, 214). Sometimes a footprint comprises a long side (e.g., 14A, 214A) and a short side (e.g., 14B, 214B). In certain embodiments a footprint of a base comprises the outer perimeter of a base bottom. In certain embodiments a footprint of a base comprises the outer perimeter of a base bottom including all integrated buttresses. Sometimes a footprint is a rectangular space defined by a rectangular perimeter that will accommodate and/or contain the base bottom. In certain embodiments a footprint is the smallest rectangular space defined by a rectangular perimeter that will accommodate and/or contain a base bottom. In certain embodiments a footprint is the perimeter of a base bottom. In some embodiments a footprint is not the perimeter of a base bottom. Sometimes a footprint (e.g., a footprint for a base or rack) is the same as a footprint for a microplate. In some embodiments the dimensions of a footprint, or portions thereof (e.g., footprint for a microplate) are defined by the Society for Biomolecular Sciences (SBS), the Society for Biomolecular Screening and/or the American National Standards Institute (ANSI). Sometimes a footprint of a base bottom conforms to SBS standards and/or SBS dimension for a microplate footprint.

In some embodiments the outside dimensions of a base footprint comprise a long side footprint 14A of about 100 mm to about 150 mm. Sometimes the outside dimensions of a base footprint comprise a long side footprint of about 110 mm to about 135 mm. Sometimes the outside dimensions of a base footprint comprise a long side footprint of about 110, 115, 120, 125, 126, 127, 128, 129, 130 or about 135 mm. In some embodiments the outside dimensions of a base footprint comprise a short side footprint 14B of about 115 mm to about 65 mm. Sometimes the outside dimensions of a base footprint comprise a short side footprint of about 100 mm to about 65 mm. Sometimes the outside dimensions of a base footprint comprise a short side footprint of about 100, 95, 90, 89, 88, 87, 86, 85, 84, 83, 82, 81, 80, 75, 70 or about 65 mm. In some embodiments the outside dimensions of a base footprint comprise a long side footprint of 127.76 mm±0.25 mm and a short side footprint of 85.48 mm±0.25 mm. Sometimes the dimensions of a base footprint are measured at any point along the side. Sometimes the dimensions of a base footprint are measured within 12.7 mm of the outside corners. In some embodiments a footprint is continuous and uninterrupted around the bottom of a base.

The interior dimensions of a base comprise a length (e.g., an interior length), as measured from the interior sidewall surface of two opposing short sidewalls, and a width (e.g., an interior width), as measured from the interior sidewall surface of two opposing long sidewalls. In some embodiments where the sidewalls taper, the interior length and interior width are taken from the shortest distance between the opposing sidewalls. In some embodiments the interior length is from about 95 mm to about 130 mm, 95 mm to about 120 mm, 95 mm to about 115 or about 95 mm to about 110 mm. Sometimes the interior length is about 98, 99, 100, 101, 102, 103, 104, 105, 106, 107, 108, 109 or about 110 mm. In some embodiments the interior width is from about 60 mm to about 90 mm, 60 mm to about 80 mm, 60 mm to about 75 or about 60 mm to about 70 mm. Sometimes the interior length is about 60, 61, 62, 63, 64, 65, 66, 67, 68, 69, or about 70 mm.

Tray

In certain embodiments a single-walled pipette rack or partial single-walled pipette rack (e.g., a rack or rack assembly comprising a partial single-walled base) comprises a tray 60. Sometimes a single-walled pipette tip tray (herein referred to as a tray) comprises a plate 62, tray sidewalls 64 and a tray flange 66. In some embodiments a plate comprises a proximal plate surface 68, a distal plate surface 70 and a plurality of plate bores 72. Sometimes plate bores are configured to receive one or more pipette tips. In some embodiments plate bores are arranged in a suitable array, non-limiting examples of which include an 8×12 array, or a 16×24 array. Plate bores of an 8×12 array are sometimes spaced 9 mm apart (measured center to center). Plate bores of a 16×24 array are sometimes spaced 4.5 mm apart (measured center to center).

Figure 21:
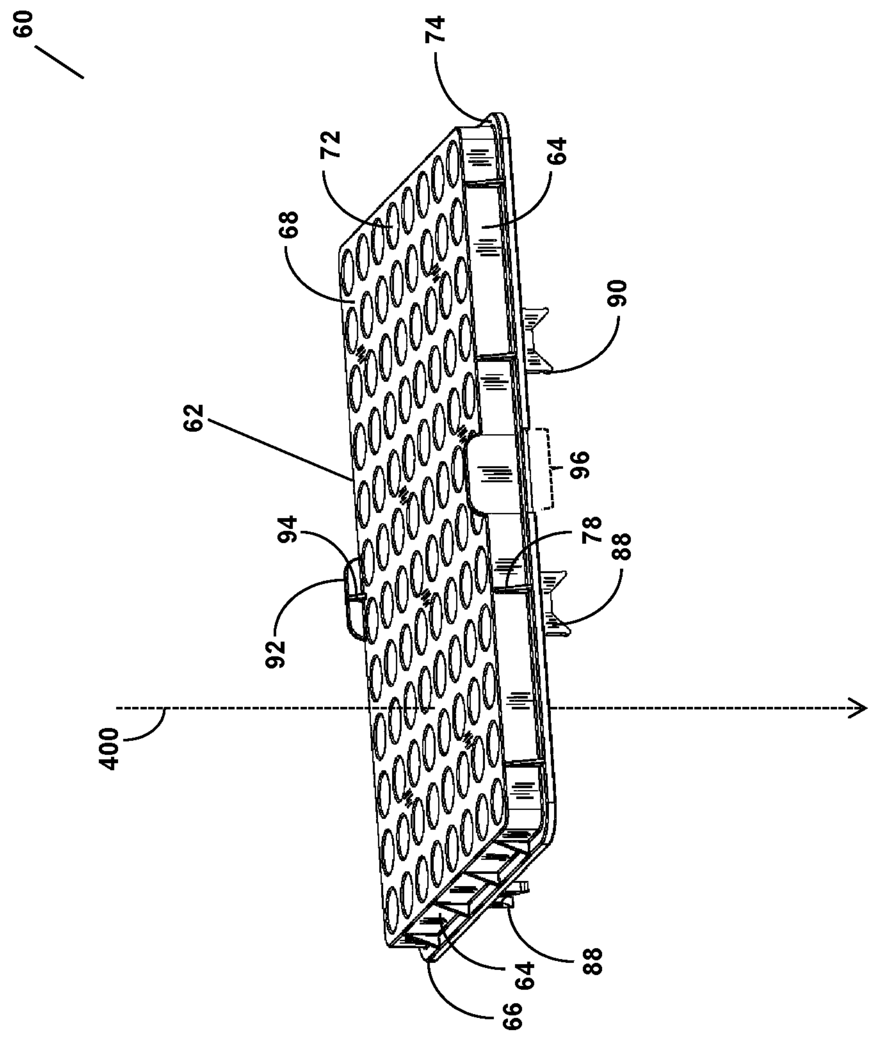
FIG. 21 shows a top perspective view thereof.
Figure 22:
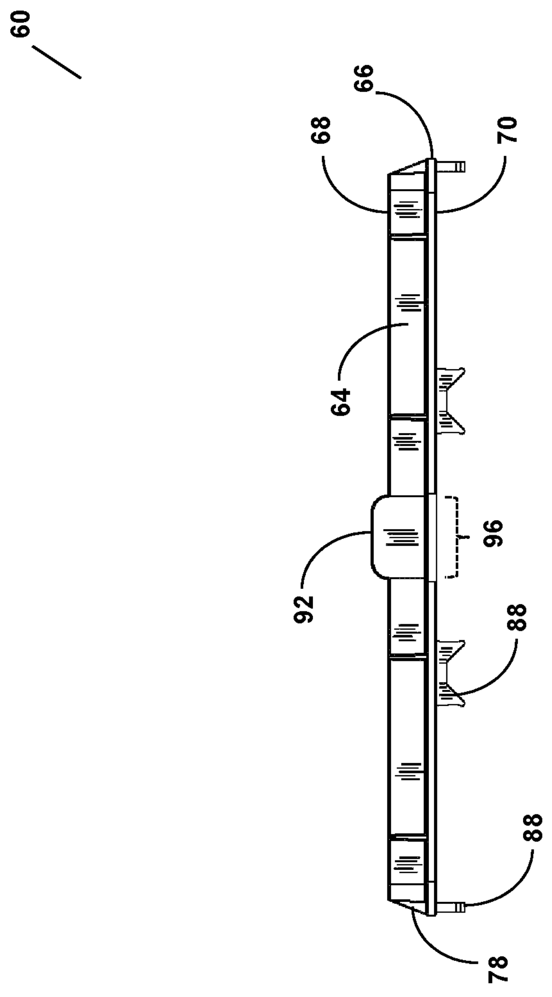
FIG. 22 shows a long side view thereof.
Figure 23:
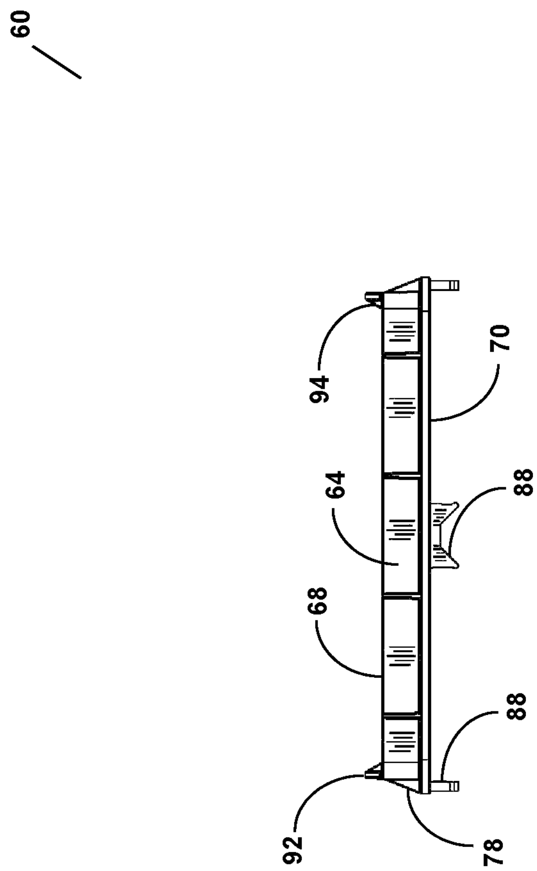
FIG. 23 shows a short side view thereof.
Figure 24:
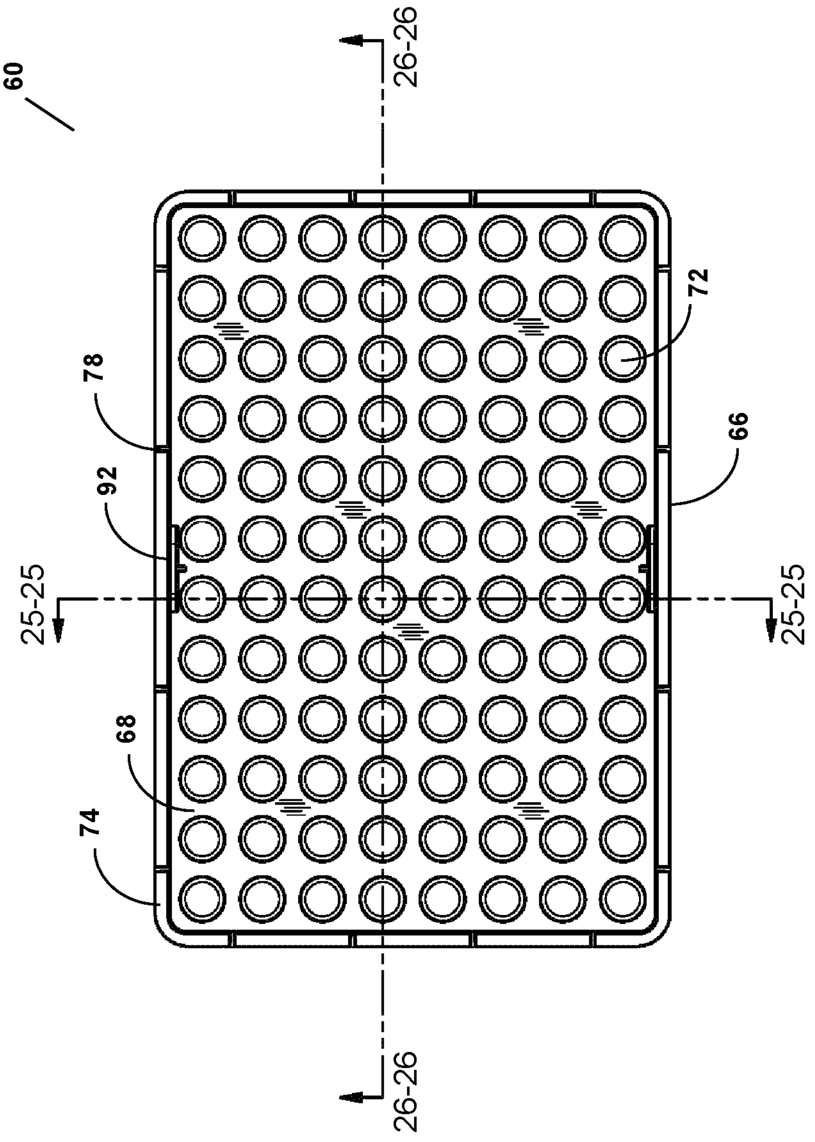
FIG. 24 shows a top view thereof.
Figure 25:
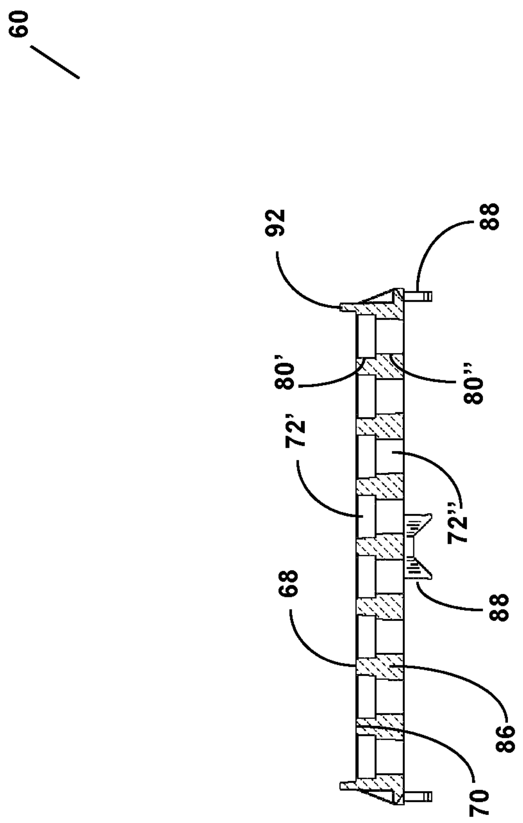
FIG. 25 shows a short side sectional view of the tray through line 25-25 in FIG. 24.
Figure 26:
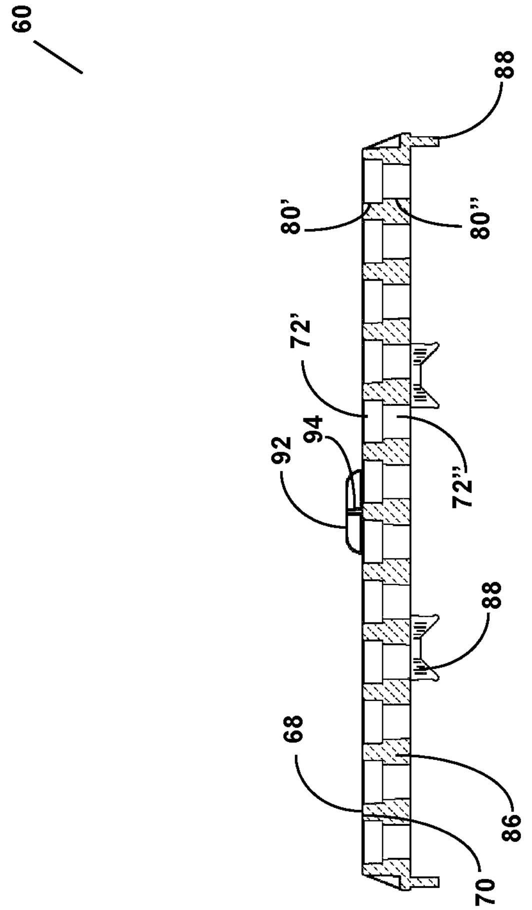
FIG. 26 shows a long side sectional view of the tray through line 26-26 in FIG. 24.
Figure 27:
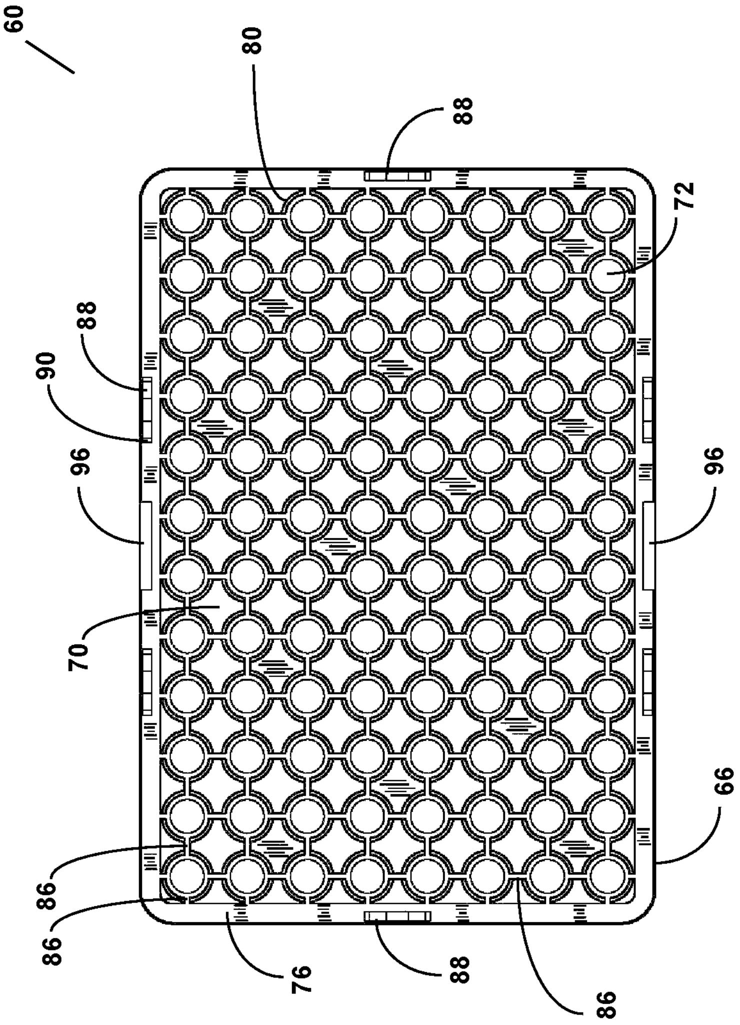
FIG. 27 shows a bottom view of the tray in FIG. 21.
Figure 28:
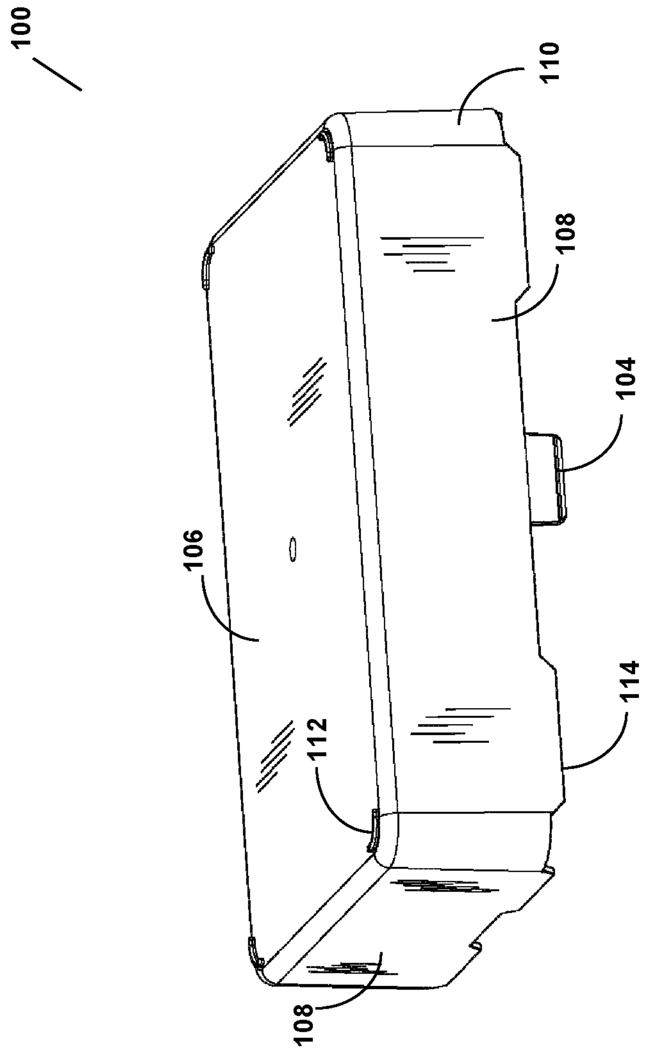
FIG. 28 shows a front perspective view of a lid.
Figure 29:
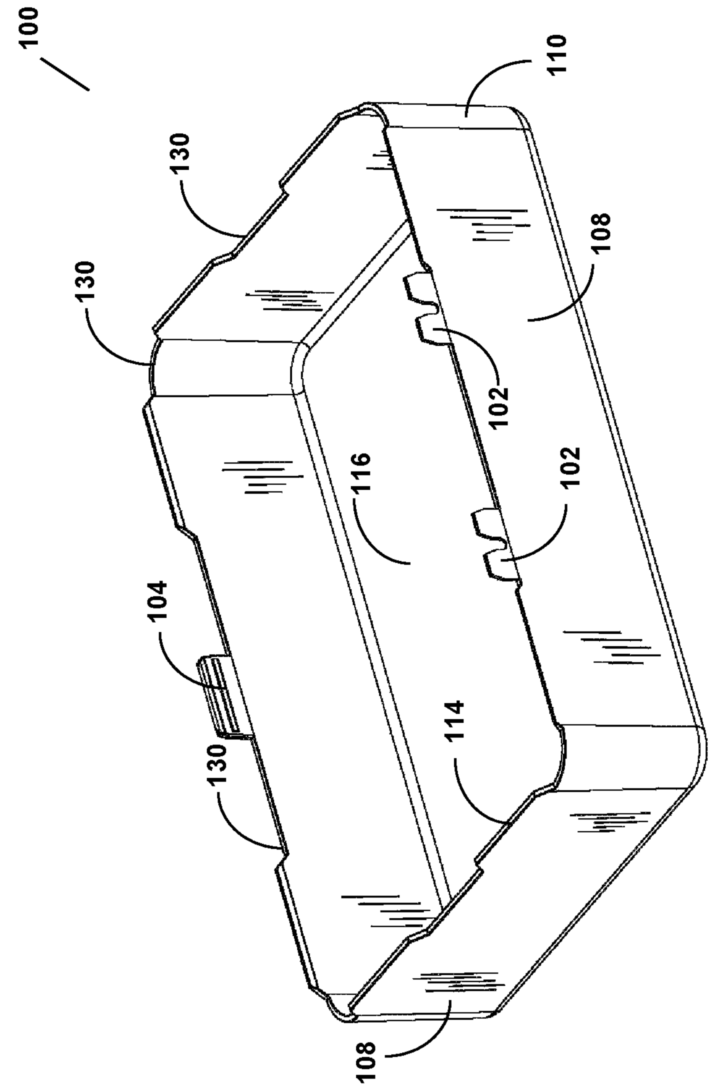
FIG. 29 shows a bottom perspective view thereof.
Figure 30:
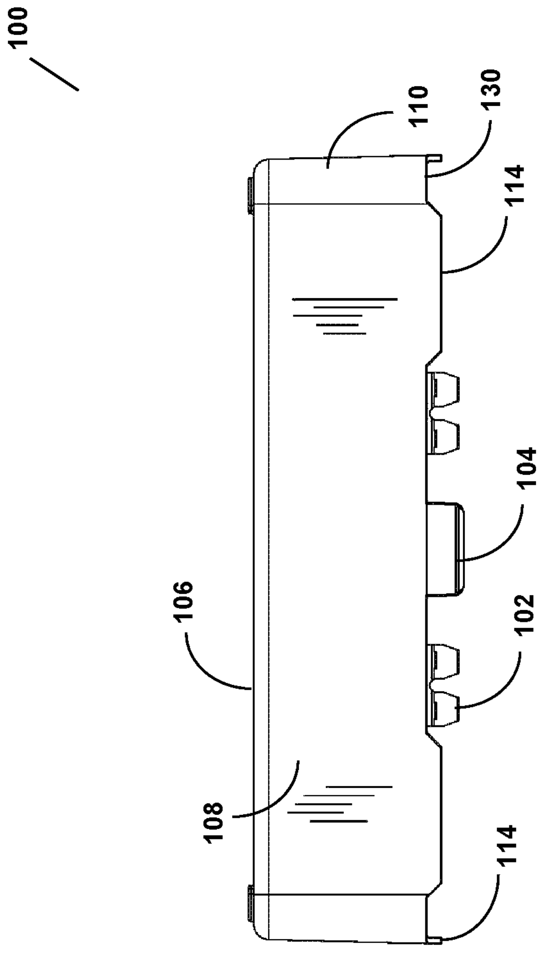
FIG. 30 shows a front, long side view thereof.
Figure 31:
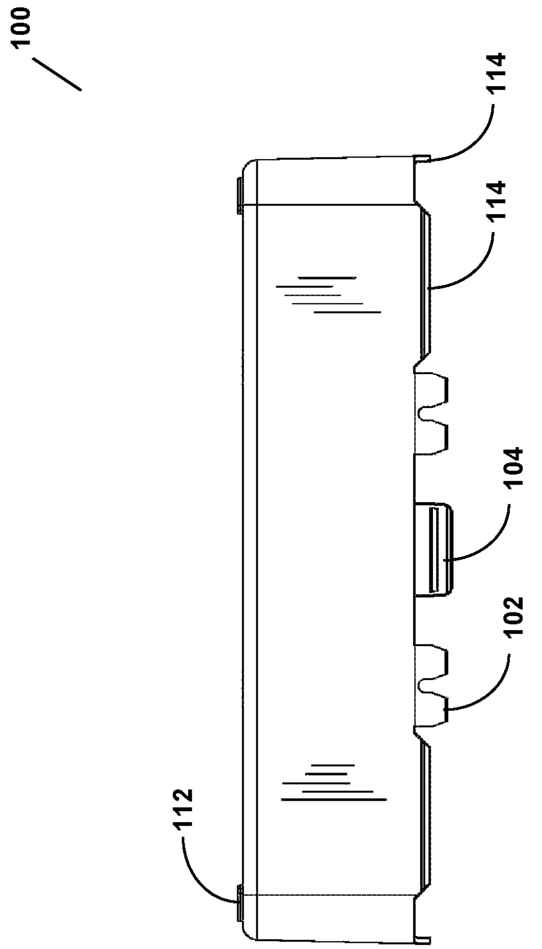
FIG. 31 shows a back, long side view thereof.
Figure 32:
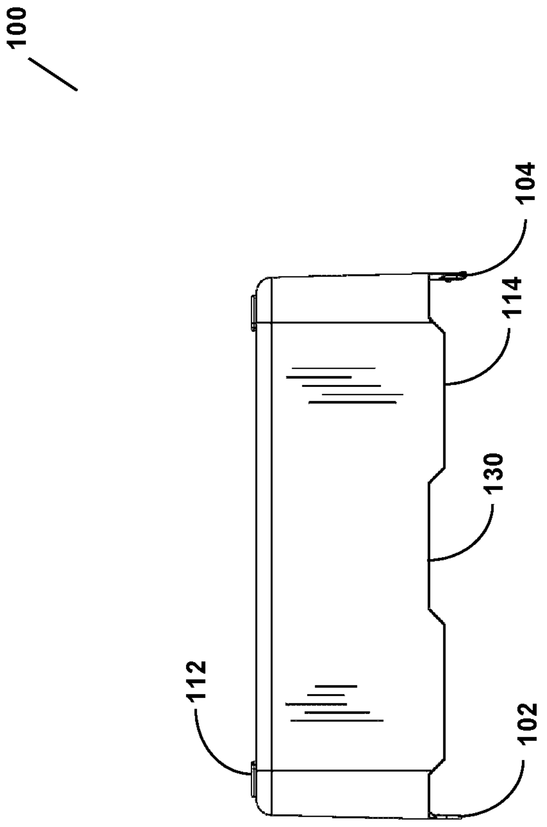
FIG. 32 shows a short side view thereof.
Figure 33:
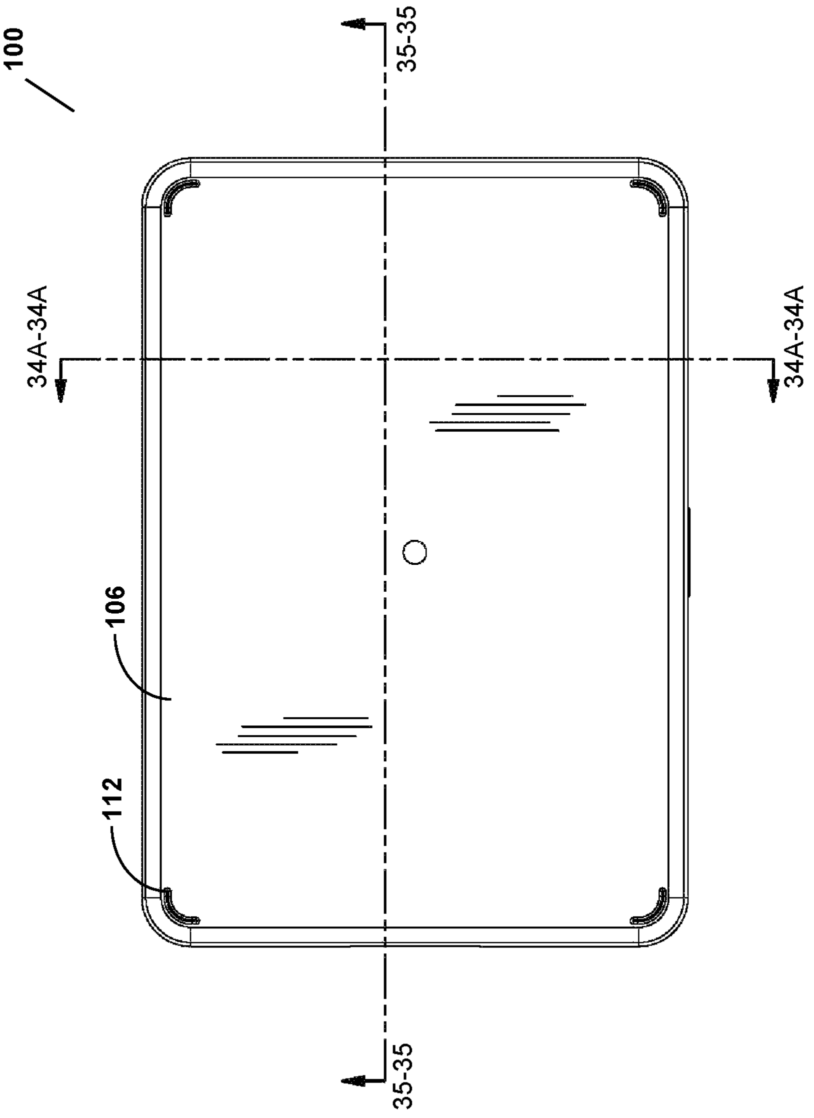
FIG. 33 shows a top side view thereof.
Figures 34A, 34B, 34C:
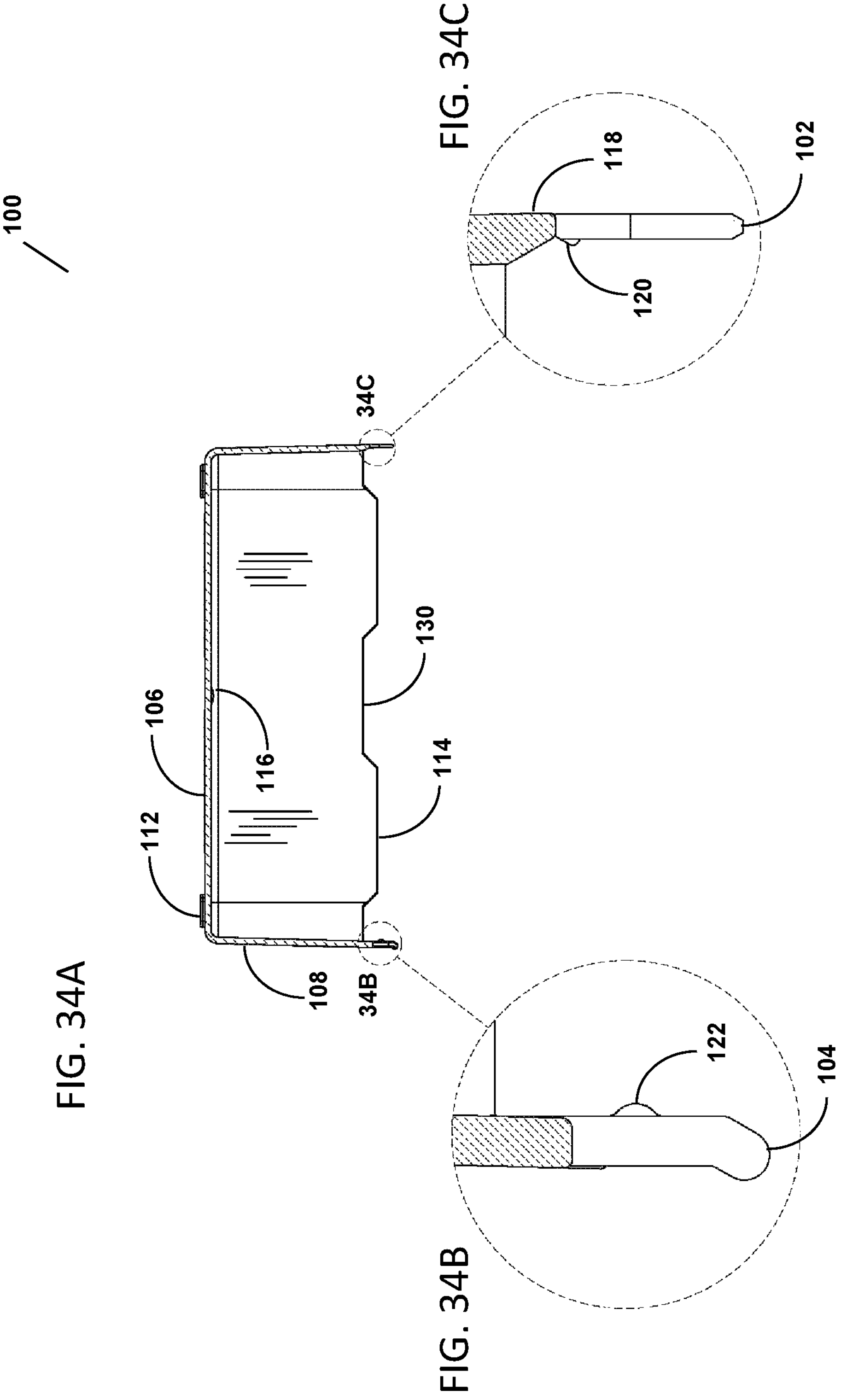
FIG. 34A shows a short side sectional view of the lid through line 34A-34A in FIG. 33.
FIG. 34B shows an enlarged partial view of the section indicated on FIG. 34A.
FIG. 34C shows an enlarged partial view of the section indicated on FIG. 34A.
Figure 35:
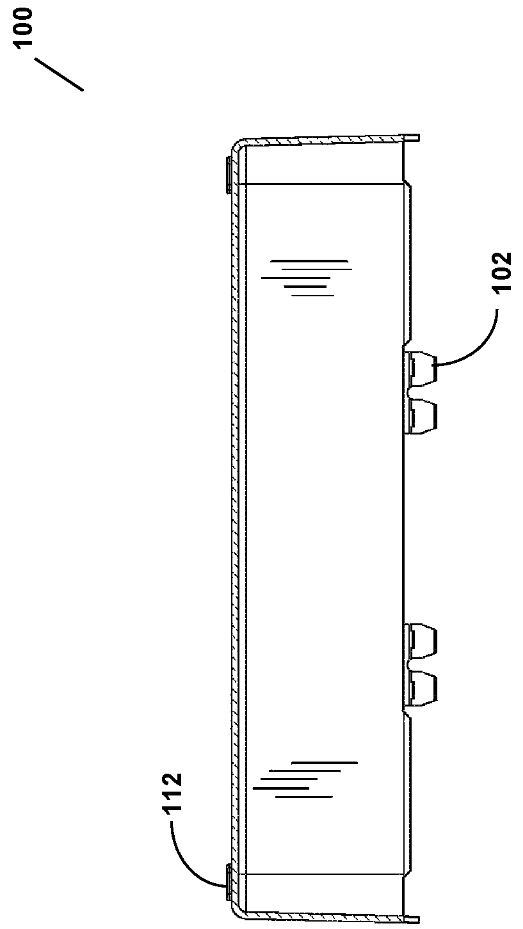
FIG. 35 shows a long side sectional view of the lid through line 35-35 in FIG. 33.
Figure 36:
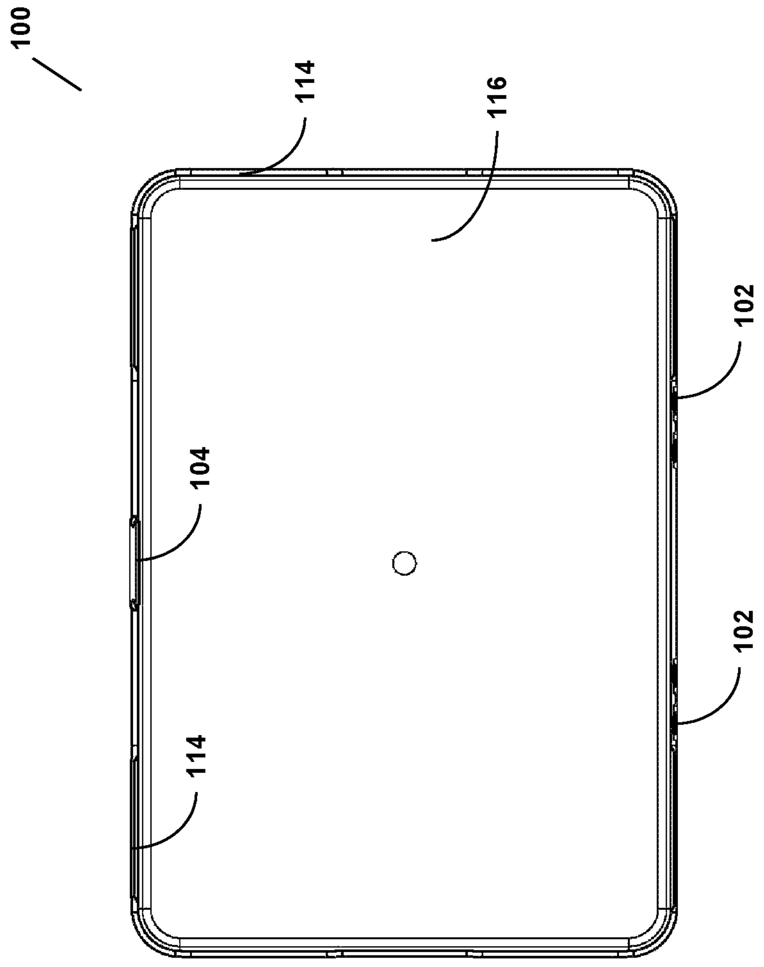
FIG. 36 shows a bottom view of a lid.
Figure 37A:
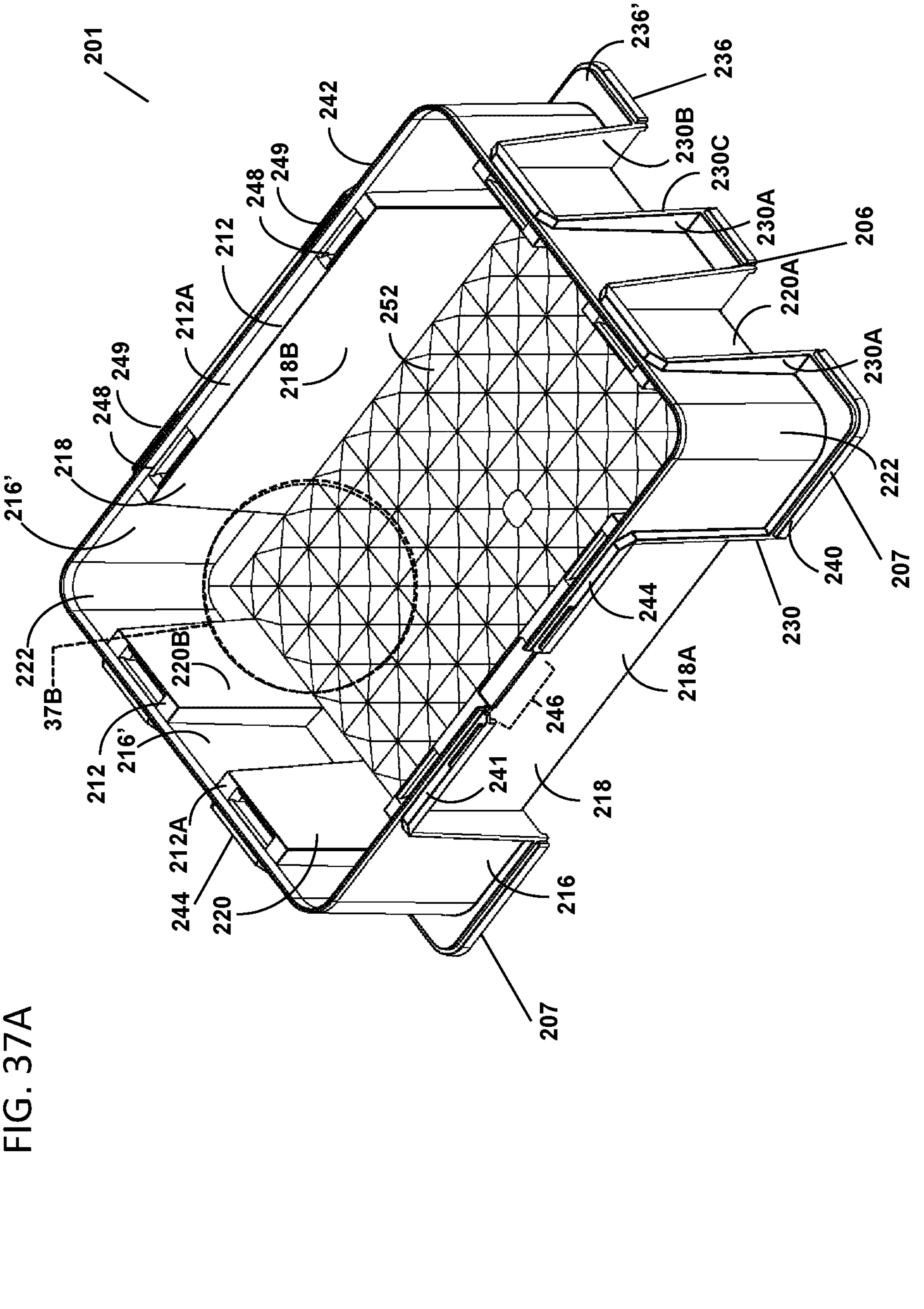
FIG. 37A shows a top perspective view of an embodiment of a single-walled pipette tip rack base comprising a clamped buttress.
Figure 37B:
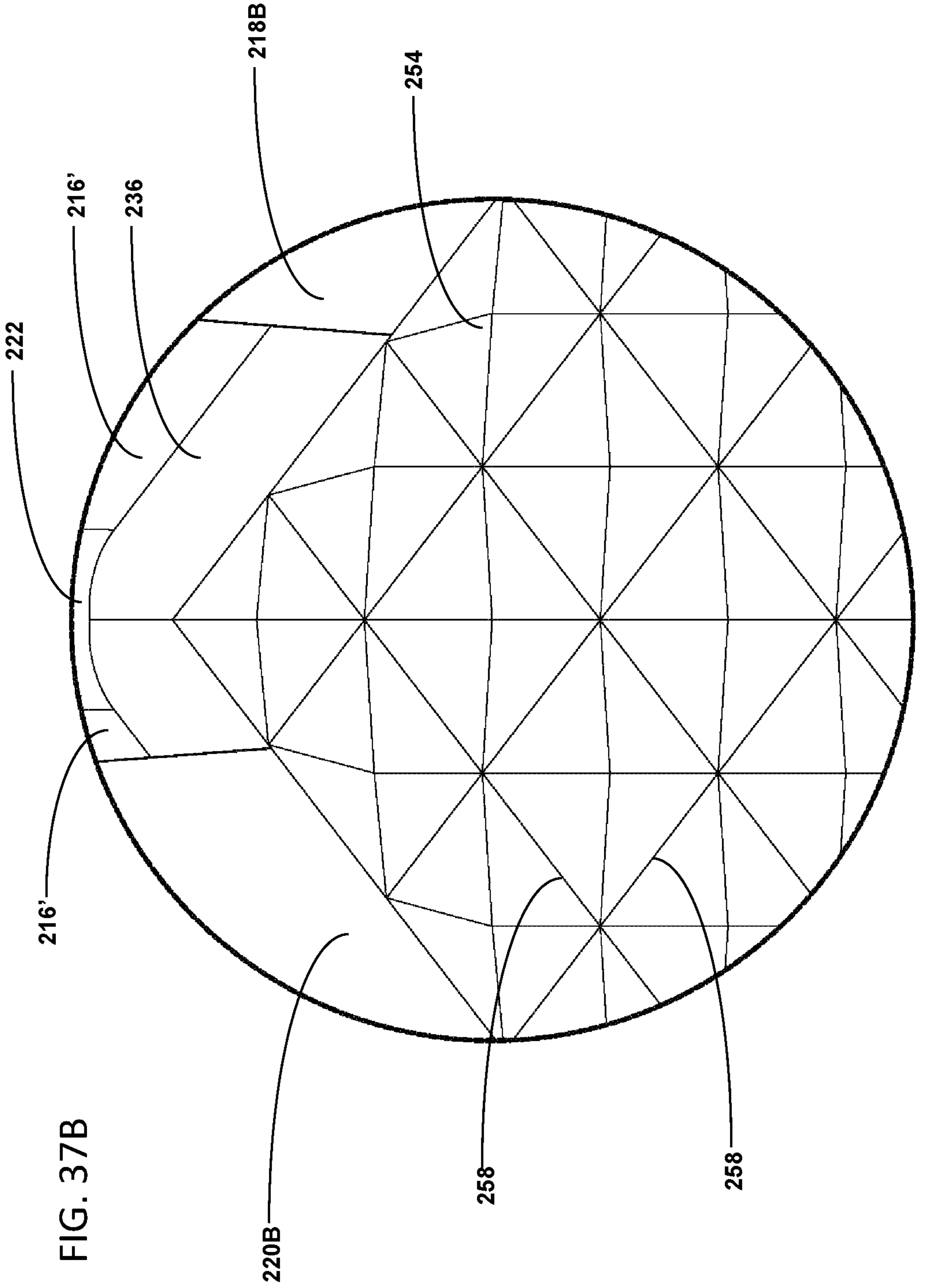
FIG. 37B shows an enlarged sectional view thereof as shown in FIG. 37A.
Figure 38:
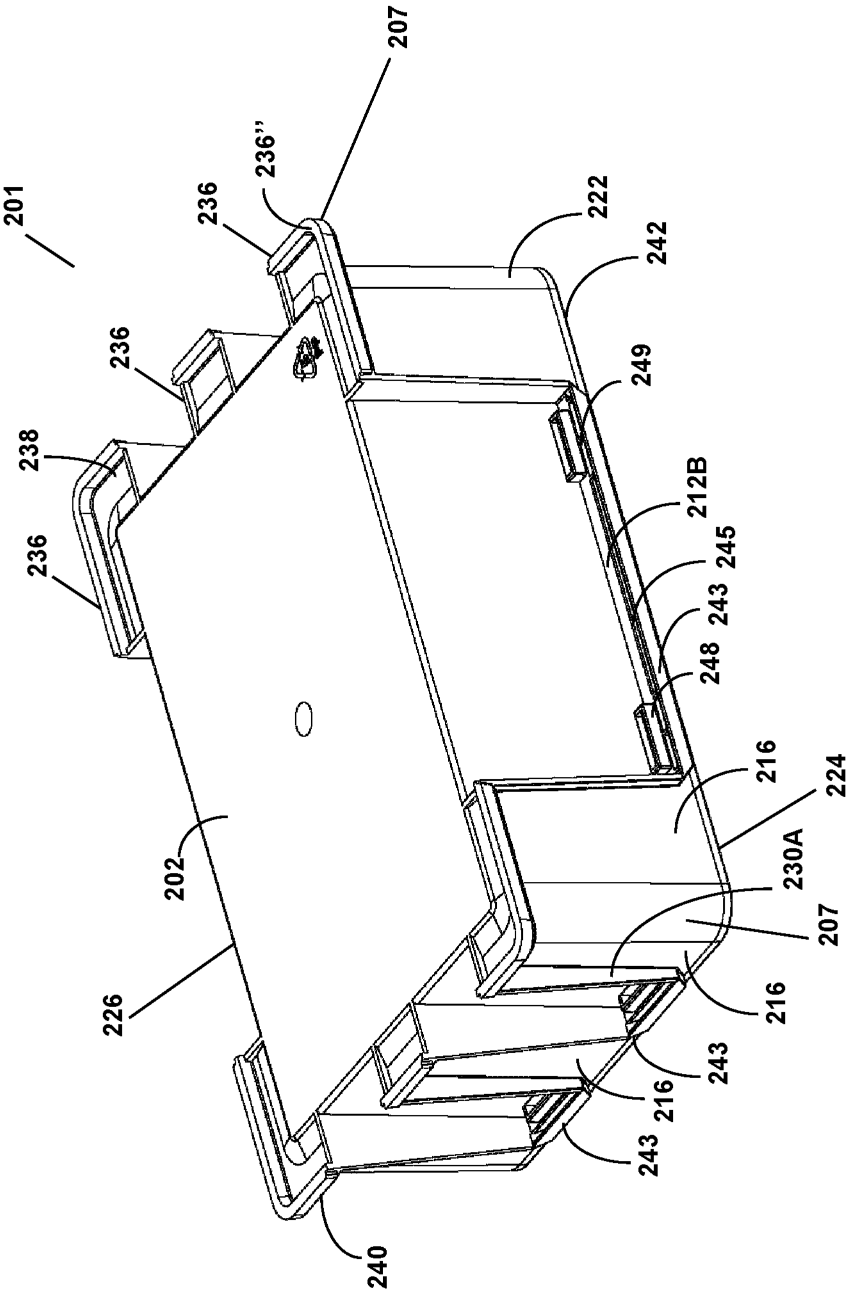
FIG. 38 shows a bottom perspective view thereof.
Figure 39A:
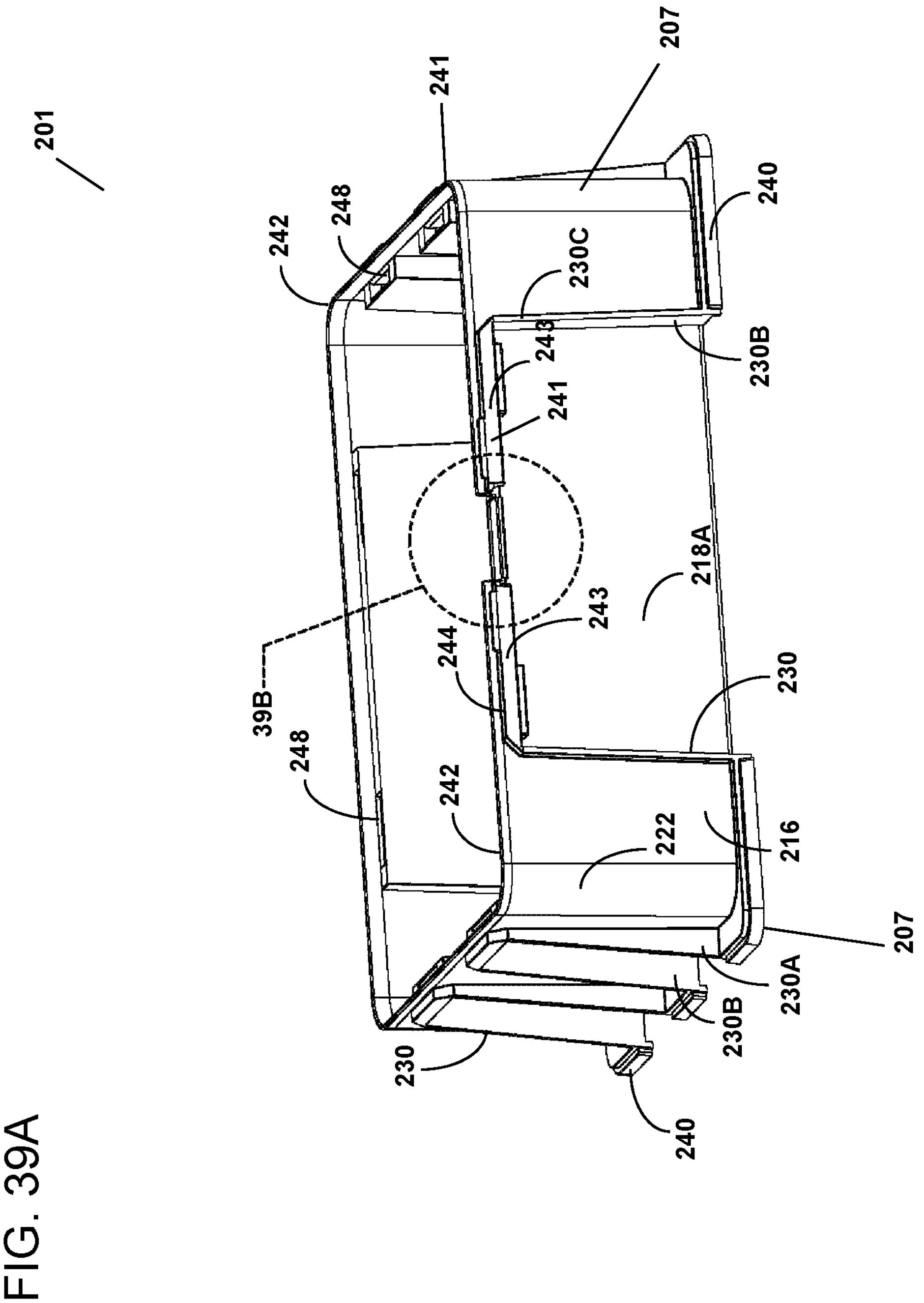
FIG. 39A shows a front perspective view thereof.
Figure 39B:
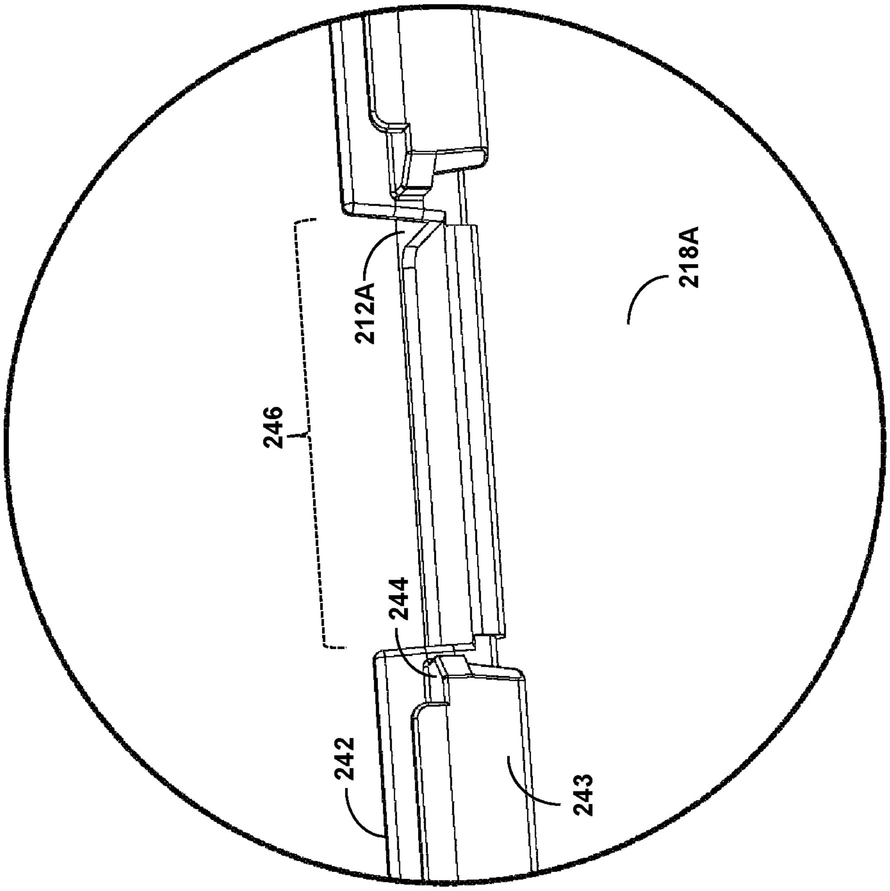
FIG. 39B shows an enlarged sectional view thereof as shown in FIG. 39A.
Figure 40:
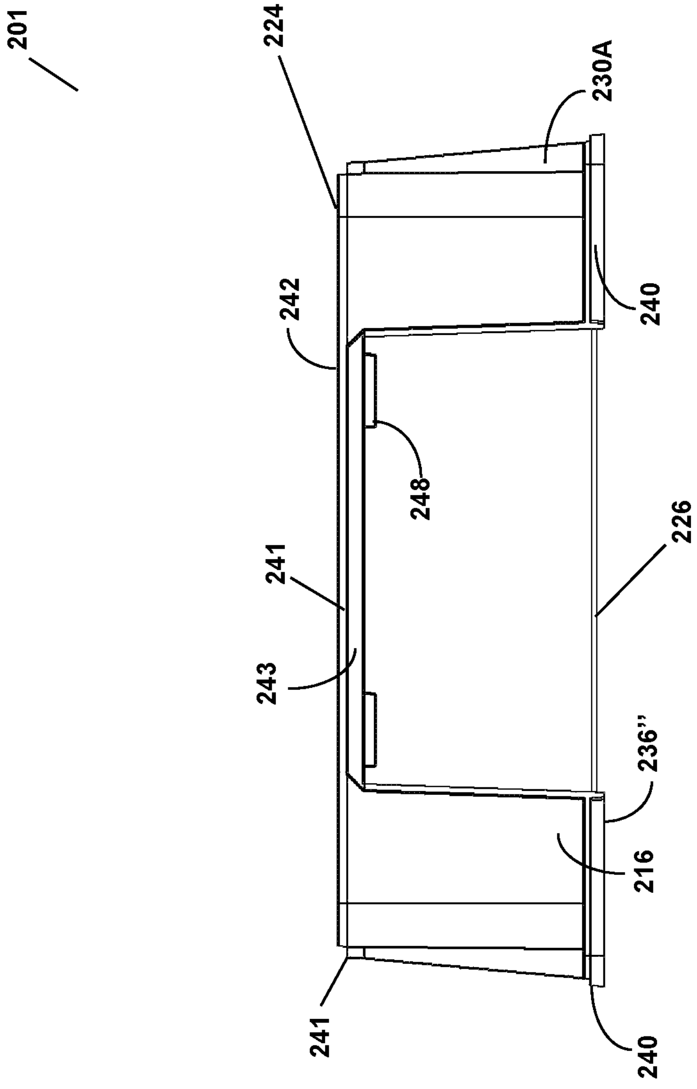
FIG. 40 shows a front view thereof.
Figure 41:
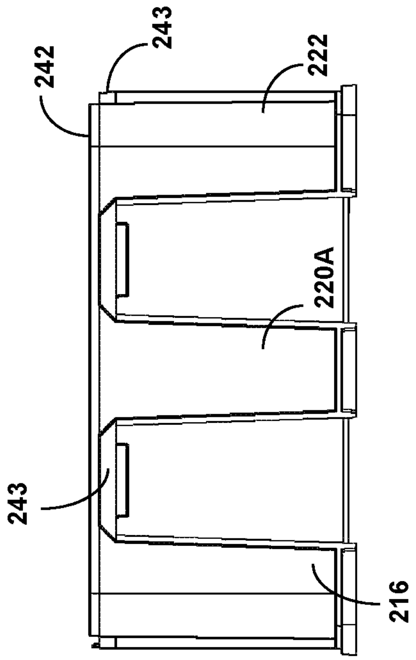
FIG. 41 shows a short side view thereof.
Figure 42:
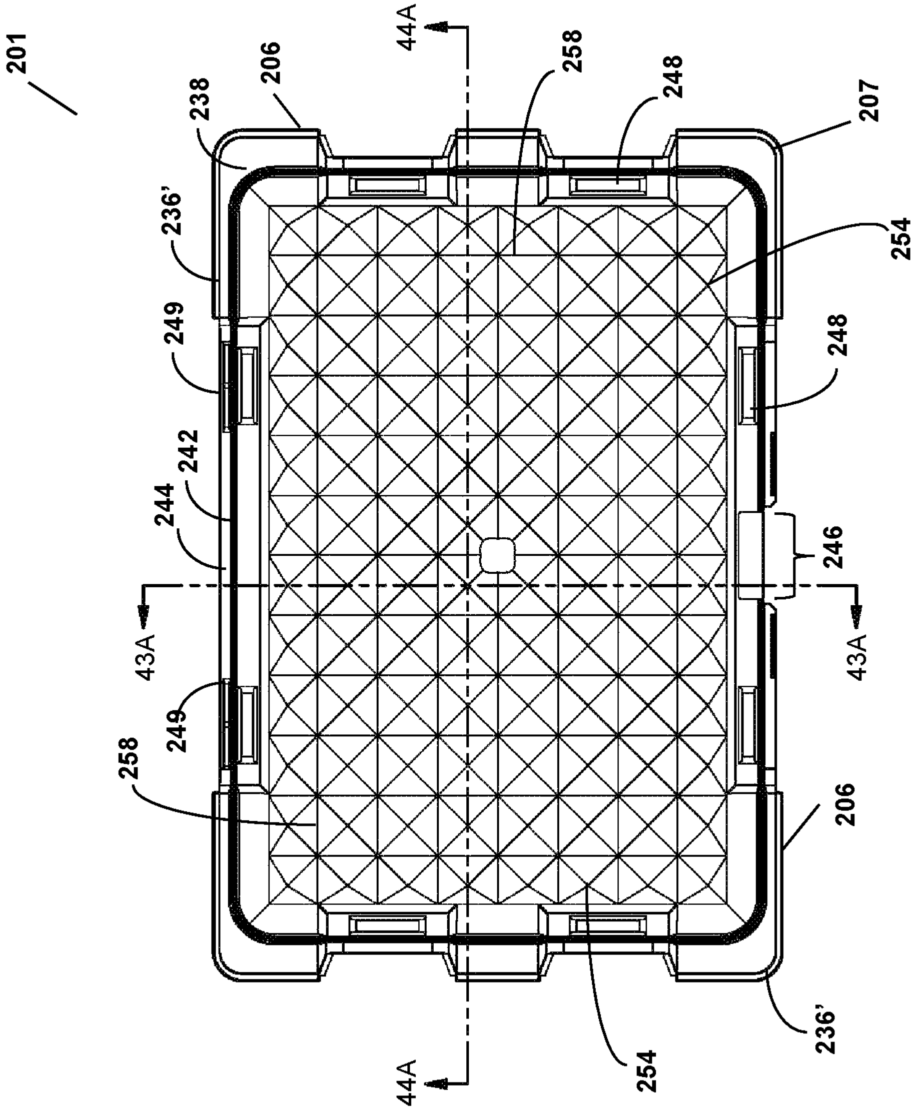
FIG. 42 shows a bottom view thereof.
Figure 43A:
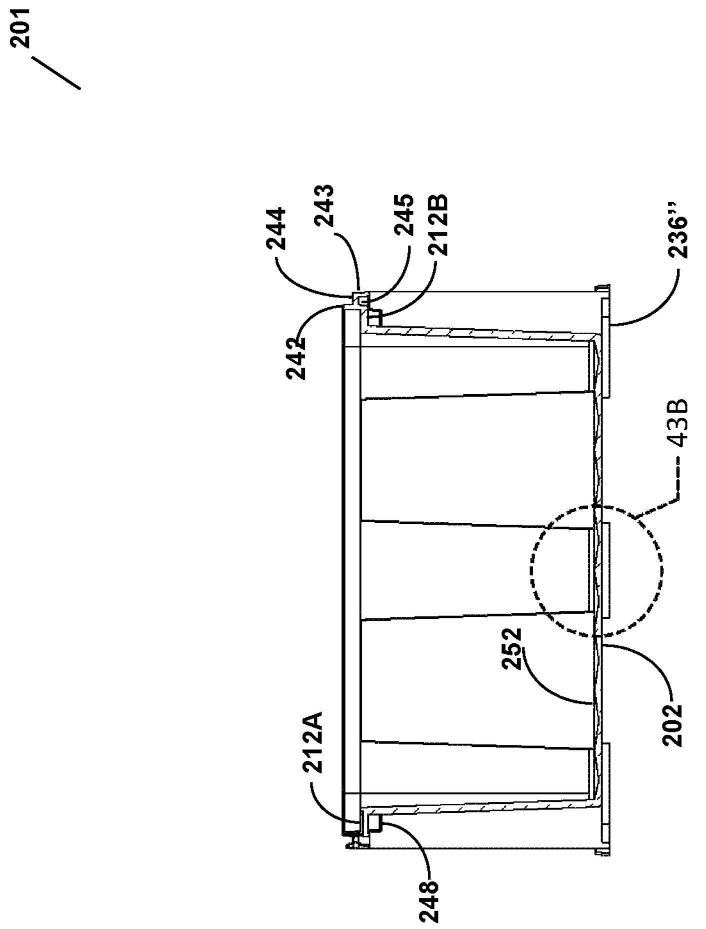
FIG. 43A shows a cross sectional view thereof through line 43A in FIG. 42.
Figure 43B:
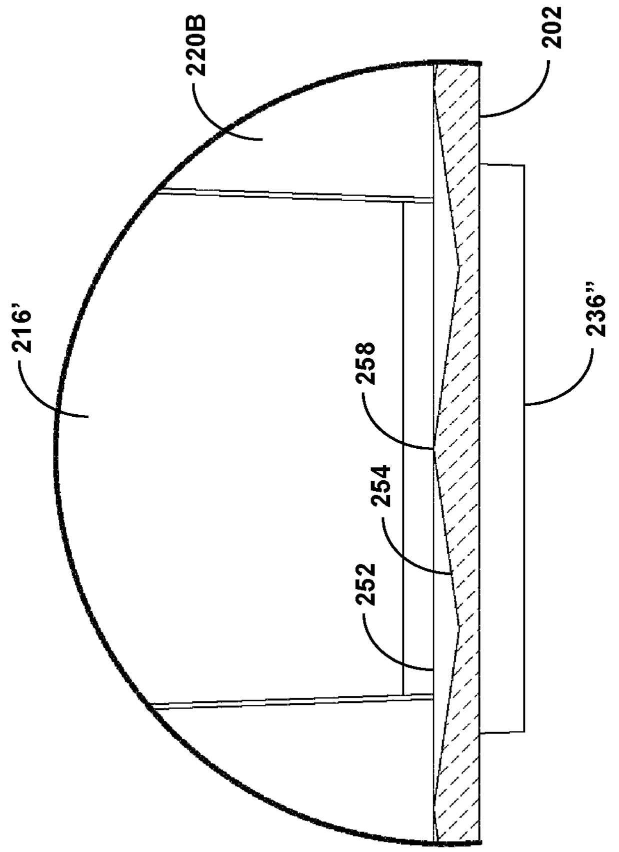
FIG. 43B shows an enlarged sectional view thereof as shown in FIG. 43A.
Figure 44A:
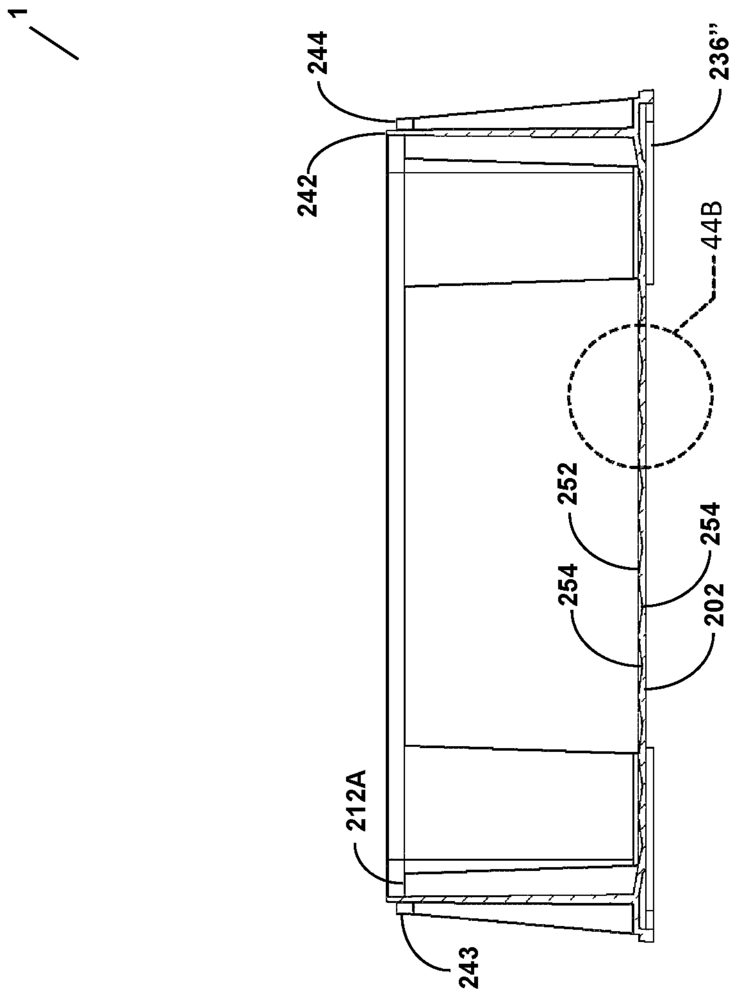
FIG. 44A shows a cross sectional view thereof through line 44A in FIG. 42.
Figure 44B:
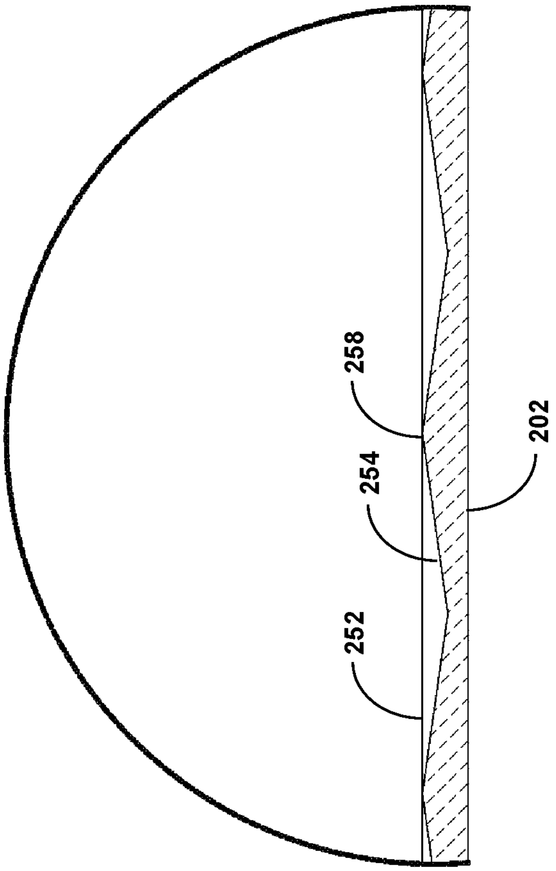
FIG. 44B shows an enlarged sectional view thereof as shown in FIG. 44A.
Figure 45:
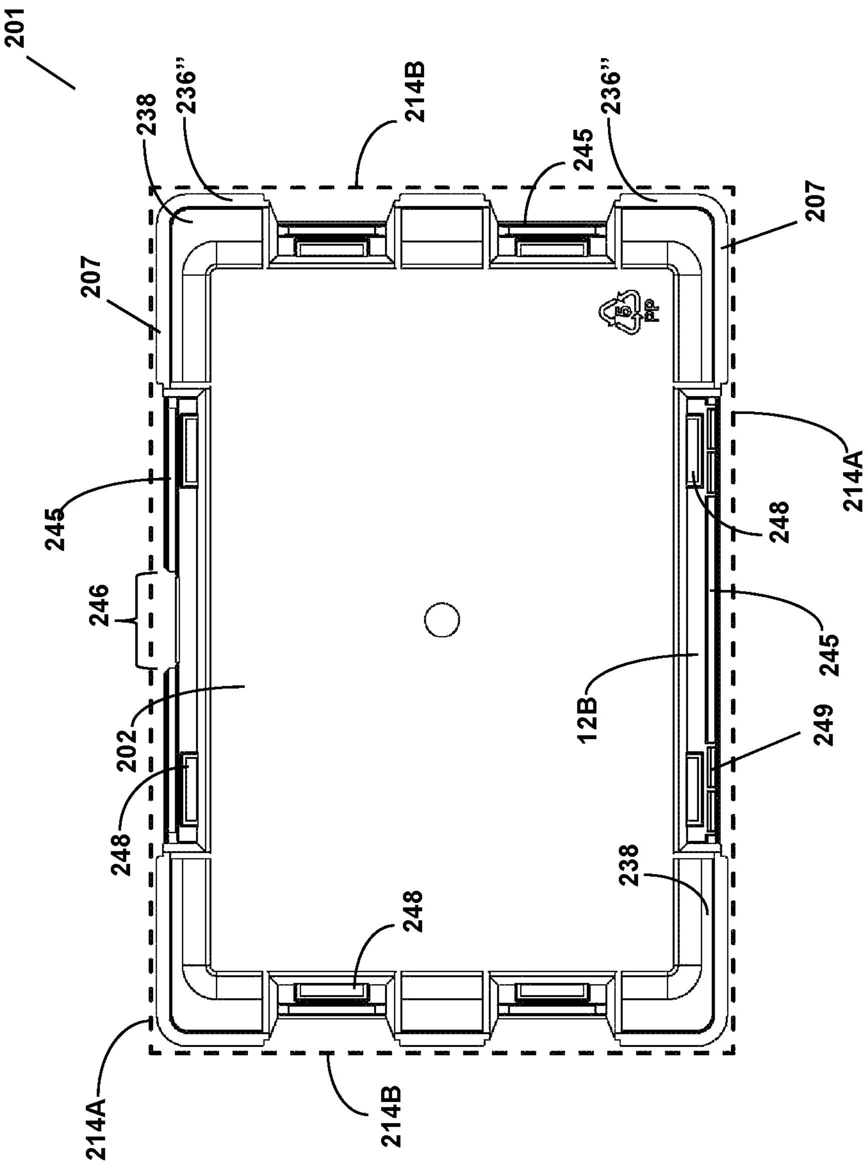
FIG. 45 shows a bottom view of the base shown in FIG. 37A.

In some embodiments a tray comprises one or more tray sidewalls that project from a distal plate surface (e.g., 70). A tray sidewall, when present, extends in a direction from a plate proximal surface (e.g., 68) towards a plate distal surface (e.g., 70). A tray sidewall often projects substantially in an axial direction (e.g., along axis 400 in FIG. 21). An axial length (e.g., as measured along axis 400) of a tray sidewall can be about 15 mm or less, 10 mm or less, about 9 mm or less, about 8 mm or less, about 7 mm or less, about 6 mm or less, about 5 mm or less, about 4 mm or less, about 3 mm or less or about 2 mm or less. In some embodiments an axial length of a tray sidewall is about 15 mm to about 2 mm, about 10 mm to about 2 mm, about 10 mm to about 4 mm or about 10 mm to about 5 mm. In some embodiments an axial length of a tray sidewall is about 10 mm, about 9.5 mm, about 9 mm, about 8.5 mm, about 7 mm, about 7.5 mm, about 6 mm, about 5.5 mm, about 5 mm, about 4.5 mm, about 4 mm, about 3.5 mm, about 3 mm, about 2 mm or about 1 mm. In some embodiments, a tray sidewall comprises a maximum axial length of about 20 mm, about 15 mm or about 10 mm. In some embodiments a tray flange 66 extends (e.g., laterally) from one or more of the tray sidewalls. In certain embodiments a tray flange comprises a proximal ledge 74 and a distal rim 76. A tray flange sometimes spans the perimeter of plate. A tray flange is sometimes continuous and uninterrupted around the perimeter of a plate. A tray flange sometimes comprises an interruption. Sometimes a tray flange comprises a recess (e.g., a beveled recess 96). Sometimes a tray comprises one or more exterior ribs 78 that project from one or more of the tray sidewalls. Exterior ribs sometimes integrate with a tray sidewall and a tray flange (e.g., a proximal ledge of a tray flange). Without being limited to theory, sometimes exterior ribs add support and stability to tray sidewalls and/or to a tray flange. However, depending on the choice of materials used, in some embodiments, exterior ribs are an optional feature of a single-walled tray.

In some embodiments a tray comprises a tab 92 that projects proximal from the proximal plate surface 68. A tray tab is often coextensive and sometimes coplanar with a tray sidewall. In certain embodiments a tray tab comprises a tab supporting rib 94 that integrates with a tab and the proximal plate surface. In some embodiments a tray tab is used as a surface for gripping and sometimes for removing a tray from a base.

In some embodiments a tray comprises a plurality of annular members 80 that project from a distal plate surface. In certain embodiments each annular member is associated with and/or comprises a plate bore 72. Sometimes an annular member comprises a first bore 72' concentric with a plate bore 72. In some embodiments a plate bore and a first bore have substantially the same inner diameter. Sometimes an annular member comprises a second bore 72". In certain embodiments a second bore is concentric with a plate bore and comprises a smaller inner diameter than a first bore.

In some embodiments an annular member comprises a first member 80' and a second member 80". Often the first member and second member of an annular member comprise concentric bores that are concentric with a plate bore. In certain embodiments a first member comprises a first bore 72' and a second member comprises a second bore 72" and the second bore comprises a smaller inner diameter than the first bore. In some embodiments a first member has an outer diameter greater than a second member. In certain embodiments a first member has an outer diameter that is substantially the same as the outer diameter of the second member. Sometimes a first member is proximal to a second member. Sometimes a first member is integrated with a distal plate surface and a second member is not integrated directly with a plate surface. In some embodiments a first member is integrated with and/or coextensive with a second member.

In certain embodiments a tray comprises one or more interior ribs 86, each of which interior ribs is integrated with a first annular member and a second annular member adjacent to the first annular member. Sometimes an interior rib is integrated with a first annular member and one of the tray sidewalls. In some embodiments an interior rib is integrated with a distal plate surface. An interior rib is sometimes parallel with one of the plate sidewalls. Interior ribs, in some embodiments, add support to annular members and sometimes to a plate sidewall. Sometimes all annular members are interconnected with and/or integrated with interior ribs. An interior ribs is sometimes integrated with a first member or a second member, or a first and a second member. Sometimes an annular member, or portion thereof, is integrated with one or more interior ribs. Sometimes an annular member is integrated with 1, 2, 3, 4, 5, 6, 7, 8, 9 or 10 interior ribs.

In some embodiments a tray comprises a tray connector 88, often configured to engage (e.g., mate with) a connector (e.g., a flange connector) on a pipette tip rack base. Sometimes a tray connector projects from the distal rim of a tray flange. Sometimes a tray connector projects and/or extends from a distal portion of a plate sidewall. In some embodiments a tray connector comprises one or more barbs 90. A tray connector can be any suitable connector. A tray connector is sometimes a talon connector. In some embodiments a tray comprises 1 or more connectors. Sometimes a tray comprises at least 4 and sometimes at least 8 connectors. Sometimes a tray comprises 1, 2, 3, 4, 5, 6, 7, 8, 9, 10, 11, 12, 13, 14, 15, 16, 17, 18, 19, or 20 connectors. In some embodiments a tray sidewall comprises 1 or more connectors. Sometimes a tray sidewall comprises 1, 2, 3, 4, 5, 6, 7, 8, 9, or 10 connectors. Sometimes a tray sidewall does not comprise a connector. In certain embodiments each of two opposing tray sidewalls (e.g., two long sidewalls) comprise 1 or more connectors and each of two other opposing sidewalls (e.g., two short sidewalls), do not comprise a connector. In some embodiments each of two opposing tray sidewalls (e.g., two long sidewalls) comprise 2 connectors and each of two other opposing sidewalls (e.g., two short sidewalls) comprises one connector.

Lid

In some embodiments a tray comprises a lid 100 comprising lid sidewalls 108, a lid proximal surface 106 and a lid interior distal surface 116. In some embodiments a lid comprises four lid sidewalls arranged in a substantially rectangular configuration. Lid sidewalls are sometimes connected by a lid side junction 110. In some embodiments a lid sidewall and/or a lid side junction comprises a lid distal edge 130. A lid side junction is configured to connect two lid sidewalls. Sometimes a lid comprises four lid side junctions. A lid side junction can be a suitable configuration, non-limiting examples of which include a 90 degree junction, a corner, a curve, a bevel, angled, planar, the like or combinations thereof. Lid sidewalls and a lid side junction are often integrated with a lid proximal surface and/or an interior distal surface. Lid sidewalls, a lid proximal surface and/or a lid interior distal surface are sometimes substantially flat. A lid proximal surface sometimes comprises a lid top member 112, ridges, bumps or/or dents. Sometimes a lid top member 112, ridges, bumps or/or dents, when present, are configured for a lid proximal surface to engage a base bottom (e.g., for stacking pipette tip racks).

In some embodiments a lid, or portions thereof (e.g., lid sidewalls, junction, interior distal surface or lid proximal surface) comprise interior and/or exterior ribs or ridges that provide support and structural integrity to a lid. Sometimes a lid, or portions thereof, does not comprises ribs or ridges.

In some embodiments a lid is configured to engage a base. A lid distal edge 130, or portions thereof, is sometimes configured to engage a lip (e.g., a lid proximal surface), flange and/or a ridge of a base. In some embodiments a lid comprises a suitable connector (e.g., a lid connector 102, a clasp 104) configured to engage (e.g., mate with, attach to) a connector on a base. In some embodiments a lid and/or lid sidewall comprises one or more connectors. In some embodiments a connector on a lid is coextensive with a lid sidewall and projects in a distal orientation from a lid sidewall. Sometimes a lid and/or lid sidewall comprises 1, 2, 3, 4, 5, 6 or more connectors. Sometimes only two lid sidewalls comprises lid connectors. Sometimes only one lid sidewall comprises lid connectors. In some embodiments a connector is coextensive with a lid sidewall and projects in a distal orientation from a lid sidewall.

In some embodiments a lid comprises a lid connector 102 configured to engage (e.g., mate with, attach to) a lip connector on the lip of the base. In some embodiments a lid connector is coextensive with a lid sidewall and projects in a distal orientation from a lid sidewall. A lid connector sometimes comprises a hinge 118 and/or a hinge projection 120. In some embodiments a hinge and/or a hinge projection are configured to reversibly connect a lid connector to a lip connector. In certain embodiments a lid connector is configured (e.g., with a hinge) to connect a lid to a base and allow the lid to open and close while the lid remains attached to the base. In some embodiments a lid and/or lid sidewall comprises one or more lid connectors. Sometimes a lid and/or lid sidewall comprises 1, 2, 3, 4, 5, 6 or more lid connectors. Sometimes only one lid sidewall comprises lid connectors.

In certain embodiments a lid comprises a clasp configured to engage a base flange at the interruption on the ridge 46 of a base. In some embodiments a clasp is coextensive with a lid sidewall and projects in a distal orientation from a lid sidewall. In some embodiments a clasp is a connector and sometimes an interruption of the ridge 46 is a connector. Sometimes a clasp is a connector configured to reversibly engage (e.g., mate with) a connector on a base (e.g., an interruption of a ridge). A clasp sometimes comprises a clasp projection 122 configured to engage a base flange at the interruption on the ridge 46 of a base.

In certain embodiments a lid and/or a lid sidewall comprises one or more lid flanges 114. In some embodiments a lid sidewall comprises 1, 2, 3, 4, 5, 6, or more flanges. In certain embodiments a lid sidewall that comprises a clasp comprises two flanges. In some embodiments a lid sidewall that comprises a lid connector (e.g., a connector with a hinge, a connector that is not a clasp) does not comprise a flange. A lid flange is often coextensive and/or coplanar with a lid sidewall. A lid flange often projects in a distal orientation from a lid sidewall and/or a lid distal edge. A lid flange is sometimes configured to engage a buttress. For example, sometimes a lid flange, or portion thereof, is configured to mate with a buttress between two opposing buttress sidewalls (e.g., when a lid engages a base (e.g., when a lid is in a closed position)). A lid flange sometimes engages (e.g., sets upon) a buttress face (e.g., when a lid engages a base (e.g., when a lid is in a closed position)). In some embodiments a lid side junction comprises a lid flange. In some embodiments a lid side junction is coextensive with a lid flange. In some embodiments a lid flange is coextensive with two lid side walls and a lid side junction. In some embodiments a lid flange that is coextensive with two lid side walls and a lid side junction is configured to reversibly engage a clamped buttress.

Single-Walled Construction

In certain embodiments a rack or rack component (e.g., a base, lid, tray) is of single-walled construction (e.g., single walls) and is termed herein a single-walled rack, single-walled base, single-walled lid, and/or single-walled tray. In certain embodiments all components of a rack (e.g., base, lid, & tray) comprise or consist of a single-walled construction. Sometimes all components of a single-walled base (e.g., base side walls, bottom, buttresses (e.g., buttress sidewalls, face, bottom), ridges, flanges, lips, the like or combinations thereof) are of a single-walled construction. In some embodiments, a pipette tip rack assembly (e.g., comprising at least a base and a tray) is entirely of single-walled construction.

A base and/or tray of single-walled construction often is constructed from a single layer of a material. For example, walls of a single-walled rack or base often are only a single layer of material that separates the interior of the rack or base from the exterior of the rack or base. In some embodiments walls of a single-walled base assembled with a tray, are only a single layer of material that separates the interior of the base from the exterior of the base. In some embodiments a single-walled base or single-walled portion of a base comprises only a single layer of material that separates the interior of the base from the exterior of the base. In some embodiments a single-walled component of a rack (e.g., a singled walled base, tray, lid) includes no double walls. Sometimes a component or assembly of single-walled construction (e.g., a single-walled rack, e.g., lid, tray, base or portion thereof) does not include any substantial air pockets or air space within a wall (e.g., sidewall and/or a bottom). A rack component or base, or portion thereof of single-walled construction generally does not include a void between walls. For example, in some embodiments, a single-walled pipette tip rack assembly (e.g., comprising at least a base and a tray), is substantially single-walled, where only a single wall of material separates the interior of the assembly from the exterior of the assembly.

A single-walled base often comprises an interior perimeter that includes the sum of all interior sidewalls (e.g., 18B and 20B), junctions (e.g., 22), buttress sidewall inner surfaces (e.g., 30A) and/or buttress face interiors (e.g., 16'). The walls defining the interior perimeter of a single-wall base generally are entirely of single-walled construction.

In some embodiments all walls (e.g., all sidewalls) of a single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments all walls (e.g., base sidewalls, buttress walls, junctions, the like) of a single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments all walls of a single-walled rack base (e.g., any one wall, every wall, e.g., a base bottom, a base sidewall) are about 0.5, 0.6, 0.7, 0.8, 0.9, 1.0, 1.1, 1.2, 1.3, 1.4, 1.5 or 2 mm thick. Sometimes the maximum thickness of every wall (e.g., all walls) of a single-walled rack base is 2 mm or less, 1.9 mm or less, 1.8 mm or less, 1.7 mm or less, 1.6 mm or less, 1.5 mm or less, 1.4 mm or less, 1.3 mm or less, 1.2 mm or less, 1.1 mm or less, 1.0 mm or less, 0.9 mm or less, 0.8 mm or less or 0.70 mm or less. In certain embodiments, the wall thickness of the bottom of a single-walled base varies in thickness (e.g., within the range of wall thicknesses herein) due, in part, to wells, walls and/or ridges on the bottom interior surface.

In some embodiments all walls of a buttress (e.g., a buttress sidewall, a buttress face) of a single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments all walls of all buttresses of a single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments all walls of buttress of a single-walled rack base are about 0.5, 0.6, 0.7, 0.8, 0.9, 1.0, 1.1, 1.2, 1.3, 1.4, 1.5 or 2 mm thick. Sometimes the maximum thickness of any one wall and/or all walls of all buttresses of a single-walled rack base is 2 mm or less, 1.9 mm or less, 1.8 mm or less, 1.7 mm or less, 1.6 mm or less, 1.5 mm or less, 1.4 mm or less, 1.3 mm or less, 1.2 mm or less, 1.1 mm or less, 1.0 mm or less, 0.9 mm or less, 0.8 mm or less or 0.70 mm or less.

In some embodiments all structures (e.g., connectors, ridges, ribs, lip, flanges, and the like) of a single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments all structures of a single-walled rack base are about 0.5, 0.6, 0.7, 0.8, 0.9, 1.0, 1.1, 1.2, 1.3, 1.4, 1.5 or 2 mm thick. Sometimes the maximum thickness of any one structure and/or all structures of a single-walled rack base is 2 mm or less, 1.9 mm or less, 1.8 mm or less, 1.7 mm or less, 1.6 mm or less, 1.5 mm or less, 1.4 mm or less, 1.3 mm or less, 1.2 mm or less, 1.1 mm or less, 1.0 mm or less, 0.9 mm or less, 0.8 mm or less or 0.70 mm or less.

In some embodiments, any one wall of a lid and/or tray of a single-walled rack is about 0.1 to about 3 mm, about 0.1 to about 1.5 mm, about 0.5 to about 1.5 mm, 0.8 to about 1.2 or about 0.9 to about 1.1 mm thick. In some embodiments all walls of a lid and/or tray of a single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments all walls of a lid and/or tray of a single-walled rack base are about 0.5, 0.6, 0.7, 0.8, 0.9, 1.0, 1.1, 1.2, 1.3, 1.4, 1.5 or 2 mm thick. Sometimes the maximum thickness of all walls of a lid and/or tray of a single-walled rack base is 2 mm or less, 1.9 mm or less, 1.8 mm or less, 1.7 mm or less, 1.6 mm or less, 1.5 mm or less, 1.4 mm or less, 1.3 mm or less, 1.2 mm or less, 1.1 mm or less, 1.0 mm or less, 0.9 mm or less, 0.8 mm or less or 0.70 mm or less.

Partial Single-Walled Construction

In certain embodiments a partial single-walled pipette tip rack (e.g., a base, or assembly of a base and tray) comprises single-walls and double-walls. In some embodiments a partial single-walled pipette tip rack comprises primarily single-walls and certain features or components that are double-walled. In some embodiments a partial single-walled base comprises one or more components that are double-walled. For example, in some embodiments, most walls of a rack base or rack assembly (e.g., base sidewalls, buttress face surfaces, buttress sidewall surfaces, junctions, tray, and the like, or combinations thereof) of a partial single-walled rack base or rack assembly are of substantially single-walled construction with the exception of one or more double-walled posts. In some embodiments the interior wall perimeter of a partial single-walled pipette tip rack base is about 60% or greater, 70% or greater, 80% or greater, 90% or greater, or 95% or greater, single walls. In some embodiments the interior wall perimeter of a partial single-walled pipette tip rack base is about 90%, 91%, 92%, 93%, 94%, 95%, 96%, 97%, 98% or 99% single walls. For example, a base often comprises an interior perimeter that includes the sum of all interior sidewalls (e.g., 318B and 320B), junctions (e.g., 322), buttress sidewall inner surfaces (e.g., 330A), buttress face interiors (e.g., 316') and/or post inner walls (e.g., 327B). In certain embodiments a partial single-walled pipette tip rack base comprises an interior perimeter comprising of about 40% or less, 35% or less, 30% or less, 25% or less, 20% or less or 10% or less double walls, where the remaining portions of the interior perimeter are single-walls. In some embodiments a partial single-walled pipette tip rack base comprises an interior perimeter comprising of about 20%, about 19%, about 18%, about 17%, about 16%, about 15%, about 14%, about 13%, about 12%, about 11%, or about 10% or less double walls, where the remaining portions of the interior perimeter are single-walls.

Figure 10A:
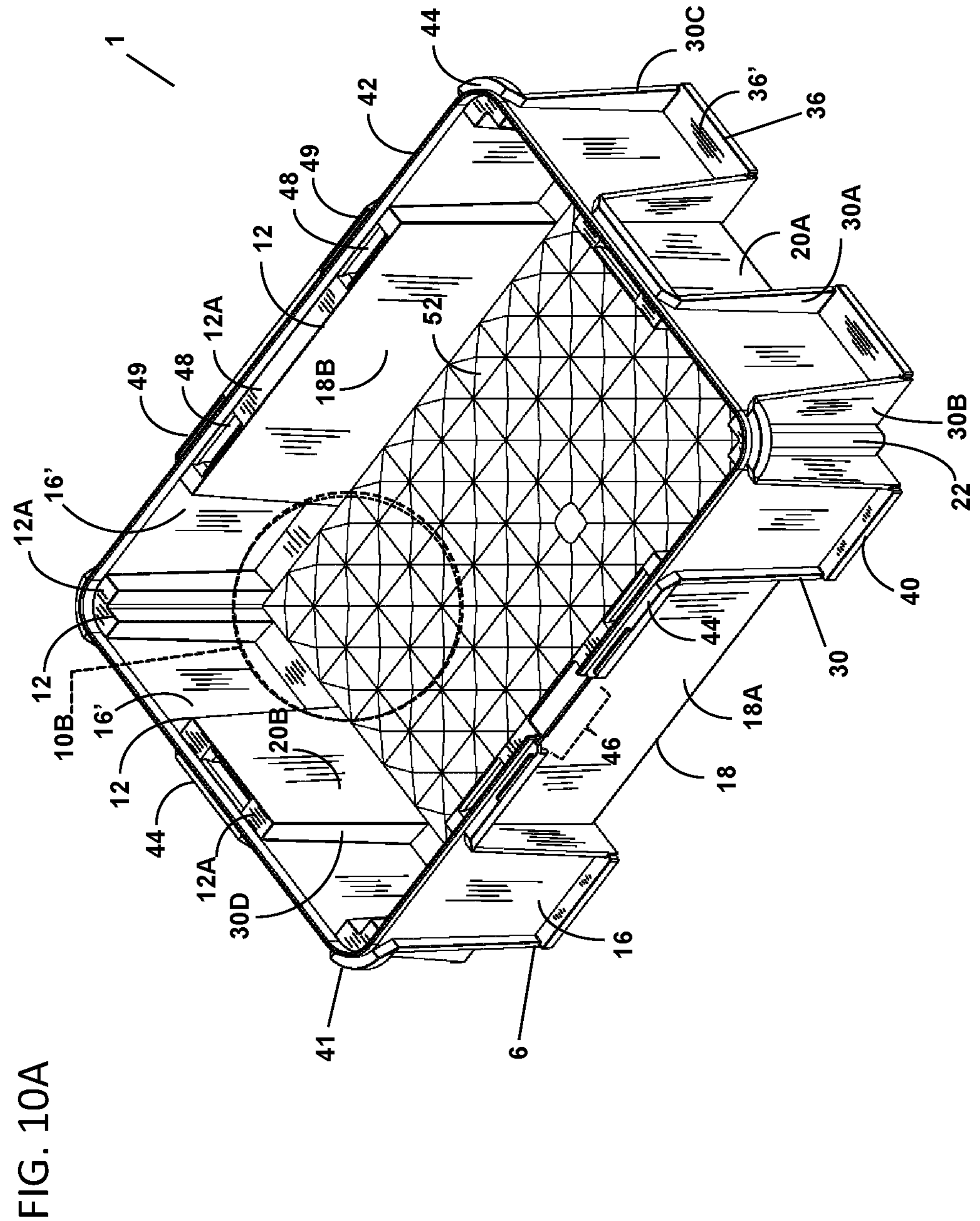
FIG. 10A shows a top perspective view of an embodiment of a single-walled pipette tip rack base.
Figure 10B:
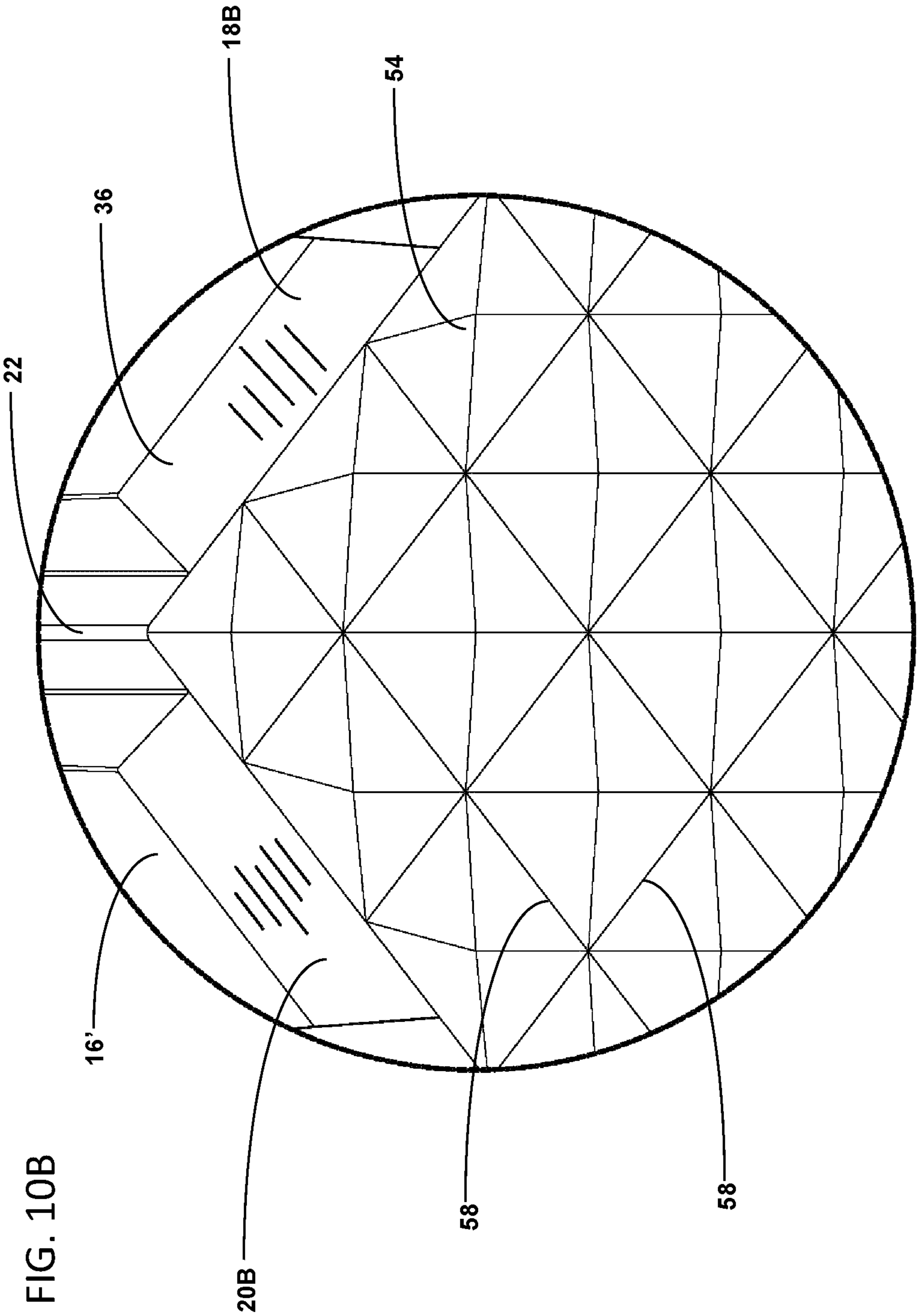
FIG. 10B shows an enlarged partial view thereof as shown in FIG. 10A.
Figure 11:
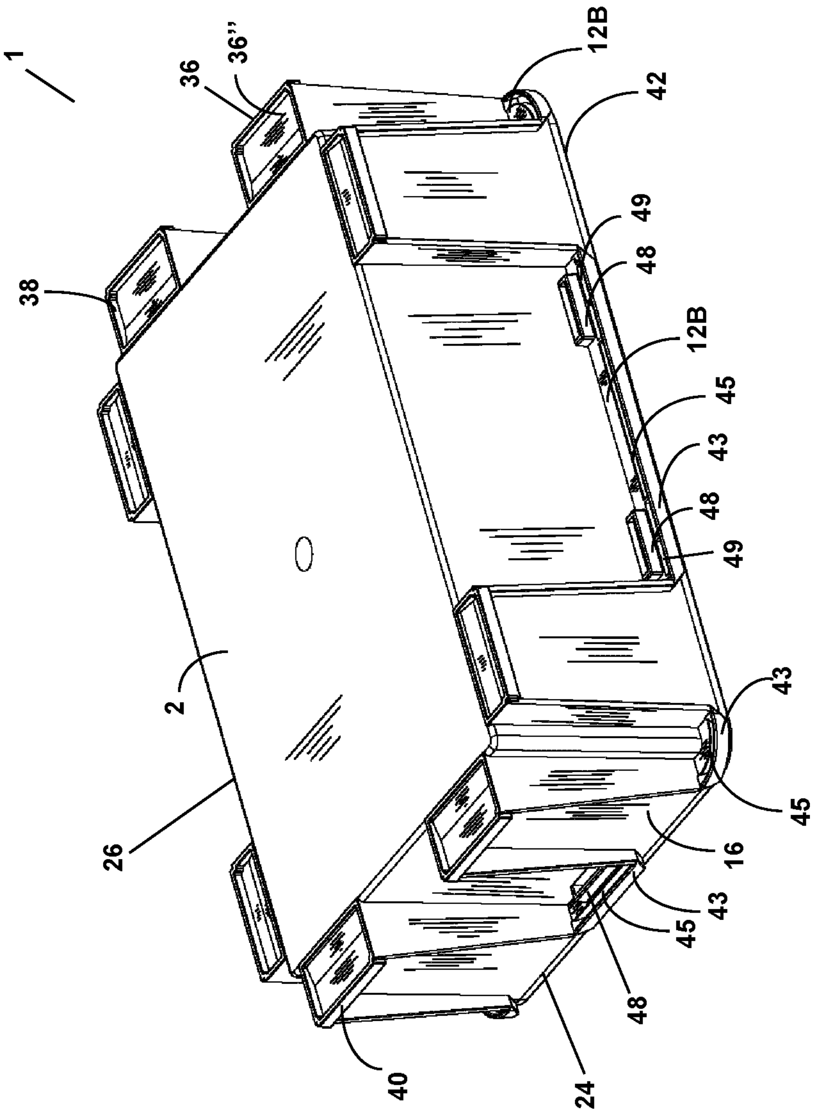
FIG. 11 shows a bottom perspective view of the single-walled pipette tip rack base shown in FIG. 10A.
Figure 12A:
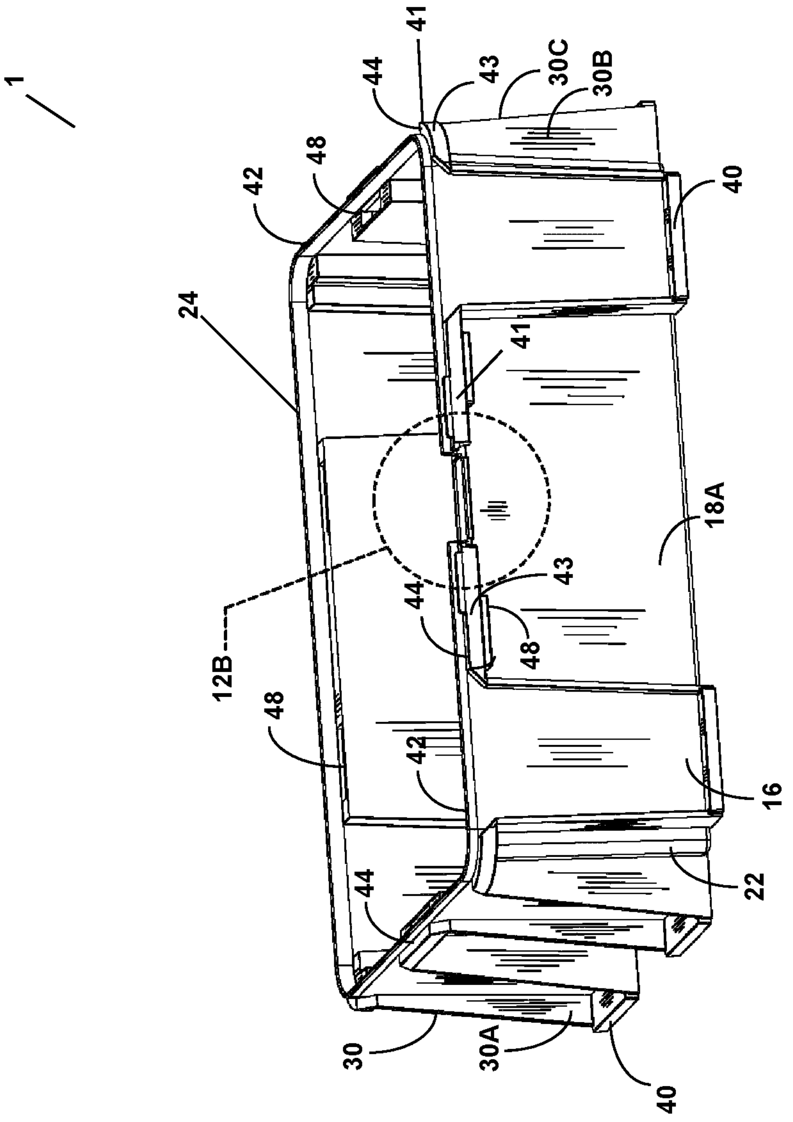
FIG. 12A shows a front perspective view thereof.
Figure 12B:
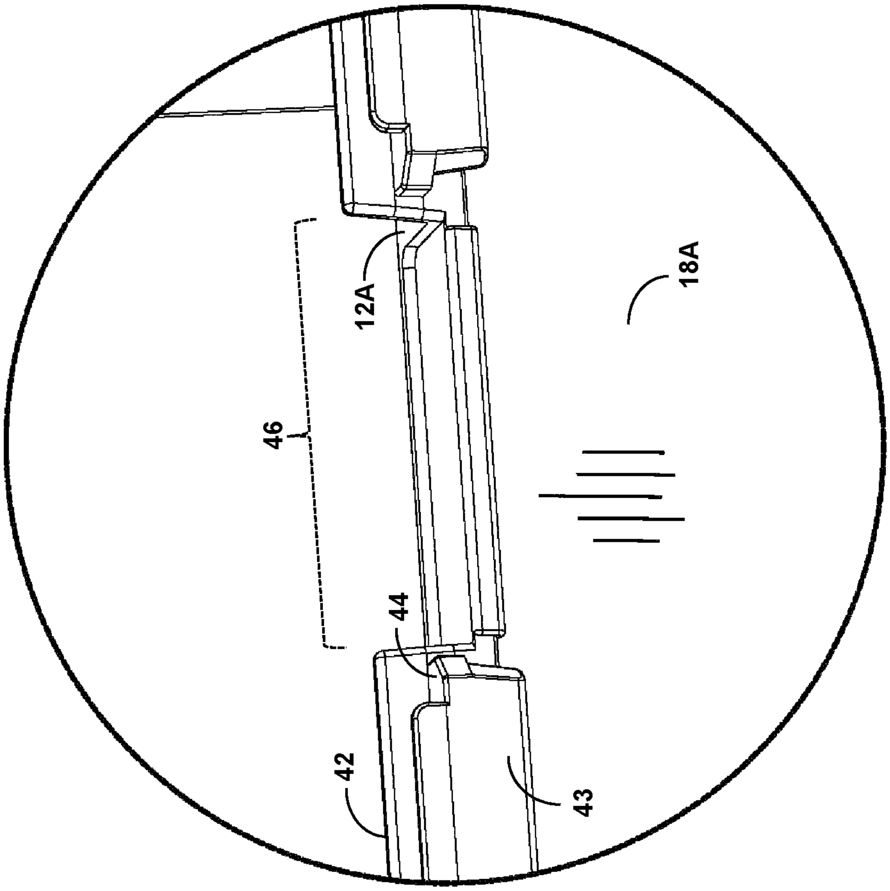
FIG. 12B shows an enlarged partial view thereof as shown in FIG. 12A.

A "double-walled" construction often refers to two layers of material (e.g., walls, e.g., double walls) that separate the interior of a base, or a portion thereof, from the exterior of a base, or a portion thereof. In some embodiments a double-walled construction comprises two opposing walls or barriers (e.g., double walls), which often are separated by a void. In some embodiments, a partial single-walled pipette tip rack base is primarily of single-wall construction and includes one or more posts of double-walled construction, where one of the post walls is an extension of an adjacent wall of single-walled construction. For example, as shown in FIG. 46, post inner wall portion 327B' is an extension of adjacent base sidewall 316' which comprises a single-walled construction. In some embodiments, one wall of a post is a wall present in certain single-walled base embodiments (e.g., wall junction 22 in FIG. 10A is similar to post inner wall 327B comprising wall junction 322 in FIG. 47). In some embodiments a post wall (e.g., a post inner wall, a post outer wall) is integrated with a single-walled portion of a base. In some embodiments a post inner wall is integrated with and/or co-extensive with a base sidewall (e.g., a base interior sidewall surface, a base exterior sidewall surface), or portion thereof. In some embodiments a post outer wall is integrated with and/or co-extensive with a base sidewall (e.g., a base interior sidewall surface, a base exterior sidewall surface), or portion thereof.

In some embodiments a wall (e.g., a base sidewall) of a partial single-walled rack base is about 0.1 to about 3 mm, about 0.1 to about 1.5 mm, about 0.5 to about 1.5 mm, 0.8 to about 1.2 or about 0.9 to about 1.1 mm thick. In some embodiments all walls (e.g., base sidewalls, buttress walls, junctions, the like) of a partial single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments a wall of a partial single-walled rack base (e.g., any one wall, top, bottom, sides) is about 0.5, 0.6, 0.7, 0.8, 0.9, 1.0, 1.1, 1.2, 1.3, 1.4, 1.5 or 2 mm thick. Sometimes the maximum thickness of all walls of a partial single-walled rack base is 2 mm or less, 1.9 mm or less, 1.8 mm or less, 1.7 mm or less, 1.6 mm or less, 1.5 mm or less, 1.4 mm or less, 1.3 mm or less, 1.2 mm or less, 1.1 mm or less, 1.0 mm or less, 0.9 mm or less, 0.8 mm or less or 0.70 mm or less. In certain embodiments, the wall thickness of the bottom of a partial single-walled base varies in thickness (e.g., within the range of wall thicknesses herein) due, in part, to wells, walls and/or ridges on the bottom interior surface.

In some embodiments a wall of a buttress (e.g., a buttress sidewall, a buttress face) of a partial single-walled rack base is about 0.1 to about 3 mm, about 0.1 to about 1.5 mm, about 0.5 to about 1.5 mm, 0.8 to about 1.2 or about 0.9 to about 1.1 mm thick. In some embodiments all walls of a buttress of a partial single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments a wall of buttress of a partial single-walled rack base is about 0.5, 0.6, 0.7, 0.8, 0.9, 1.0, 1.1, 1.2, 1.3, 1.4, 1.5 or 2 mm thick. Sometimes the maximum thickness of a wall of a buttress of a partial single-walled rack base is 2 mm or less, 1.9 mm or less, 1.8 mm or less, 1.7 mm or less, 1.6 mm or less, 1.5 mm or less, 1.4 mm or less, 1.3 mm or less, 1.2 mm or less, 1.1 mm or less, 1.0 mm or less, 0.9 mm or less, 0.8 mm or less or 0.70 mm or less.

In some embodiments, any one wall of a lid and/or tray of a partial single-walled rack is about 0.1 to about 3 mm, about 0.1 to about 1.5 mm, about 0.5 to about 1.5 mm, 0.8 to about 1.2 or about 0.9 to about 1.1 mm thick. In some embodiments all walls of a lid and/or tray of a partial single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments a wall of a lid and/or tray of a partial single-walled rack base is about 0.5, 0.6, 0.7, 0.8, 0.9, 1.0, 1.1, 1.2, 1.3, 1.4, 1.5 or 2 mm thick. Sometimes the maximum thickness of a wall of a lid and/or tray of a partial single-walled rack base is 2 mm or less, 1.9 mm or less, 1.8 mm or less, 1.7 mm or less, 1.6 mm or less, 1.5 mm or less, 1.4 mm or less, 1.3 mm or less, 1.2 mm or less, 1.1 mm or less, 1.0 mm or less, 0.9 mm or less, 0.8 mm or less or 0.70 mm or less.

In some embodiments, any one wall of a post of a partial single-walled rack is about 0.1 to about 3 mm, about 0.1 to about 1.5 mm, about 0.5 to about 1.5 mm, 0.8 to about 1.2 or about 0.9 to about 1.1 mm thick. In some embodiments all walls of a post of a partial single-walled rack base are about 0.1 to about 3 mm, about 0.1 to about 1.5 mm, about 0.5 to about 1.5 mm, 0.8 to about 1.2 or about 0.9 to about 1.1 mm thick. In some embodiments a wall of a post of a partial single-walled rack base is about 0.5, 0.6, 0.7, 0.8, 0.9, 1.0, 1.1, 1.2, 1.3, 1.4, 1.5 or 2 mm thick. Sometimes the maximum thickness of a wall of a post of a partial single-walled rack base is 2 mm or less, 1.9 mm or less, 1.8 mm or less, 1.7 mm or less, 1.6 mm or less, 1.5 mm or less, 1.4 mm or less, 1.3 mm or less, 1.2 mm or less, 1.1 mm or less, 1.0 mm or less, 0.9 mm or less, 0.8 mm or less or 0.70 mm or less.

Connectors

Connectors (e.g., a connector pair, complementary connectors) on a base, lid and/or tray can interact in any convenient arrangement, including without limitation, a slip fit, interference fit, snap fit, locked engagement, removable engagement, reversible engagement, releasable engagement and combinations thereof (e.g., locked engagement and reversible engagement). In some embodiments a connector (e.g., a connector pair) comprises a projection-orifice arrangement (e.g., male-female connectors), for example. A suitable projection connector can be used on a base, lid and/or tray, non-limiting examples of which include tabs, pins, pegs, barbs, hooks, prongs, the like or combinations thereof. A connector can have any suitable profile, including without limitation, S-shape, J-shape, I-shape, W-shape, cross or X-shape and Y-shape profiles and the like. A projection connector sometimes can include one or more terminal projections configured to effect an interference fit or snap-fit (e.g., barb, node, boss and the like), in some embodiments. A projection connector can include a region of decreased thickness, and/or a region of increased thickness, and sometimes flexes in an area of decreased thickness. A suitable orifice connector can be used on a base, lid and/or tray, non-limiting examples of which include apertures, slots, holes, bores, indentations, cross or X-shapes, the like or combinations thereof. Projection connectors generally are configured to mate with a counterpart orifice connector.

A connector can be in connection (e.g., integrated, molded, fused to, coextensive, adhered, welded, glued, the like or a combination thereof) with any suitable portion of a lid (e.g., a lid sidewall), portion of a tray (e.g., tray flange, distal rim, tray sidewall) and/or portion of a base (e.g., flange, lip, ridge).

A connector can be constructed from any suitable material for flexible arrangement between the lid and base. A connector sometimes is constructed from a moldable material and sometimes a polymer (e.g., plastic, thermoplastic). Non-limiting examples of moldable materials include polypropylene (PP), polyethylene (PE), high-density polyethylene (HDPE), low-density polyethylene (LDPE), polyethylene teraphthalate (PET), polyvinyl chloride (PVC), polytetrafluoroethylene (PTFE), polystyrene (PS), high-density polystyrene, acrylonitrile butadiene styrene copolymers, cross-linked polysiloxanes, polyurethanes, (meth)acrylate-based polymers, cellulose and cellulose derivatives, polycarbonates, ABS, tetrafluoroethylene polymers, corresponding copolymers, plastics with higher flow and lower viscosity or a combination of two or more of the foregoing, and the like. A connector can be constructed from the same material, or different material, as the tray, base or lid element to which the connector is connected. In some embodiments, a connector component is constructed from a material different than the material from which its connector component counterpart is manufactured. A connector sometimes is manufactured from two or more materials in some embodiments. A lid and base sometimes are connected by connectors configured as a hinge in some embodiments.

When projection-orifice connectors are connected, a portion of, or all of, the projection connector often is concealed (e.g., substantially concealed, partially concealed, partially inserted). In some embodiments, a tab in association with the lid can be concealed within a slot in association with a base. A projection connector can include a flexible feature in some embodiments. A flexible feature sometimes is a seam, indentation, region of thinner thickness, junction and the like. In certain embodiments, a junction between a lid and a lid connector (e.g., a tab, a clasp) serves as a flexible joint feature (e.g., hinge feature).

Any suitable number of projection connectors and orifice connectors may be utilized. In certain embodiments about 1 to about 100 connectors can be utilized (e.g., about 2, 3, 4, 5, 6, 7, 8, 9, 10, 20, 30, 40, 50, 60, 70, 80, 90). The number of projection connectors is equal to or fewer than the number of orifice connectors in certain embodiments. In some embodiments, a tray has fewer tabs than slots, and sometimes there are slots on each short side of a base and a lid having tabs can be mounted to either side of the base. In certain embodiments, the slots are on each long side of a base and a lid having tabs can be mounted to either long side of the base. In some embodiments, the slots are on each short side of a base and a lid having tabs can be mounted to either short side of the base.

Methods

In some embodiments a single-walled pipette tip rack or partial single-walled pipette tip rack comprising a base and a tray and/or a lid is loaded with one or more pipette tips. Sometimes a rack as described herein is loaded with 1 to 384 pipette tips or more. Sometimes a rack is loaded with 1, 2, 4, 8, 12, 16, 24, 32, 48, 64, 96, 128, 256 or 384 pipette tips.

In certain embodiments a rack is loaded with a suitable number of pipette tips and the pipette tips are loaded and/or inserted into the plate bores of a tray. Sometimes pipette tips are loaded into a rack as described herein by a suitable automated device configured to load pipette tips into rack. In certain embodiments a rack is loaded with pipette tips where the pipette tips are disposed within the plate bores of a tray. Sometimes a rack is loaded with pipette tips disposed within the plate bores of a tray and the rack comprising pipette tips is covered with a lid (e.g., by closing a lid).

In some embodiments a rack as described herein, or portions thereof, is sometimes loaded with pipette tips and the assembly (e.g., rack, tray, pipette tips, and/or lid) is sterilized by a suitable method. Sometimes a rack as described herein is optionally loaded with pipette tips, sterilized and sealed by a suitable method (e.g., sealed with plastic, shrink wrap and/or or a suitable material).

In certain embodiments, one or more pipette tips disposed within the plate bores of a rack as described herein, are removed from the rack (e.g., by an automated fluid handling device). In some embodiments one or more pipette tips are removed from a rack at any one time. Sometimes pipette tips are removed from a rack 2, 3, 4, 5, 6, 7, 8, 16, 24, 32, 48, 64, 96, 128, 256 or 384 at a time. In some embodiments pipette tips are removed from a rack one at time. In some embodiments a rack is repeatedly loaded with pipette tips and pipette tips are repeatedly removed from the rack.

In some embodiments a base as described herein is engaged with an automated fluid handling device. Sometimes an automated fluid handling device comprises a stage configured to engage a base as described. Sometimes an automated fluid handling device comprises a stage configured to engage a base, as described herein, comprising a footprint configured to SBS standards for a microplate footprint. In some embodiments an automated fluid handling device engages a base by a suitable method, non-limiting examples of which include a retaining structure (e.g., a structure that restricts lateral movement of a base (e.g., a retaining ridge, projections, and/or a tray, any one of which are configured to the dimensions of a base footprint)), compression of the base or a portion thereof (e.g., base sidewalls, a buttress, or a portion thereof), one or more feet (e.g., pads, e.g., rubber pads) configured to engage a buttress bottom or portion thereof (e.g., a bottom recess), clamps (e.g., a clamp configured to engage a buttress or portion thereof, e.g., a buttress bottom), the like or combinations thereof.

In some embodiments a base is used as a basin. In some embodiments liquid is introduced into a base and the liquid is contained within the base sidewalls and the base bottom. Sometimes a fluid is transferred to or from a base. For example, sometimes a fluid is transferred to or from one or more features of a base bottom (e.g., a well, a depression, or the like) where the liquid is contained. In certain embodiments a liquid retained within a base, as described herein, is removed and/or transferred to another location by a device (e.g., a pipette, a multichannel pipette, an automated fluid handling device (e.g., a device comprising an array of nozzles with an array of pipette tips affixed to the nozzles)). In certain embodiments liquid retained within a feature of a base bottom (e.g., a well, a depression, or the like) is removed and/or transferred to another location by a device (e.g., a pipette, a multichannel pipette, an automated fluid handling device (e.g., a device comprising an array of nozzles with an array of pipette tips affixed to the nozzles)). Sometimes fluid is transferred from a base, as described herein, to another container (e.g., one or more tubes, wells (e.g., wells of a microtiter plate)) by a device (e.g., an automated fluid handling device)).

Methods of Manufacturing—Materials

Each rack component here (e.g., base, lid, tray, and portions thereof) can be manufactured from a commercially suitable material. Rack components often are manufactured from one or more moldable materials, independently selected from those that include, without limitation, polypropylene (PP), polyethylene (PE), high-density polyethylene (HDPE), low-density polyethylene (LDPE), polyethylene terephthalate (PET), polyvinyl chloride (PVC), polytetrafluoroethylene (PTFE), polystyrene (PS), high-density polystyrene, acrylonitrile butadiene styrene copolymers, cross-linked polysiloxanes, polyurethanes, (meth)acrylate-based polymers, cellulose and cellulose derivatives, polycarbonates, ABS, tetrafluoroethylene polymers, corresponding copolymers, plastics with higher flow and lower viscosity or a combination of two or more of the foregoing, and the like.

Non-limiting examples of plastics with higher flow and lower viscosity include, any suitable material having a hardness characterized by one or more of the following properties, in certain embodiments: a melt flow rate (230 degrees Celsius at 2.16 kg) of about 30 to about 75 grams per 10 minutes using an ASTM D 1238 test method; a tensile strength at yield of about 3900 to about 5000 pounds per square inch using an ASTM D 638 test method; a tensile elongation at yield of about 7 to about 14% using an ASTM D 638 test method; a flexural modulus at 1% sectant of about 110,000 to about 240,000 pounds per square inch using an ASTM D 790 test method; a notched izod impact strength (23 degrees Celsius) of about 0.4 to about 4.0 foot pounds per inch using an ASTM D 256 test method; and/or a heat deflection temperature (at 0.455 MPa) of about 160 degrees to about 250 degrees Fahrenheit using an ASTM D 648 test method. A material used to construct the distal section and/or axial projections include moldable materials in some embodiments. Non-limiting examples of materials that can be used to manufacture the distal section and/or axial projections include polypropylene, polystyrene, polyethylene, polycarbonate, and the like, and mixtures thereof. In certain embodiments, a rack component described herein is not manufactured from an elastomer, with certain exceptions for antistatic components described hereafter should they be included.

Anti-Microbial Materials

A rack component may include one or more antimicrobial materials. An antimicrobial material may be coated on a surface (e.g., inner and/or outer surface) or impregnated in a moldable material, in some embodiments. One or more portions or sections, or all portions and sections, of a rack component may include one or more antimicrobial materials. In some embodiments anti-microbial agents or substances may be added to the moldable plastic during the manufacture process. In some embodiments, the anti-microbial agent or substance can be an anti-microbial metal. The addition of anti-microbial agents may be useful in (i) decreasing the amount of microbes present in or on a device, (ii) decreasing the probability that microbes reside in or on a device, and/or (iii) decreasing the probability that microbes form a biofilm in or on a device, for example. Antimicrobial materials include, without limitation, metals, halogenated hydrocarbons, quaternary salts and sulfur compounds.

Non-limiting examples of metals with anti-microbial properties are silver, gold, platinum, palladium, copper, iridium (i.e. the noble metals), tin, antimony, bismuth, zinc cadmium, chromium, and thallium. The afore-mentioned metal ions are believed to exert their effects by disrupting respiration and electron transport systems upon absorption into bacterial or fungal cells. A commercially accessible form of silver that can be utilized in devices described herein is SMARTSILVER™ NovaResin. SMARTSILVER™ NovaResin is a brand of antimicrobial master batch additives designed for use in a wide range of polymer application. Billions of silver nanoparticles can easily be impregnated into PET, PP, PE and nylon using standard extrusion or injection molding equipment. SMARTSILVER™ NovaResin additives may be delivered as concentrated silver-containing master batch pellets to facilitate handling and processing. NovaResin is designed to provide optimum productivity in a wide range of processes, including fiber extrusion, injection molding, film extrusion and foaming.

Further non-limiting examples of anti-microbial substances or agents include, without limitation, inorganic particles such as barium sulfate, calcium sulfate, strontium sulfate, titanium oxide, aluminum oxide, silicon oxide, zeolites, mica, talcum, and kaolin. Anti-microbial substances also include halogenated hydrocarbons, quaternary salts and sulfur active compounds.

Halogenated hydrocarbons, include, without limitation, halogenated derivatives of salicylanilides (e.g., 5-bromo-salicylanilide; 4',5-dibromo-salicylanilide; 3,4',5-tribromo-salicylanilide; 6-chloro-salicylanilide; 4'5-dichloro-salicylanilide; 3,4'5-trichloro-salicylanilide; 4',5-diiodo-salicylanilide; 3,4',5-triiodo-salicylanilide; 5-chloro-3'-trifluoromethyl-salicylanilide; 5-chloro-2'-trifluoromethyl-salicylanilide; 3,5-dibromo-3'-trifluoromethyl-salicylanilide; 3-chloro-4-bromo-4'-trifluoromethyl-salicylanilide; 2',5-dichloro-3-phenyl-salicylanilide; 3',5-dichloro-4'-methyl-3-phenyl-salicylanilide; 3',5-dichloro-4'-phenyl-3-phenyl-salicylanilide; 3,3',5-trichloro-6'-(p-chlorophenoxy)-salicylanilide; 3',5-dichloro-5'-(p-bromophenoxy)-salicylanilide; 3,5-dichloro-6'-phenoxy-salicylanilide; 3,5-dichloro-6'-(o-chlorophenoxy)-salicylanilide; 5-chloro-6'-(o-chlorophenoxy)-salicylanilide; 5-chloro-6'-beta-naphthyloxy-salicylanilide; 5-chloro-6'-alpha-naphthyloxy-salicylanilide; 3,3',4-trichloro-5,6'-beta-naphthyloxy-salicylalide and the like).

Halogenated hydrocarbons also can include, without limitation, carbanilides (e.g., 3,4,4'-trichloro-carbanilide (TRICLOCARBAN); 3,3',4-trichloro derivatives; 3-trifluoromethyl-4,4'-dichlorocarbanilide and the like). Halogenated hydrocarbons include also, without limitation, bisphenols (e.g., 2,2'-methylenebis(4-chlorophenol); 2,2'-methylenebis (4,5-dichlorophenol); 2,2'-methylenebis(3,4,6-trichlorophenol); 2,2'-thiobis(4,6-dichlorophenol); 2,2'-diketobis(4-bromophenol); 2,2'-methylenebis(4-chloro-6-isopropylphenol); 2,2'-isopropylidenebis(6-sec-butyl-4-chlorophenol) and the like).

Also included within hydrogenated hydrocarbons are halogenated mono- and poly-alkyl and aralkyl phenols (e.g., methyl-p-chlorophenol; ethyl-p-chlorophenol; n-propyl-p-chlorophenol; n-butyl-p-chlorophenol; n-amyl-p-chlorophenol; sec-amyl-p-chlorophenol; n-hexyl-p-chlorophenol; cyclohexyl-p-chlorophenol; n-heptyl-p-chlorophenol; n-octyl-p-chlorophenol; o-chlorophenol; methyl-o-chlorophenol; ethyl-o-chlorophenol; n-propyl-o-chlorophenol; n-butyl-o-chlorophenol; n-amyl-o-chlorophenol; tert-amyl-o-chlorophenol; n-hexyl-o-chlorophenol; n-heptyl-o-chlorophenol; p-chlorophenol; o-benzyl-p-chlorophenol; o-benzyl-m-methyl-p-chlorophenol; o-benzyl-m, m-dimethyl-p-chlorophenol; o-phenylethyl-p-chlorophenol; o-phenylethyl-m-methyl-p-chlorophenol; 3-methyl-p-chlorophenol; 3,5-dimethyl-p-chlorophenol; 6-ethyl-3-methyl-p-chlorophenol; 6-n-propyl-3-methyl-p-chlorophenol; 6-iso-propyl-3-methyl-p-chlorophenol; 2-ethyl-3,5-dimethyl-p-chlorophenol; 6-sec butyl-3-methyl-p-chlorophenol; 6-diethylmethyl-3-methyl-p-chlorophenol; 6-iso-propyl-2-ethyl-3-methyl-p-chlorophenol; 2-sec amyl-3,5-dimethyl-p-chlorophenol; 2-diethylmethyl-3,5-dimethyl-p-chlorophenol; 6-sec octyl-3-methyl-p-chlorophenol; p-bromophenol; methyl-p-brdmophenol; ethyl-p-bromophenol; n-propyl-p-bromophenol; n-butyl-p-bromophenol; n-amyl-p-bromophenol; sec-amyl-p-bromophenol; n-hexyl-p-bromophenol; cyclohexyl-p-bromophenol; o-bromophenol; tert-amyl-o-bromophenol; n-hexyl-o-bromophenol; n-propyl-m, m-dimethyl-o-bromophenol; 2-phenyl phenol; 4-chloro-2-methyl phenol; 4-chloro-3-methyl phenol; 4-chloro-3,5-dimethyl phenol; 2,4-dichloro-3,5-dimethylphenol; 3,4,5,6-terabromo-2-methylphenol; 5-methyl-2-pentylphenol; 4-isopropyl-3-methylphenol; 5-chloro-2-hydroxydiphenylemethane).

Halogenated hydrocarbons also include, without limitation, chlorinated phenols (e.g., parachlorometaxylenol, p-chloro-o-benzylphenol and dichlorophenol); cresols (e.g., p-chloro-m-cresol), pyrocatechol; p-chlorothymol; hexachlorophene; tetrachlorophene; dichlorophene; 2,3-dihydroxy-5,5'-dichlorophenyl sulfide; 2,2'-dihydroxy-3,3',5,5'-tetrachlorodiphenyl sulfide; 2,2'-dihydroxy-3,3',5,5',6,6'-hexachlorodiphenyl sulfide and 3,3'-dibromo-5,5'-dichloro-2,2'-dihydroxydiphenylamine). Halogenated hydrocarbons also may include, without limitation, resorcinol derivatives (e.g., p-chlorobenzyl-resorcinol; 5-chloro-2,4-dihydroxy-diphenyl methane; 4'-chloro-2,4-dihydroxydiphenyl methane; 5-bromo-2,4-dihydroxydiphenyl methane; 4'-bromo-2,4-dihydroxydiphenyl methane), diphenyl ethers, anilides of thiophene carboxylic acids, chlorhexidines, and the like.

Quaternary salts include, without limitation, ammonium compounds that include alkyl ammonium, pyridinum, and isoquinolinium salts (e.g., 2,2'-methylenebis(4-chlorophenol); 2,2'-methylenebis(4,5-dichlorophenol); 2,2'-methylenebis(3,4,6-trichlorophenol); 2,2'-thiobis(4,6-dichlorophenol); 2,2'-diketobis(4-bromophenol); 2,2'-methylenebis(4-chloro-6-isopropylphenol); 2,2'-isopropylidenebis(6-sec-butyl-4-chlorophenol); cetyl pyridinium chloride; diisobutylphenoxyethoxyethyldimethylbenzyl ammonium chloride; N-methyl-N-(2-hydroxyethyl)-N-(2-hydroxydodecyl)-N-benzyl ammonium chloride; cetyl trimethylammonium bromide; stearyl trimethylammonium bromide; oleyl dimethylethylammonium bromide; lauryidimethylchlorethoxyethylammonium chloride; lauryidimethylbenzyl-ammonium chloride; alkyl (Cg-Cig) dimethyl (3,4-dichlorobenzyl)-ammonium chloride; lauryl pyridinium bromide; lauryl iso-quinolinium bromide; N (lauroyloxyethylaminoformylmethyl) pyridinium chloride, and the like).

Sulfur active compounds include, without limitation, thiuram sulfides and dithiocarbamates, for example (e.g., disodium ethylene bis-dithiocarbamate (Nabam); diammonium ethylene bis-dithiocarbamate (amabam); Zn ethylene bis-dithiocarbamate (ziram); Fe ethylene bis-dithiocarbamate (ferbam); Mn ethylene bis-dithiocarbamate (manzate); tetramrethyl thiuram disulfide; tetrabenzyl thiuram disulfide; tetraethyl thiuram disulfide; tetramethyl thiuram sulfide, and the like).

In certain embodiments, an antimicrobial material comprises one or more of 4', 5-dibromosalicylanilide; 3,4', 5-tribromosalicylanilide; 3,4', 5-trichlorosalicylanilide; 3,4, 4'-trichlorocarbanilide; 3-trifluoromethyl4,4'-dichlorocarbanilide; 2,2'-methylenebis(3,4,6-trichlorophenol); 2,4,4'-trichloro-2'-hydroxydiphenyl ether; Tyrothricin; N-methyl-N-(2-hydroxyethyl-N-(2-hydroxydodecyl)-N-benzyl ammonium chloride; cetyl pyridinium chloride; 2,3', 5-tribromosalicylanilide; chlorohexidine digluconate; chlorohexidine diacetate; 4', 5-dibromosalicylanilide; 3,4,4'-trichlorocarbanilide; 2,4,4'-trichloro-2-hydroxydiphenyl ether (TRICLOSAN; 5-chloro-2-(2,4-dichlorophenoxy)phenol); 2,2'-dihydroxy-5, 5'-dibromo-diphenyl ether) and the like.

Methods for manufacturing anti-microbial containing plastic devices are described in International Patent Application No. PCT/US2009/047541, filed on Jun. 16, 2009, published as published patent application no. WO 2010/008737 on Jan. 21, 2010, and entitled ANTIMICROBIAL FLUID HANDLING DEVICES AND METHODS OF MANUFACTURE, the entirety of which is hereby incorporated herein by reference.

Degradable Materials

One or more pipette tip rack components described herein may be constructed from a degradable material. Any suitable degradable material may be utilized, including without limitation from a natural polymer, a bacterial produced cellulose, and/or chemically synthesized polymeric material.

Non-limiting examples of a natural polymer include starch/synthetic biodegradable plastic, cellulose acetate, chitosan/cellulose/starch and denatured starch. Non-starch biodegradable components may include chitin, casein, sodium (or zinc, calcium, magnesium, potassium) phosphate and metal salt of hydrogen phosphate or dihydrogen phosphate, amide derivatives of erucamide and oleamide and the like, for example. Non-limiting examples of bacterial produced cellulose include homopolymers, polymer blends, aliphatic polyesters, chemosynthetic compounds and the like. Non-limiting examples of chemically synthesized polymeric material include aliphatic polyester, an aliphatic-aromatic polyester and a sulfonated aliphatic-aromatic polyester.

In some embodiments, a rack component is manufactured from a moldable material that is photodegradable and further includes a photosensitizer. Non-limiting examples of photosensitizers include aliphatic and/or aromatic ketones, including without limitation acetophenone, acetoin, l'-acetonaphthone, 2'-acetonaphtone, anisoin, anthrone, bianthrone, benzil, benzoin, benzoin methyl ether, benzoin isopropyl ether, 1-decalone, 2-decalone, benzophenone, p-chlorobenzophenone, dibenzalacetone, benzoylacetone, benzylacetone, deoxybenzoin, 2,4-dimethyl benzophenone, 2,5-dimethylbenzophenone, 3,4-dimethylbenzophenone, 4-benzoylbiphenyl, butyrophenone, 9-fluorenone, 4,4-bis-(dimethylamino)-benzophenone, 4-dimethylaminobenzophenone, dibenzyl ketone, 4-methylbenzophenone, propiophenone, benzanthrone, 1-tetralone, 2-tetralone, valerophenone, 4-nitrobenzophenone, di-n-hexyl ketone, isophorone, xanthone and the like. Aromatic ketones may be used such as benzophenone, benzoin, anthrone, deoxyanisoin and quinones (e.g., anthraquinone, 1-aminoanthraquinone, 2-aminoanthraquinone, 1-chloroanthraquinone, 2-chloroanthraquinone, 1-methylanthraquinone, 2-methylanthraquinone, 1-nitroanthraquinone, 2-phenylanthraquinone, 1,2-naphthoquinone, 1,4-naphthoquinone, 2-methyl-1,4-naphthoquinone, 1,2-benzanthraquinone, 2,3-benzanthraquinone, phenanthrenequinone, 1-methoxyanthraquinone, 1,5-dichloroanthraquinone, and 2,2'-dimethyl-1,1'-dianthraquinone, and anthraquinone dyes. Quinones that may be used are 2-methylanthraquinone, 2-chloroanthraquinone, 2-ethylanthraquinone and the like). A photodegradable plastic may include iron, zinc, cerium cobalt, chromium, copper, vanadium and/or manganese compounds in certain embodiments.

In some embodiments, a rack component comprises a polyhydroxy-containing carboxylate, such as polyethylene glycol stearate, sorbitol palmitate, adduct of sorbitol anhydride laurate with ethylene oxide and the like; epoxidized soybean oil, oleic acid, stearic acid, and epoxy acetyl castor oil or combinations thereof. A rack component may include maleic anhydride, methacrylic anhydride or maleimide in some embodiments, and in certain embodiments, a rack component may comprise a polymer attacking agent such as a microorganism or an enzyme. In some embodiments, a rack component may include a coating layer, which prevents passage of gas or permeation of water, on one or more surfaces that come into contact with a liquid. A rack component that includes a coating layer also may have silicon, oxygen, carbon, hydrogen, an edible oil, a drying oil, melamine, a phenolic resin, a polyester resin, an epoxy resin, a terpene resin, a urea-formaldehyde rein, a styrene polymer, polyvinyl chloride, polyvinyl alcohol, polyvinyl acetate, a polyacrylate, a polyamide, hydroxypropylmethylcellulose, methocel, polyethylene glycol, an acrylic, an acrylic copolymer, polyurethane, polylactic acid, a polyhydroxybutyrate-hydroxyvalerate copolymer, a starch, soybean protein, a wax, and/or mixtures thereof.

A rack component can be manufactured from any type of environmentally friendly, earth friendly, biologically friendly, natural, organic, carbon based, basic, fundamental, elemental material. Biologically or environmentally friendly materials can comprise any materials that are considered to inflict minimal or no harm on biological organisms or the environment. Such materials can aid in degradation and/or recycling of a rack or component thereof. Such materials can have non-toxic properties, aid in producing less pollutants, promote an organic environment, and further support living organisms. In some embodiments a rack component can be made from recycled or organic materials and/or in combination with degradable materials. In certain embodiments, bio-PET can be produced from a wide variety of different sources. Bio-PET can be produced from any of type of plant such as algae, for example. Other biologically or environmentally friendly PET materials may be produced from other sources such as animals, inert substances, organic materials or man-made materials, for example.

Degradable materials and methods of use are described in International Patent Application No. PCT/US2009/063762, filed on Nov. 9, 2009, and entitled DEGRADABLE FLUID HANDLING DEVICES, the entirety of which is hereby incorporated herein by reference.

Anti-Static Materials and Components

Anti-static materials and conditions sometimes are applied to a pipette rack and/or component thereof. In certain embodiments an anti-static agent can be incorporated into a moldable plastic during the manufacture process of a rack component described herein. A rack component may comprise any type of electrically conductive material, such as a conductive metal for example. Non-limiting examples of electrically conductive metals include platinum (Pt), palladium (Pd), copper (Cu), nickel (Ni), silver (Ag) and gold (Au). A conductive metal may be in any form in or on a rack component, for example, such as metal flakes, metal powder, metal strands or coating of metal.

An electrically conductive material, or portion thereof, may be any material that contains movable electric charges, such as carbon for example. In some embodiments, a rack component comprises about 5% to about 40% or more carbon by weight (e.g., 7-10%, 9-12%, 11-14%, 13-16%, 15-18%, 17-20%, 19-22%, 21-24%, 23-26%, 25-28%, 27-30%, 29-32%, 32-34%, 33-36%, or 35-38% carbon by weight).

A rack component that contacts a pipette tip can be a candidate for receiving one or more conductive materials, in some embodiments. Thus, in some embodiments, a plate sometimes is manufactured from a material that comprises one or more conductive materials. A lid in certain embodiments comprises a conductive material. A rack component also may include a conductive element, such as a conductive tab. A conductive element can be affixed to a part of a rack component, and sometimes is in effective communication with another rack component. For example, a conductive element, such as a conductive tab, may traverse a slot or groove in a lid, plate, base or combination thereof, and be in communication with the rack exterior and rack interior. Such a configuration can transmit electrostatic charge from pipette tips in the rack interior to the rack exterior from which the charge can be discharged.

Pipette tips are substantially immobilized in certain anti-static rack component embodiments, as minimizing pipette tip movement may reduce the amount of static charge generated in or on a pipette tip. Pipette tips can be substantially immobilized by restricting pipette tip movement in a plate, for example. Elements in a plate can restrict movement, such as longer bore length (e.g., longer tube length), smaller bore diameter and combinations thereof, for example. Elements in a lid also can restrict movement, such as placing the inner surface of the lid top in effective contact with tops of pipette tips, for example. The inner surface of the lid top is in direct contact with tops of the pipette tips in some embodiments, and a member in connection with the lid that exerts pressure on the pipette tip tops sometimes is present in a rack. In the latter embodiments, the member in connection with the lid sometimes comprises a material that can deform against the pipette tip tops, such as an elastomeric material, for example. In some embodiments a member in connection with the lid sometimes comprises a conductive material. A member in connection with the lid sometimes is a pillow structure, that includes a casing containing a conductive material, within which is a material that can deform. A member in connection with the lid sometimes is in effective connection with a conductive member in communication with the rack exterior (e.g., a tab that traverses the lid, plate and/or base).

Methods for manufacturing components and racks comprising an anti-static member are described in International Patent Application No. PCT/US2010/021838, filed on Jan. 22, 2010, and entitled "ANTI-STATIC PIPETTE TIP TRAYS", which is hereby incorporated by reference herein, in its entirety.

Methods of Manufacturing—Rack Components

In some embodiments rack components (e.g., a single-walled rack component and/or a partial single-walled base) may be manufactured by a suitable process, non-limiting examples of which include thermoforming, vacuum forming, pressure forming, plug-assist forming, reverse-draw thermoforming, matched die forming, extrusion, casting and injection molding. A rack or rack component as described herein can be made from a suitable injection molding process, non-limiting examples of which include co-injection (sandwich) molding, die casting, fusible (lost, soluble) core injection molding, gas-assisted injection molding, in-mold decoration and in mold lamination, injection-compression molding, insert and outsert molding, lamellar (micro-layer) injection molding, low-pressure injection molding, metal injection molding, microinjection molding, microcellular molding, multicomponent injection molding, multiple live-feed injection molding, powder injection molding, push-pull injection molding, reaction injection molding, resin transfer molding, rheomolding, structural foam injection molding, structural reaction injection molding, thin-wall injection molding, vibration gas injection molding and water assisted injection molding.

Injection molding is a manufacturing process for producing objects (e.g., rack components, for example) from, in some embodiment, thermoplastic (e.g., nylon, polypropylene, polyethylene, polystyrene and the like, for example) and thermosetting plastic (e.g., epoxy and phenolics, for example) materials. Sometimes a plastic material of choice is sometimes fed into a heated barrel, mixed, and forced into a mold cavity or void where it cools and hardens to the configuration of a mold cavity. In some embodiments of injection molding, granular plastic is fed by gravity from a hopper into a heated barrel. Sometimes the granules are slowly moved forward by a screw-type plunger and the plastic is forced into a heated chamber, where it is melted. In certain embodiments, as the plunger advances, the melted plastic is forced through an opening (e.g., a nozzle, a sprue) that rests against the mold, allowing it to enter the mold cavity, sometimes through a gate and/or runner system. In some embodiments a pressure injection method ensures the complete filling of the mold with the melted plastic. In certain embodiments a mold remains cold so the plastic solidifies almost as soon as the mold is filled. Sometimes plastic in a mold is cooled after injection is complete. In some embodiments plastic in a mold is cooled to a predetermined temperature before ejecting the product. Sometimes a mold is cooled to between about 100° C. to about −10° C., about 80° C. to about 20° C., about 80° C. to about 25° C., or about 65° C. to about 25° C. In certain embodiments a mold is cooled to about 85° C., 80° C., 75° C., 70° C., 65° C., 60° C., 55° C., 50° C. or about 45° C.

After the mold cools (e.g., to a predetermined temperature), the mold portions are separated, and the molded object is ejected. In some embodiments, additional additives can be included in the plastic or mold to give the final product additional properties (e.g., anti-microbial, or anti-static properties, for example). In some embodiments, rack components described herein are injection molded as a unitary construct. In some embodiments, rack components described herein are injection molded as a single-walled construct.

A mold often is configured to hold the molten plastic in the correct geometry to yield the desired rack component upon cooling of the plastic. Injection molds sometimes are made of two or more parts. In some embodiments molds typically are designed so that the molded part reliably remains on the ejector side of the mold after the mold opens, after cooling. The part can then fall freely away from the mold when ejected from the ejector side of the mold. In some embodiments, an ejector sleeve pushes the rack component from the ejector side of the mold.

A mold for manufacturing a rack component (e.g., a base, tray and/or lid) by an injection mold process, sometimes comprises a body that forms an exterior portion of a rack component and a member that forms an inner surface of a rack component. A mold can be made of a suitable material, non-liming example of which include hardened steel, pre-hardened steel, aluminum, and/or beryllium-copper alloy, the like, or combinations thereof.

LISTING OF ELEMENTS SHOWN IN THE DRAWINGS

The tables below provide lists of some elements shown in the drawings for components of a pipette tip rack assembly.

TABLE 1A, 1B, 10, 2 and 3 provide a list of some elements shown in the drawings for a base, tray and lid.

TABLE 1A

| Structure | Element | Call-Out |
|---|---|---|
| base | base | 1 |
| base | bottom | 2 |
| base | buttresses | 6 |
| base | clamped buttress | 7 |
| base | flange distal surface | 12B |
| base | flanges | 12 |
| base | flange proximal surface | 12A |
| base | footprint | 14 |
| base | footprint, long side | 14A |
| base | footprint, short side | 14B |
| base | buttress face, interior | 16' |
| base | buttress face, exterior | 16 |
| base | exterior sidewall surface | 18A, 20A |
| base | base sidewall | 18, 20 |
| base | long sidewall | 18 |
| base | short sidewall | 20 |
| | interior sidewall | |
| base | surface | 18B, 20B |
| base | junction | 22 |
| base | proximal portion of base | 24 |
| base | distal portion of base | 26 |
| base | buttress sidewall inner surface | 30A |
| base | buttress sidewall | 30 |
| base | buttress sidewall outer surface | 30B |
| base | buttress sidewall edge | 30C |
| base | buttress sidewall interior surface | 30D |
| base | buttress bottom, distal surface | 36" |
| base | buttress bottom | 36 |
| base | buttress bottom, proximal surface | 36' |
| base | bottom recess | 38 |
| base | bottom exterior edge | 40 |
| base | extension of bottom exterior edge | 40' |
| base | lip | 41 |
| base | ridge | 42 |
| base | lip side | 43 |
| base | lip proximal surface | 44 |
| base | lip recess | 45 |
| base | interruption of ridge | 46 |
| base | lid tab connector | 47 |
| base | flange connectors | 48 |
| base | lip connectors | 49 |
| base | bottom interior surface | 52 |
| base | wells | 54 |
| base | walls or ridges | 58 |

TABLE 1B

| Structure | Element | Call-Out |
|---|---|---|
| base | base | 201 |
| base | bottom | 202 |
| base | buttresses | 206 |
| base | clamped buttress | 207 |
| base | flange distal surface | 212B |
| base | flanges | 212 |
| base | flange proximal surface | 212A |
| base | footprint | 214 |
| base | footprint, long side | 214A |

TABLE 1B-continued

| Structure | Element | Call-Out |
|---|---|---|
| base | footprint, short side | 214B |
| base | buttress face, interior | 216' |
| base | buttress face, exterior | 216 |
| base | exterior sidewall surface | 218A, 220A |
| base | base sidewall | 218, 220 |
| base | long sidewall | 218 |
| base | short sidewall | 220 |
| base | interior sidewall surface | 218B, 220B |
| base | junction | 222 |
| base | proximal portion of base | 224 |
| base | distal portion of base | 226 |
| base | buttress sidewall inner surface | 230A |
| base | buttress sidewall | 230 |
| base | buttress sidewall outer surface | 230B |
| base | buttress sidewall edge | 230C |
| base | buttress sidewall interior surface | 230D |
| base | buttress bottom, distal surface | 236" |
| base | buttress bottom | 236 |
| base | buttress bottom, proximal surface | 236' |
| base | bottom recess | 238 |
| base | bottom exterior edge | 240 |
| base | extension of bottom exterior edge | 240' |
| base | lip | 241 |
| base | ridge | 242 |
| base | lip side | 243 |
| base | lip proximal surface | 244 |
| base | lip recess | 245 |
| base | interruption of ridge | 246 |
| base | lid tab connector | 247 |
| base | flange connectors | 248 |
| base | lip connectors | 249 |
| base | bottom interior surface | 252 |
| base | wells | 254 |
| base | walls or ridges | 258 |

TABLE 1C

| Structure | Element | Call-Out |
|---|---|---|
| base | base | 301 |
| base | bottom | 302 |
| base | buttresses | 306 |
| base | clamped buttress | 307 |
| base | flange distal surface | 312B |
| base | flange | 312 |
| base | flange proximal surface | 312A |
| base | footprint | 314 |
| base | footprint, long side | 314A |
| base | footprint, short side | 314B |
| base | buttress face, interior | 316' |
| base | buttress face, exterior | 316 |
| base | exterior sidewall surface | 318A, 320A |
| base | base sidewall | 318, 320 |
| base | long sidewall | 318 |
| base | short sidewall | 320 |
| base | interior sidewall surface | 318B, 320B |
| base | junction | 322 |

TABLE 1C-continued

| Structure | Element | Call-Out |
|---|---|---|
| base | proximal portion of base | 324 |
| base | distal portion of base | 326 |
| base | post | 327 |
| base | post outer wall | 327A |
| base | post inner wall | 327B |
| base | post inner wall portion | 327B' |
| base | void | 328 |
| base | buttress sidewall inner surface | 330A |
| base | buttress sidewall | 330 |
| base | buttress sidewall outer surface | 330B |
| base | buttress sidewall edge | 330C |
| base | buttress sidewall interior surface | 330D |
| base | buttress bottom, distal surface | 336" |
| base | buttress bottom | 336 |
| base | buttress bottom, proximal surface | 336' |
| base | bottom recess | 338 |
| base | bottom exterior edge | 340 |
| base | extension of bottom exterior edge | 340' |
| base | lip | 341 |
| base | ridge | 342 |
| base | lip side | 343 |
| base | lip proximal surface | 344 |
| base | lip recess | 345 |
| base | interruption of ridge | 346 |
| base | lid tab connector | 347 |
| base | flange connectors | 348 |
| base | lip connectors | 349 |
| base | bottom interior surface | 352 |
| base | wells | 354 |
| base | walls or ridges | 358 |

TABLE 2

| Structure | Element | Call-Out |
|---|---|---|
| tray | tray | 60 |
| tray | plate | 62 |
| tray | tray sidewall | 64 |
| tray | tray flange | 66 |
| tray | proximal plate surface | 68 |
| tray | distal plate surface | 70 |
| tray | plate bores | 72 |
| tray | first bore | 72' |
| tray | second bore | 72" |
| tray | proximal ledge | 74 |
| tray | distal rim | 76 |
| tray | exterior ribs | 78 |
| tray | annular members | 80 |
| tray | first member | 80' |
| tray | second member | 80" |
| tray | interior ribs | 86 |
| tray | tray connector | 88 |
| tray | barbs | 90 |
| tray | tab | 92 |
| tray | tab supporting rib | 94 |
| tray | beveled recess | 96 |

TABLE 3

| Structure | Element | Call-Out |
|---|---|---|
| Lid | Lid | 100 |
| Lid | lid connector | 102 |
| Lid | clasp | 104 |
| Lid | lid proximal surface | 106 |
| Lid | lid sidewall | 108 |
| Lid | Lid side junction | 110 |
| Lid | lip top member | 112 |
| Lid | lid flange | 114 |
| Lid | hinge | 118 |
| Lid | hinge projection | 120 |
| Lid | clasp projection | 122 |
| Lid | lid distal edge | 130 |
| Lid | interior distal surface | 116 |

EXAMPLES

Example 1: Examples of Embodiments

Provided hereafter is a listing of certain non-limiting embodiments of the technology.

A1. A single-walled pipette tip rack base, comprising:

a bottom and base sidewalls;

each of which base sidewalls comprises an exterior sidewall surface, an interior sidewall surface, and one or more buttresses;

each of which buttresses is bossed and projects from an exterior sidewall surface; and which base is configured for use in an automated liquid dispensing device.

A2. The base of embodiment A1, wherein the pipette tip rack base comprises flanges, wherein the flanges are integrated with a sidewall and a buttress and comprise a proximal surface and a distal surface.

A3. The base of embodiment A2, wherein each of the flanges are integrated with two buttresses.

A4. The base of embodiment A3, wherein the two buttresses are on one base sidewall.

A5. The base of any one of embodiments A1 to A4, wherein the buttresses are on adjoining base sidewalls.

A6. The base of any one of embodiments A2 to A5, wherein the flanges are not integrated with a buttress face interior.

A7. The base of any one of embodiments A1 to A6, wherein the pipette tip rack base comprises a footprint.

A7.1. The base of embodiment A7 where the outside dimension of the footprint has a length of 127.76 mm±0.5 mm and a width of 85.48 mm±0.5 mm.

A8. The base of any one of embodiments A1 to A7.1, wherein the base comprises four base sidewalls.

A9. The base of any one of embodiments A1 to A8, wherein any one base sidewall is not flat.

A10. The base of any one of embodiments A1 to A9, wherein the base sidewalls comprise two opposing short sidewalls and two opposing long sidewalls.

A11. The base of embodiment A10 wherein each of the short sidewalls is joined to each of the long sidewalls at a junction comprising a flange and a lip.

A12. The base of any one of embodiments A1 to A11 wherein the base sidewalls taper inward towards the bottom.

A13. The base of any one of embodiments A1 to A12, wherein the base sidewalls are perpendicular to the bottom.

A14. The base of any one of embodiments A1 to A13, wherein there is a total of four or more buttresses in the base.

A15. The base of any one of embodiments A1 to A14, wherein there is a total of four to sixteen buttresses in the base.

A16. The base of any one of embodiments A1 to A15, wherein there is a total of eight buttresses in the base.

A17. The base of any one of embodiments A1 to A15, wherein each base sidewall comprises one to four buttresses.

A18. The base of any one of embodiments A1 to A17, wherein each base sidewall comprises two buttresses.

A19. The base of any one of embodiments A1 to A18, wherein each of the buttresses comprises a buttress face, two opposing buttress sidewalls and a buttress bottom.

A19.1. The base of any one of embodiments A1 to A19, wherein each of the two opposing buttress sidewalls comprises a buttress sidewall interior surface and a buttress sidewall exterior surface.

A20. The base of embodiment A19 or A19.1, wherein the buttresses comprise a buttress sidewall edge resulting from buttress sidewalls projecting further from a base sidewall than the buttress face.

A21. The base of embodiment A19 or A20, wherein the two opposing buttress sidewalls are disposed on an exterior sidewall of the base at an angle relative to a vertical axis.

A22. The base of embodiment A21, wherein the angle, independently for each opposing buttress sidewall, is plus or minus about 1 to about 5 degrees from the vertical axis.

A23. The base of embodiment A21, wherein the angle, independently for each opposing buttress sidewall, is plus or minus about 2 degrees from the vertical axis.

A24. The base of any one of embodiments A1 to A20, wherein the buttress face is substantially parallel with the base sidewalls.

A25. The base of any one of embodiments A1 to A20, wherein the buttress face is about perpendicular to the bottom.

A26. The base of any one of embodiments A20 to A25, wherein the buttress sidewall edge tapers towards the proximal portion of the base and is wider towards the distal portion of the base.

A27. The base of any one of embodiments A19 to A26, wherein the buttress sidewall interior surface is about perpendicular to the base sidewall.

A28. The base of any one of embodiments A1 to A27, wherein the buttress bottom comprises a bottom proximal surface, a bottom distal surface and a bottom exterior edge.

A29. The base of embodiment A28, wherein the distal surface of the buttress bottom is substantially parallel with the bottom of the base.

A30. The base of embodiment A28 or A29, wherein the bottom distal surface comprises a bottom recess.

A31. The base of embodiment A30, wherein the recess is configured to receive a foot.

A32. The base of any one of embodiments A28 to A31, wherein the buttress bottom projects beyond and away from the buttress face.

A33. The base of embodiment A32 wherein the buttress bottom projects beyond the buttress sidewall edge.

A34. The base of embodiment A32 or A33 wherein the buttress bottom exterior edge of one buttress projects further from the buttress face than the bottom exterior edge of another buttress projects from the buttress face in the base.

A35. The base of any one of embodiments A1 to A34, wherein adjacent buttresses on adjoining sidewalls are angled buttresses.

A36. The base of any one of embodiments A1 to A34, wherein adjacent buttresses on adjoining sidewalls are setback buttresses.

A37. The base of any one of embodiments A1 to A36, wherein adjacent buttresses on adjoining sidewalls are not clasping, clamped, diagonal or French buttresses.

A38. The base of any one of embodiments A1 to A37, wherein the base comprises a ridge, portions of which ridge are substantially co-extensive with each buttress face.

A39. The base of embodiment A38, wherein the ridge extends proximal to the flange.

A40. The base of embodiment A38 or A39, wherein the base comprises one or more lips in connection with the ridge, each of which one or more lips projects from the ridge away from the base interior.

A40.1. The base of embodiment A40, wherein one or more of the one or more lips is integrated with two buttress sidewalls.

A41. The base of embodiment A40, wherein each of the one or more lips is integrated with the ridge.

A41.1. The base of embodiment A40 or A41, wherein each lip comprises a lip proximal surface, a lip side and a lip recess.

A41.2. The base of any one of embodiments A40 to A41.1, wherein each lip recess is substantially co-extensive with a flange distal surface.

A42. The base of any one of embodiments A38 to A41.2, wherein the ridge comprises an interruption configured to receive a clasp of a lid.

A43. The base of any one of embodiments A40 to A42, wherein one or more of the lips comprise lip connectors configured to receive a connector of a lid.

A44. The base of any one of embodiments A2 to A43 wherein two or more of the flanges comprise a flange connector configured to receive a connector of a tray.

A45. The base of any one of embodiments A1 to A44, wherein the interior of the base comprises no interior ribs.

A46. The base of any one of embodiments A1 to A44, wherein the interior of the base comprises interior ribs.

A47. The base of any one of embodiments A10 to A46, wherein the shortest distance between the interior sidewall surface of the two opposing long sidewalls is about 69 mm or less.

A48. The base of any one of embodiments A10 to A46, wherein the shortest distance between the interior sidewall surface of the two opposing long sidewalls is about 67 mm.

A49. The base of any one of embodiments A10 to A48, wherein the shortest distance between the interior sidewall surface of the two opposing short sidewalls is about 106 mm or less.

A50. The base of any one of embodiments A10 to A48, wherein the shortest distance between the interior sidewall surface of the two opposing short sidewalls is about 104 mm.

A51. The base of any one of embodiments A1 to A50, wherein the base bottom comprises a bottom interior surface comprising wells.

A52. The base of embodiment A51, wherein the wells are recessed in the bottom interior surface.

A53. The base of embodiment A51 or A52, wherein each of the wells comprise two or more stepped recesses.

A54. The base of embodiment A53, wherein the stepped recesses are concentric.

A55. The base of any one of embodiments A51 to A54, wherein the bottom interior surface comprises a wall or a ridge around the perimeter of each well.

A56. The base of any one of embodiments A51 to A55, wherein a structure of the base has a maximum thickness of about 1 mm or less.

A57. The base of any one of embodiments A1 to A56, wherein the maximum thickness of all of the base sidewalls is about 1.5 mm or less.

A58. The base of any one of embodiments A1 to A57, wherein the maximum thickness of all of the base sidewalls is about 1.0 mm or less.

A59. The base of any one of embodiments A1 to A58, wherein the maximum thickness of all of the base sidewalls is about 0.8 mm or less.

B1. A pipette tip rack tray, comprising:

a plate, tray sidewalls and a tray flange;

which plate comprises a proximal plate surface, a distal plate surface, and a plurality of plate bores;

each of which plate bores is configured to receive a pipette tip;

which tray sidewalls project from the distal plate surface; and which tray flange extends from one or more of the tray sidewalls and comprises a proximal ledge and a distal rim.

B2. The tray of embodiment B1 comprising exterior ribs integrated with the proximal ledge and one of the sidewalls.

B3. The tray of embodiment B1 or B2, comprising a plurality of annular members projecting from the distal surface of the plate, wherein each annular member comprises a first bore concentric with a plate bore.

B3.1 The tray of embodiment B3, wherein the plate bore and first bore have substantially the same inner diameter.

B4. The tray of embodiment B3 or B3.1, wherein each annular member comprises a second bore, distal to and concentric with the first bore, wherein the second bore is of a smaller inner diameter than the first bore.

B4.1. The tray of any one of embodiments B3 to B4, wherein each annular member comprises a first member having an outer diameter greater than the outer diameter of a second member.

B5. The tray of any one of embodiments B1 to B4.1, comprising one or more interior ribs, each of which interior ribs is integrated with a first annular member and a second annular member adjacent to the first annular member, or is integrated with a first annular member and one of the tray sidewalls.

B6. The tray of any one of embodiments B1 to B5, wherein each annular member is integrated with four interior ribs.

B7. The tray of any one of embodiments B1 to B6, wherein each interior rib is integrated with the distal tray surface.

B8. The tray of any one of embodiments B1 to B7, comprising a tray connector configured to engage a connector on a pipette tip rack base.

B9 The tray of any embodiment B8, wherein the tray connector projects from the distal rim of the flange.

B10. The tray of any one of embodiments B1 to B9, wherein the tray connector comprises one or more barbs.

B11. The tray of any one of embodiments B1 to B10, wherein the tray comprises a tab.

B12. The tray of embodiment B11, wherein the tab is substantially coextensive with the tray sidewall and extends proximal to the tray sidewall.

B13. The tray of embodiments B11 or B12, wherein the tab comprises a tab supporting rib.

B14. The tray of any one of embodiments B1 to B13, wherein the tray flange comprises a recess.

B15. The tray of embodiments B14, wherein the recess is beveled.

B16. The tray of any one of embodiments B1 to B15, where the tray sidewalls comprise an axial length of about 10 mm to about 4 mm.

B17. The tray of any one of embodiments B1 to B16, where the tray sidewalls comprise a maximum axial length of about 15 mm.

C1. A pipette tip rack, comprising:

a tray of any one of embodiments B1 to B17, and a base configured to affix to the tray, comprising a bottom and base sidewalls.

C1.1. The pipette tip rack of embodiment C1, wherein the base is a single-walled pipette tip rack base.

C1.2. The pipette tip rack of embodiment C1 or C1.1, wherein:

each of which base sidewalls comprises an exterior sidewall surface, an interior sidewall surface, and buttresses;

each which buttresses is bossed and projects from an exterior sidewall surface;

which base is configured for use in an automated liquid dispensing device.

C2. The rack of any one of embodiments C1 to C1.2, wherein the pipette tip rack base comprises flanges, wherein the flanges are integrated with a sidewall and a buttress and comprise a proximal surface and a distal recess.

C3. The rack of any one of embodiments C1 to C2, wherein the buttress comprises a buttress bottom that projects from the one or more base sidewalls.

C4. The rack of any one of embodiments C1 to C3, wherein the distal rim of the tray engages the flanges of the base.

C5. The rack of any one of embodiments C1 to C4, wherein the base is a base of any one of embodiments A1 to A56.

C6. The rack of any one of embodiments C1 to C5, further comprising a lid.

C7. The rack of embodiment C6, wherein the lid engages the lips of the base.

C8. The rack of embodiment C6 or C7, wherein the lid comprises a lid connector configured to engage the lip connector on the lip of the base.

C9. The rack of any one of embodiments C6 to C8, wherein the lid comprises a clasp configured to engage the base flange at the interruption on the ridge of the base.

C10. The rack of any one of embodiments C5 to C9, wherein two or more of the flanges of the base comprise a flange connector configured to receive a tray connector.

D1. A method for preparing a pipette tip rack with pipette tips, comprising: providing a pipette tip rack of any one of embodiments C1 to 010; and loading the rack with one or more pipette tips, wherein the one or more pipette tips are disposed within the plate bores of the tray.

E1. A method for transferring a pipette tip from a pipette tip rack, comprising: providing a pipette tip rack of any one of the embodiments C1 to 010 in which one or more pipette tips are disposed within the plate bores of the tray; and removing the one or more pipette tips from the rack.

E2. The method of E1, wherein the one or more pipette tips are removed from the rack by an automated pipetting device.

F1. A method, comprising:

providing a single-walled pipette tip rack base of any one of embodiments A1 to A56; and transferring a fluid into wells from the base to another location.

F2. The method of F1, wherein the fluid is transferred by an automated pipetting device.

G1. A method for transferring fluid, which comprises providing a single-walled pipette tip rack base of any one of embodiments A51 to A56; and transferring a fluid to or from one or more of the wells of the base wherein the fluid is contained within the base sidewalls.

H1. A method, comprising:

providing an injection mold comprising a void configured to the shape of the pipette tip rack base of any one of embodiments A1 to A56;

feeding a heated, moldable polymer plastic material into the void;

cooling the plastic to a predetermined temperature, whereby the plastic hardens and forms a plastic pipette tip rack base in the void;

separating the mold; and ejecting the plastic pipette tip rack base.

H1.1. The method of embodiment H1, wherein the mold comprises two or more portions.

H1.2. The method of embodiment H1.1, wherein separating the mold comprises separating the mold portions.

H2. A method, comprising:

providing an injection mold comprising a void configured to the shape of the pipette tip tray of any one of embodiments B1 to B15;

feeding a heated, moldable polymer plastic material into the void;

cooling the plastic to a predetermined temperature, whereby the plastic hardens and forms a plastic pipette tip rack tray in the void;

separating the mold; and ejecting the plastic pipette tip tray.

H3. A mold for a single-walled pipette tip rack base of any one of embodiments A1 to A56 comprising:

a mold cavity configured to the shape of a pipette tip rack base of any one of embodiments A1 to A56, and configured for receiving a heated, moldable polymer plastic material;

two or more mold portions that can be separated and configured to eject a hardened plastic pipette tip rack base.

H4. A mold for a single-walled pipette tip rack tray of any one of embodiments B1 to B15 comprising:

a mold cavity configured to the shape of a pipette tip rack base of any one of embodiments B1 to B15, and configured for receiving a heated, moldable polymer plastic material;

two or more mold portions that can be separated and configured to eject a hardened plastic pipette tip rack tray.

I1. A partial single-walled pipette tip rack base, comprising:

a) a bottom and one or more base sidewalls, each of which base sidewalls comprises an exterior sidewall surface and an interior sidewall surface, wherein the bottom and the one or more base sidewalls are of single-walled construction; and b) one or more posts, each comprising a post inner wall, a post outer wall, and a void between the post inner wall and the post outer wall;

which base is configured for use in an automated liquid dispensing device.

I2. The base of embodiment I1, wherein each of which base sidewalls comprise one or more buttresses, wherein the one or more buttresses are bossed, project from an exterior sidewall surface and are of single-walled construction.

I3. The base of embodiment I1 or I2, wherein the post inner wall or the post outer wall comprises a portion of the one or more base sidewalls.

I4. The base of any one of embodiments I1 to I3, wherein the post inner wall and post outer wall are opposing post walls.

I5. The base of any one of embodiments I1 to I4, comprising four or more posts.

I6. The base of any one of embodiments I1 to I5, wherein the one or more post are corner posts.

I7. The base of any one of embodiments I1 to I6, wherein the post outer wall is integrated with a portion of the exterior sidewall surface of the base.

I8. The base of any one of embodiments I1 to I7, wherein the post outer wall comprises a curve.

I9. The base of any one of embodiments I1 to I8, wherein the post inner wall is integrated with a portion of the interior sidewall surface of the base.

I10. The base of any one of embodiments I1 to I9, wherein each of the one or more posts comprises a double-walled construction.

I11. The base of any one of embodiments I2 to I10, wherein each of the one or more buttresses comprises a buttress face, two buttress sidewalls and a buttress bottom.

I12. The base of any one of embodiments I2 to I11, wherein each of the one or more buttresses is of a single-walled construction.

I13. The base of embodiment I11 or I12, wherein the two buttress sidewalls of a buttress are opposing sidewalls.

I14. The base of any one of embodiments I11 to I13, wherein at least one of the one or more posts comprises a portion of a buttress sidewall.

I15. The base of any one of embodiments I11 to I14, wherein at least one posts comprises a first portion of a buttress sidewall of a first buttress and a second portion of a buttress sidewall of a second buttress.

I16. The base of any one of embodiments I2 to I15, wherein the base comprises flanges, wherein the flanges comprise a proximal surface and a distal surface.

I17. The base of embodiment I16, wherein one or more of the flanges is integrated with a portion of the one or more base sidewalls or a portion of the post inner wall and a portion of the buttress sidewall.

I18. The base of embodiment I16 or I17, wherein one or more of the flanges are not integrated with a buttress face interior.

I19. The base of any one of embodiments I1 to I18, wherein the interior of the base comprises interior ribs.

I20. The base of any one of embodiments I2 to I19, comprising two buttresses on at least one of the one or more base sidewalls.

I21. The base of any one of embodiments I16 to I20, wherein one or more of the flanges are integrated with a sidewall and a buttress.

I22. The base of embodiment I21, wherein each of the one or more flanges integrated with a sidewall and a buttress are integrated with two buttresses.

I23. The base of any one of embodiments I20 to I22, wherein two buttresses are on one base sidewall.

I24. The base of any one of embodiments I1 to I23, comprising a footprint.

I25. The base of embodiment I24, where the outside dimension of the footprint has a length of 127.76 mm±0.5 mm and a width of 85.48 mm±0.5 mm.

I26. The base of any one of embodiments I1 to I25, wherein the base comprises four base sidewalls.

I27. The base of any one of embodiments I1 to I26, wherein any one base sidewall is not flat.

I28. The base of any one of embodiments I1 to I27, wherein the base sidewalls comprise two opposing short sidewalls and two opposing long sidewalls.

I29. The base of embodiment I28, wherein each of the short sidewalls is joined to each of the long sidewalls at a junction comprising one of the one or more post.

I30. The base of any one of embodiments I1 to I29, wherein the base sidewalls taper inward towards the bottom.

I31. The base of any one of embodiments I1 to I30, wherein the base sidewalls are perpendicular to the bottom.

I32. The base of any one of embodiments I2 to I31, comprising four or more buttresses.

I33. The base of embodiment I32, comprising four to sixteen buttresses.

I34. The base of embodiment I32, comprising eight buttresses.

I35. The base of any one of embodiments I2 to I34, wherein each base sidewall comprises one to four buttresses.

I36. The base of embodiment I36, wherein each base sidewall comprises two buttresses.

I37. The base of any one of embodiments I13 to I36, wherein each of the two opposing buttress sidewalls comprises a buttress sidewall interior surface and a buttress sidewall exterior surface.

I37.1. The base of any one of embodiments I11 or I37, wherein one or both of the two buttress sidewalls of a buttress comprise a buttress sidewall edge resulting from the buttress sidewall projecting further from a base sidewall than the buttress face.

I38. The base of any one of embodiments I13 to I37.1, wherein each of the two opposing buttress sidewalls of a buttress are disposed on an exterior sidewall of the base at an angle relative to a vertical axis.

I39. The base of embodiment I38, wherein the angle, independently for each opposing buttress sidewall, is plus or minus about 1 to about 5 degrees from the vertical axis.

I40. The base of embodiment I39, wherein the angle, independently for each opposing buttress sidewall, is plus or minus about 2 degrees from the vertical axis.

I41. The base of any one of embodiments I11 to I40, wherein the buttress face of a buttress is substantially parallel with the base sidewall.

I42. The base of any one of embodiments I11 to I41, wherein the buttress face of a buttress is about perpendicular to the base bottom.

I43. The base of any one of embodiments I37 to I42, wherein the buttress sidewall edge tapers towards a proximal portion of the base and is wider towards a distal portion of the base.

I44. The base of any one of embodiments I37 to I43, wherein the buttress sidewall interior surface is about perpendicular to the base sidewall.

I45. The base of any one of embodiments I11 to I44, wherein the buttress bottom comprises a bottom proximal surface, a bottom distal surface and a bottom exterior edge.

I46. The base of embodiment I45, wherein the distal surface of the buttress bottom is substantially parallel with the bottom of the base.

I47. The base of embodiment I45 or I46, wherein the bottom distal surface comprises a bottom recess.

I48. The base of embodiment I47, wherein the bottom recess is configured to receive a foot.

I49. The base of any one of embodiments I11 to I48, wherein the buttress bottom projects beyond and away from the buttress face.

I50. The base of embodiment I49, wherein the buttress bottom projects beyond the buttress sidewall edge.

I51. The base of any one of embodiments I45 to I50 wherein the buttress bottom exterior edge of one buttress projects further from the buttress face than the bottom exterior edge of another buttress projects from the buttress face in the base.

I52. The base of any one of embodiments I2 to I51, comprising a first buttress adjacent to a second buttress wherein the first buttress is on a first sidewall of a base and the second buttress in on a second sidewall of a base wherein the first and second sidewalls are adjoining sidewalls.

I53. The base of embodiment I52, wherein the first buttress and the second buttress are angled buttresses.

I54. The base of embodiment I52, wherein the first buttress and the second buttress are setback buttresses.

I55. The base of embodiment I52, wherein the first buttress and the second buttress are not clasping, clamped, diagonal or French buttresses.

I56. The base of any one of embodiments I11 to I55, wherein the base comprises a ridge, portions of which ridge are substantially co-extensive with each buttress face.

I57. The base of embodiment I56, wherein the ridge extends proximal to the flange.

I58. The base of embodiment I56 or I57, wherein the base comprises one or more lips in connection with the ridge, each of which one or more lips projects from the ridge away from the base interior.

I59. The base of embodiments I58, wherein one or more of the lips is integrated with one or more of the posts.

I60. The base of embodiment I58 or I59, wherein one or more of the lips is integrated with one or more buttress sidewalls.

I61. The base of any one of embodiments I58 to I60, wherein each of the one or more lips is integrated with the ridge.

I62. The base of any one of embodiments I58 to I61, wherein each lip comprises a lip proximal surface, a lip side and a lip recess.

I63. The base of embodiment I61, wherein each lip recess is substantially co-extensive with a flange distal surface.

I64. The base of any one of embodiments I56 to I63, wherein the ridge comprises an interruption configured to receive a clasp of a lid.

I65. The base of any one of embodiments I58 to I64, wherein one or more of the lips comprise lip connectors configured to receive a connector of a lid.

I66. The base of any one of embodiments I16 to I65 wherein two or more of the flanges comprise a flange connector configured to receive a connector of a tray.

I67. The base of any one of embodiments I1 to I66, wherein the interior of the base comprises no interior ribs.

I68. The base of any one of embodiments I28 to I67, wherein the shortest distance between the interior sidewall surface of the two opposing long sidewalls is about 69 mm or less.

I69. The base of any one of embodiments I28 to I67, wherein the shortest distance between the interior sidewall surface of the two opposing long sidewalls is about 67 mm.

I70. The base of any one of embodiments I28 to I67, wherein the shortest distance between the interior sidewall surface of the two opposing short sidewalls is about 106 mm or less.

I71. The base of any one of embodiments I28 to I67, wherein the shortest distance between the interior sidewall surface of the two opposing short sidewalls is about 104 mm.

I72. The base of any one of embodiments I1 to I71, wherein the base bottom comprises a bottom interior surface comprising wells.

I73. The base of embodiment I72, wherein the wells are recessed in the bottom interior surface.

I74. The base of embodiment I72 or I73, wherein each of the wells comprise two or more stepped recesses.

I75. The base of embodiment I74, wherein the stepped recesses are concentric.

I76. The base of any one of embodiments I72 to I75, wherein the bottom interior surface comprises a wall or a ridge around the perimeter of each well.

I77. The base of any one of embodiments I1 to I76, wherein any one of the one or more base sidewalls, base bottom, buttress sidewalls, buttress face, buttress bottom, post inner wall, a post outer wall, flange, lip or ridge comprises a maximum thickness of about 1 mm or less.

I78. The base of any one of embodiments I1 to I77, comprising the tray of any one of embodiments B1 to B17.

I79. The base of any one of embodiments I1 to I78, wherein the maximum thickness of all of the base sidewalls are about 1.5 mm or less.

I80. The base of any one of embodiments I1 to I79, wherein the maximum thickness of all of the base sidewalls are about 1.0 mm or less.

I81. The base of any one of embodiments I1 to I80, wherein the maximum thickness of all of the base sidewalls are about 0.8 mm or less.

I82. The base of any one of embodiments I1 to I81, wherein the maximum thickness of all of the post sidewalls are about 1.5 mm or less.

I83. The base of any one of embodiments I1 to I82, wherein the maximum thickness of all of the post sidewalls are about 1.0 mm or less.

I84. The base of any one of embodiments I1 to I83, wherein the maximum thickness of all of the post sidewalls are about 0.8 mm or less.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described, or portions thereof, and various modifications are possible within the scope of the technology claimed. The term "a" or "an" can refer to one of, or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

Certain embodiments of the technology are set forth in the claim(s) that follow(s).

What is claimed is:

1. A partial single-walled pipette tip rack base, said base comprising:

a) a bottom and at least four base sidewalls, each of the base sidewalls comprising an exterior sidewall surface and an interior sidewall surface, wherein the bottom and the base sidewalls are of single-walled construction;

b) a plurality of corner posts, each situated at a corner of the base and forming a junction between two of the base sidewalls, wherein each of the corner posts is coupled to the bottom and comprises a post inner wall and a post outer wall defining a void between the post inner wall and the post outer wall; and c) a pipette tip rack tray configured for removable detachment from a proximal portion of the base, said pipette tip rack tray comprising a plate comprising a plurality of plate bores, wherein each of the plate bores is configured to receive a pipette tip:

wherein the base is configured for use in an automated liquid dispensing device.

2. The base of claim 1, wherein the post inner wall or the post outer wall of each of the corner posts comprises a portion of at least one of the base sidewalls.

3. The base of claim 1, wherein the post inner wall and post outer wall of each of the corner posts are opposing post walls.

4. The base of claim 1, comprising four or more of the corner posts.

5. The base of claim 1, wherein the post outer wall of each of the corner posts is integrated with a portion of the exterior sidewall surface of the base.

6. The base of claim 1, wherein the post outer wall of each of the corner posts comprises a curve.

7. The base of claim 1, wherein the post inner wall of each of the corner posts is integrated with a portion of the interior sidewall surface of the base.

8. The base of claim 1, wherein each of the plurality of corner posts comprises a double-walled construction.

9. The base of claim 1, wherein the maximum thickness of all of the post sidewalls are about 1.5 mm or less.

10. The base of claim 1, wherein the maximum thickness of all of the post sidewalls are about 1.0 mm or less.

11. The base of claim 1, wherein the maximum thickness of all of the post sidewalls are about 0.8 mm or less.

12. The base of claim 1, wherein the maximum thickness of all of the base sidewalls are about 1.5 mm or less.

13. The base claim 1, wherein the maximum thickness of all of the base sidewalls are about 1.0 mm or less.

14. The base of claim 1, wherein the maximum thickness of all of the base sidewalls are about 0.8 mm or less.

15. The base of claim 1, wherein the base is configured to withstand downward compression of about 10 pounds per square inch to about 120 pounds per square inch.

16. The base of claim 1, wherein the void is completely enclosed.

17. The base of claim 1, wherein the void is not completely enclosed.

* * * * *